(12) United States Patent
Matsuoka et al.

(10) Patent No.: US 12,354,150 B2
(45) Date of Patent: Jul. 8, 2025

(54) SYSTEMS AND METHODS FOR INGESTING TASK DATA FROM A BROWSER FOR TASK FACILITATION SERVICES

(71) Applicant: Yohana LLC, Palo Alto, CA (US)

(72) Inventors: Yoky Matsuoka, Los Altos Hills, CA (US); Nitin Viswanathan, San Francisco, CA (US)

(73) Assignee: Yohana LLC, Palo Alto, CA (US)

( * ) Notice: Subject to any disclaimer, the term of this patent is extended or adjusted under 35 U.S.C. 154(b) by 188 days.

(21) Appl. No.: 17/930,354

(22) Filed: Sep. 7, 2022

(65) Prior Publication Data

US 2023/0076327 A1 Mar. 9, 2023

Related U.S. Application Data

(60) Provisional application No. 63/241,253, filed on Sep. 7, 2021.

(51) Int. Cl.
| | |
|---|---|
| *G06Q 30/00* | (2023.01) |
| *G06F 9/48* | (2006.01) |
| *G06F 9/54* | (2006.01) |
| *G06Q 10/1093* | (2023.01) |
| *G06Q 30/0601* | (2023.01) |
| *H04L 67/306* | (2022.01) |
| *H04L 67/50* | (2022.01) |

(52) U.S. Cl.
CPC ....... *G06Q 30/0631* (2013.01); *G06F 9/4831* (2013.01); *G06F 9/54* (2013.01); *G06Q 10/1097* (2013.01); *H04L 67/306* (2013.01); *H04L 67/535* (2022.05)

(58) Field of Classification Search
CPC ............ G06Q 30/0631; G06Q 10/1097; H04L 67/535; H04L 67/306; G06F 9/4831; G06F 9/54
USPC ..................................................... 705/26, 27
See application file for complete search history.

(56) References Cited

U.S. PATENT DOCUMENTS

| 9,021,376 B2 | 4/2015 | Deluca et al. |
| 10,147,061 B2 | 12/2018 | Faulkner |

(Continued)

FOREIGN PATENT DOCUMENTS

| CN | 107179856 | 5/2020 |
| WO | 2013073680 | 5/2013 |
| WO | 2019053433 | 3/2019 |

OTHER PUBLICATIONS

International Search Report and Written Opinion mailed Nov. 15, 2022 in International Application PCT/US2022/076053.

(Continued)

*Primary Examiner* — Robert M Pond
(74) *Attorney, Agent, or Firm* — Polsinelli LLP

(57) ABSTRACT

A computer-implemented method for generating tasks in a task facilitation service based on website data includes receiving website data for a website from a browser executed on a user computing device associated with a user. The method also includes processing the website data to generate a task recommendation for a task of the user and transmitting an indication corresponding to the task recommendation. When the indication is received by a computing device, the computing device is enabled to approve the task recommendation to generate a task corresponding to the task recommendation in the task facilitation service.

22 Claims, 17 Drawing Sheets

(56) References Cited

U.S. PATENT DOCUMENTS

| | | | |
|---|---|---|---|
| 10,692,049 | B2 | 6/2020 | Nalliah et al. |
| 10,701,014 | B2 | 6/2020 | Perazzo et al. |
| 10,832,185 | B1 | 11/2020 | Bricklin et al. |
| 11,263,241 | B2 * | 3/2022 | Rezaeian ............... G06F 16/285 |
| 11,941,683 | B2 | 3/2024 | Matsuoka et al. |
| 2010/0257470 | A1 | 10/2010 | Ari et al. |
| 2012/0084248 | A1 * | 4/2012 | Gavrilescu .......... G06F 16/9535 |
| | | | 706/54 |
| 2013/0007648 | A1 | 1/2013 | Gamon |
| 2013/0081036 | A1 | 3/2013 | Cohen et al. |
| 2013/0346234 | A1 | 12/2013 | Hendrick |
| 2014/0040248 | A1 | 2/2014 | Walsham |
| 2015/0019642 | A1 | 1/2015 | Wang |
| 2015/0364057 | A1 | 12/2015 | Catani et al. |
| 2016/0112362 | A1 | 4/2016 | Perazzo |
| 2016/0357794 | A1 | 12/2016 | Liang et al. |
| 2017/0032275 | A1 * | 2/2017 | Lytkin ................... H04L 67/535 |
| 2018/0268821 | A1 | 9/2018 | Levanon |
| 2019/0102203 | A1 | 4/2019 | Wang et al. |
| 2019/0236511 | A1 | 8/2019 | Xu et al. |
| 2019/0325863 | A1 | 10/2019 | Martin |
| 2019/0370350 | A1 * | 12/2019 | Chung .................... H04L 67/02 |
| 2020/0125586 | A1 | 4/2020 | Resaeian et al. |
| 2020/0279556 | A1 | 9/2020 | Gruber et al. |
| 2020/0302404 | A1 | 9/2020 | Shaya et al. |
| 2020/0394595 | A1 | 12/2020 | Fowler et al. |
| 2021/0019846 | A1 | 1/2021 | Kaddoura et al. |
| 2021/0103447 | A1 | 4/2021 | Wei et al. |
| 2022/0012076 | A1 | 1/2022 | Natarajan et al. |
| 2022/0180293 | A1 | 6/2022 | Cahalin et al. |
| 2022/0327494 | A1 | 10/2022 | Deole |

OTHER PUBLICATIONS

International Search Report and Written Opinion mailed Dec. 6, 2022 in International Application PCT/US2022/076020.
Office Action mailed May 23, 2023 in U.S. Appl. No. 17/930,205.
International Preliminary Report on Patentability mailed Mar. 21, 2024 in International Application PCT/US2022/076039.
International Preliminary Report on Patentability mailed Mar. 21, 2024 in International Application PCT/US2022/076020.
International Preliminary Report on Patentability mailed Mar. 21, 2024 in International Application PCT/US2022/076041.
International Search Report and Written Opinion mailed Mar. 4, 2024 in International Application PCT/US2022/076041.
International Preliminary Report on Patentability mailed Mar. 21, 2024 in International Application PCT/US2022/076053.
Office Action mailed Apr. 19, 2024 in U.S. Appl. No. 17/930,302.
Zhao, Qian et al., "Calendar—aware proactive email recommendation," 41st International ACM SIGIR Conference on Research and Development in Information Retrieval, SIGIR 2018, pp. 655-664. Association for Computing Machinery, Inc., Jun. 27, 2018.
Sharvil, Kataruya et al., "A personalized health recommendation system based on smartphone calendar events," Springer Verlag, 2018.
Myers, Karen et al., "An intelligent personal assistant for task and time management," AI Magazine 28.2, vol. 47, No. 15, American Association for Artificial Intelligence. (Jul. 2007-Sep. 2007).
Notice of Allowance mailed Nov. 21, 2023 in U.S. Appl. No. 17/930,205.
International Search Report and Written Opinion mailed Dec. 28, 2022 in International Application PCT/US2022/076039.
Notice of Allowance mailed Sep. 24, 2024 in U.S. Appl. No. 17/930,302.
Office Action mailed Oct. 22, 2024 in U.S. Appl. No. 18/443,574.
Notice of Allowance mailed Oct. 23, 2024 in U.S. Appl. No. 17/930,302.
Office Action mailed Nov. 19, 2024 in U.S. Appl. No. 17/930,320.
Notice of Allowance mailed Feb. 12, 2025 in U.S. Appl. No. 18/443,574.

* cited by examiner

SYSTEMS AND METHODS FOR INGESTING TASK DATA FROM A BROWSER FOR TASK FACILITATION SERVICES

CROSS-REFERENCE TO RELATED APPLICATIONS

This application is related to and claims priority from U.S. provisional patent application No. 63/241,253 filed Sep. 7, 2021, the entire contents of which are fully incorporated by reference herein for all purposes.

TECHNICAL FIELD

This disclosure relates generally to obtaining task-related data from various sources and providing task recommendations to users based on such data and, more particularly, to obtaining data from a web browser to provide corresponding task recommendations for and generate tasks within a task facilitation service.

SUMMARY

Disclosed embodiments may provide approaches for providing task recommendations and generating tasks in a task facilitation service. Recommendations for a given member of the task facilitation are based on data collected about the member through one or more applications associated with the task facilitation service, including data maintained in the form of a user model or profile. The data collected directly by the task facilitation service is supplemented by data from external sources including, but not limited to, third-party applications used by the member, external databases, data for other members collected by the task facilitation service, and other similar data sources. In at least certain implementations, external data is collected through one or more application programming interfaces (APIs) adapted to facilitate communication between the task facilitation service and third-party software components. The task facilitation service uses external data received by the task facilitation service and internal data maintained by the task facilitation service with various models and subsystems of the task facilitation service to provide task recommendations for the member. In at least certain implementations, the task facilitation service also pushes updates to external data sources and applications to synchronize data between the task facilitation service and the external data sources/applications.

In one aspect of the present disclosure, a computer-implemented method is provided. The method includes receiving website data for a website from a browser executed on a user computing device associated with a user. The computer-implemented method further includes processing the website data to generate a task recommendation for a task of the user and transmitting an indication corresponding to the task recommendation. When the indication is received by a computing device, the computing device is enabled to approve the task recommendation to generate a task corresponding to the task recommendation in a task facilitation service.

In one implementation, the computing device is a user computing device corresponding to the user.

In another implementation, the computing device is a representative computing device different than a user computing device corresponding to the user, and the representative computing device corresponds to a representative assigned to the user to facilitate task completion for the user.

In another implementation, the website data includes an address of the website.

In another implementation, the website data includes an address of the website and processing the website data includes accessing the website using the address and supplementing the website data with additional data collected from the website.

In another implementation, the website data includes a keyword for the website.

In another implementation, the computer-implemented method includes receiving approval of the task recommendation and, responsive to receiving approval of the task recommendation, generating the task in the task facilitation service.

In another implementation, processing the website data includes providing the website data to a task prediction model, where the task prediction model is updated based on responses to task recommendations generated by the task prediction model. In such implementations, the computer-implemented method may further include updating the task prediction model using the website data in response to approval or rejection of the task recommendation, Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
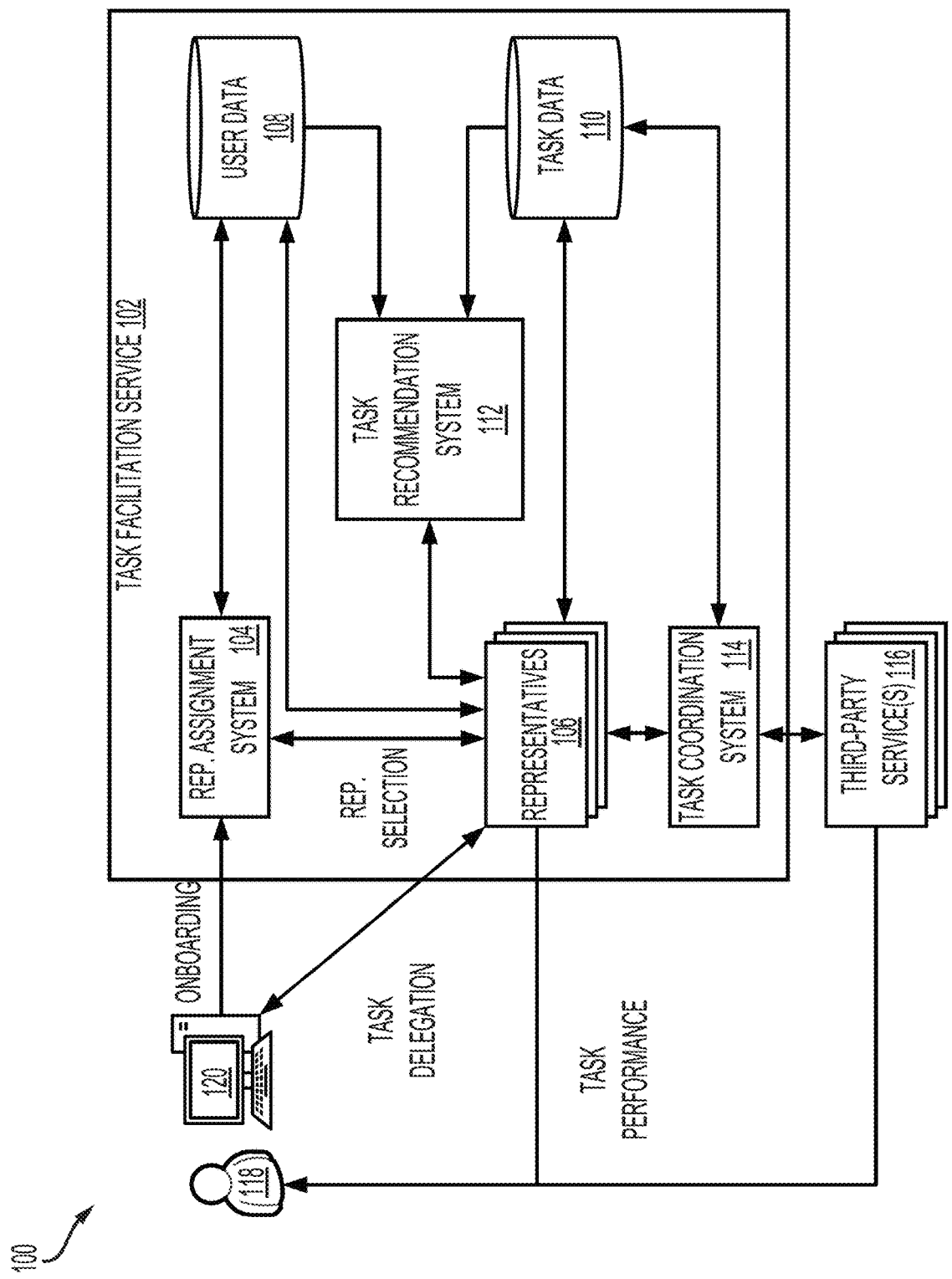
FIG. 1 an illustrative example of an environment in which a task facilitation service assigns a representative to a member through which various tasks performable for the benefit of the member can be recommended for performance by the representative and/or one or more third-party services in accordance with aspects of the present disclosure.

Users regularly implement (e.g., plan, schedule, and/or execute) a variety of tasks that induce varying processing loads (e.g., such as cognitive loads, etc.). A high processing load may prevent a user from implementing other potentially higher priority tasks and/or degrade the efficiency of the user (e.g., slow down implementation of future tasks, cause processing errors, cause task failures, etc.). A user can register with a task facilitation service as a member enabling the task facilitation service to provide load offsetting and/or load-balancing services that reduce the processing load of members by managing the implementation of tasks and projects (e.g., a set of tasks that execute to implement a larger goal). For example, a member can generate a task specification (e.g., also referred to as a "to-do" or "to do") that identifies elements of a task. The task facilitation service may then generate task recommendations and/or generate a proposal (an executable implementation of the task or task specification) that can be presented to the member for execution authorization. Upon receiving authorization from the member, the task facilitation service can facilitate execution of the task.

Facilitating execution of the task can include the task facilitation service or a representative thereof executing the task, transmitting some or all of the task specification to one or more third-party service providers to cause the one or more third-party service providers to execute the task or a portion thereof, and/or a combination thereof. For example, facilitating execution of a task may include executing a portion of the task (e.g., such as planning and/or acquisition activities) and transmitting instructions to one or more third-party service providers to execute another portion of the task.

In some instances, the task facilitation service may further reduce the processing load of some members by anticipating tasks that a member may execute in the future. In those instances, a representative of the task facilitation service, or the task facilitation service itself using an automated process or machine-learning, may predict tasks that are likely to be executed by the member in the future or that the member would approve of. These tasks may be presented to the system as a recommended task. By generating task recommendations, the members may preserve processing resources that would have been consumed identifying tasks for execution. Instead, the task facilitation service may manage the entire lifecycle of a task from conception to implementation.

In some instances, the recommended task may correspond to tasks that the member has previously executed and is likely to execute again in the future. For instance, a member may implement a vehicle-maintenance task such as an oil change every three months. The task facilitation service may detect the pattern and transmit a recommended task to the member that corresponds to the vehicle-maintenance task at the appropriate date. In other instances, the recommended tasks may be based on one or more features derived from data associated with the member. For example, the task facilitation service may receive sensor data from a temperature sensor associated with the member (e.g., such as a device registered to the member, a device operating within a network managed by or associated with the member, etc.) indicating that a heating, ventilation, and air conditioning (HVAC) system requires maintenance (e.g., by detecting that temperatures are above or below average, detecting a time since the last HVAC service, detecting power fluctuations in a circuit that includes the HVAC unit, other sensor measurements being greater than or less than predetermined thresholds, etc.). In response, the task facilitation may generate a recommended task that includes servicing the HVAC system. In still yet other instances, the recommended tasks may be based on data derived about the member. For instance, the task facilitation service may extract features from devices such as media players and/or remote services such as streaming services that are associated with the member. The task facilitation service may use the features to derive an interest of the member such as an interest in a particular musician, film, etc. The task facilitation service may then recommend tasks associated with that interest such as concert tickets, movies tickets, etc. The task facilitation service may use any information associated with the member to recommend tasks that the member may execute in the future or tasks that may benefit the member, which thereby may reduce the processing load of the member and enable the member to execute other tasks.

The present disclosure includes systems and methods for ingesting task data from various sources, such as third-party platforms and applications, for use by a task facilitation service. Relying on the ingested data and other data available to it through interactions with the member, the task facilitation service generates or recommends tasks for the member and for execution by a task facilitation service, a representative thereof, and/or by third-party service providers.

In general, the process of generating or recommending a task includes obtaining data associated with the member, who is generally a user registered with the task facilitation service. The obtained data may correspond to information provided by the member and stored in association with the user model, sensor data from devices associated with the member, information provided by third-party services associated with the member, and the like, as described throughout this disclosure.

In certain implementations, the task facilitation service generates a feature vector from the collected data using a feature-selection process. The feature-selection process may weight features of the feature vector according to a value in which the feature contributes to a likelihood of the feature vector being associated with a particular task. Features with low weights may not contribute to or otherwise be predictive of a particular task, while features with high weights may contribute to or otherwise be predictive of a particular task. The weights, corresponding to particular tasks or task types, may indicate which features should be considered when determining if a particular task or task types should be considered for recommending to the member.

A machine-learning model may execute using the feature vector to generate a set of task recommendations that can be implemented by the task facilitation service or a third-party service of the task facilitation service for the benefit of the member. Alternatively, the set of task recommendations may be generated by an automated process, the representative through one or more interfaces of the task facilitation service, combinations thereof, or the like. A representative of the task facilitation service may process the set of task recommendations to select one or more task recommendations to present to the member as a recommended task. Alternatively, the representative of the task facilitation service may be omitted and the task recommendations (or a subset of the task recommendations) may be presented directly to the member without an intermediary. Task recommendations (e.g., task recommendations selected by the representative or by the task facilitation service) can be presented to the member through one or more interfaces of the task facilitation service (e.g., graphical user interfaces, input/output interfaces, etc.), transmitted to a device or service registered to the member, and/or the like. In some instances, upon receiving input from the member that a task recommendation is authorized, the representative of the task facilitation service may facilitate execution of the task (e.g., cause the task to be executed by the task facilitation service, the representative thereof, and/or one or more third-party service providers of the task facilitation service). Alternatively, input from the member may be provided directly to the task facilitation service without first being received by the representative and the task facilitation service may initiate execution of the task.

In one example implementation, the task facilitation service may receive data directly from a member (e.g., from a member in natural-language communication to a representative of the task facilitation service or to the task facilitation service itself, a member in digital communication with the task facilitation service such as through an interface or the like, etc.), data from one or more devices associated with the member (e.g., sensor devices, Internet-of-Things devices, computing devices, etc.), and/or from one or more remote services (e.g., a service to which the member is registered and/or provides a service to the member). In this example, the data may include a media streaming service (e.g., a first remote service), a calendar (e.g., operating on a device of the member or via a remote service), and a natural language communication to a representative of the task facilitation service indicating that the member would like to schedule a non-work task.

The task facilitation service may then derive a set of features from the received data using a feature-selection process. The task facilitation service may use the set of features to generate one or more task recommendations for the member by, for example, executing a machine-learning model with the set of features, processing the set of features using a representative of the task facilitation service, combinations thereof, or the like. The set of features of this example may include an indication that the member wants to schedule a non-work task, one or more features associated with the members calendar indicating the member's availability for the non-work task, and a musician identified from a media streaming service associated with the member. The task facilitation service may generate a task recommendation that includes tickets to a concert featuring the musician on a particular date in which the member is available. The task recommendation may identify other services such as scheduling transportation (e.g., a vehicle service, airfare, etc.) to the venue, reserving evening accommodations (e.g., at a restaurant, hotel, etc.), and/or the like.

If more than one task recommendation is generated by the task facilitation service, then the representative of the task facilitation service (and/or the task facilitation service itself) may select a particular task recommendation from those generated by the task facilitation service. The particular task recommendation may be transmitted to the member for member authorization. In some instances, upon receiving authorization from the member, the task facilitation service may transmit a task proposal (that includes the implementation details of the task) to the member and when the proposal is authorized by the member, facilitate execution of the task. In other instances, the task facilitation service may facilitate implementation of the task automatically (such as when the preauthorized to do so by the member). Continuing the example above, facilitating implementation of the task may include acquiring and transmitting tickets to the show to the member as well as implementing any of the other services included in the task recommendation authorized by the member (e.g., transportation, evening accommodations, reservations, etc.).

Once the task is executed, the task facilitation service may derive execution metrics corresponding to the task for future task recommendations and proposals. The task facilitation service may obtain task-execution information from the representative of the task facilitation service, the member, any third-party service providers involved in executing the task, IoT devices or other devices associated with the member, applications associated with the member, sensors associated with the member, and/or the like. For example, once a task corresponding to repairing an HVAC unit completes, the task facilitation service may determine details of the repair from the third-party service provider (e.g., type of repair, cost, timeliness of the third-party service or a representative thereof, timeliness of the repair, etc.), details from the member (e.g., automated surveys, member communication with an automated service or a representative, etc.), and sensor information (e.g., temperature sensors indicating a success or failure of the repair, etc.). The information may be used to refine subsequent task recommendations (e.g., reinforcement learning of the machine-learning model, the representative and/or the like), third-party service selections for future tasks, machine-learning algorithms and/or models, and/or the like.

FIG. 1 shows an illustrative example of an environment 100 in which a task facilitation service 102 assigns a representative 106 to a member 118 through which various tasks performable for the benefit of the member 118 can be recommended for performance by the representative 106 and/or one or more third-party services 116 in accordance with various embodiments. The task facilitation service 102 may be implemented to reduce the cognitive load on a member (and others associated with the member) in performing various tasks, which may include, but is not limited to tasks in and around the member's home, by identifying and delegating tasks to representatives 106 that may coordinate performance of these tasks for the benefit of the member. In an embodiment, a member 118, via a computing device 120 (e.g., laptop computer, smartphone, etc.), may submit a request to the task facilitation service 102 to initiate an onboarding process for assignment of a representative 106 to the member 120 and to initiate identification of tasks that are performable for the benefit of the member 118. For instance, the member 118 may access the task facilitation service 102 via an application provided by the task facilitation service 102 and installed onto a computing device 120. Additionally, or alternatively, the task facilitation service 102 may maintain a web server (not shown) that hosts one or more websites configured to present or otherwise make available an interface through which the member 118 may access the task facilitation service 102 and initiate the onboarding process.

During the onboarding process, the task facilitation service 102 may collect identifying information of the member 118, which may be used by a representative assignment system 104 to identify and assign a representative 106 to the member 118. For instance, the task facilitation service 102 may provide, to the member 118, a survey or questionnaire through which the member 118 may provide identifying information usable by the representative assignment system 104 to select a representative 106 for the member 118. For instance, the task facilitation service 102 may prompt the member 118 to provide detailed information with regard to the composition of the member's family (e.g., number of inhabitants in the member's home, the number of children in the member's home, the number and types of pets in the member's home, etc.), the physical location of the member's home, any special needs or requirements of the member 118 (e.g., physical or emotional disabilities, etc.), and the like. In some instances, the member 118 may be prompted to provide demographic information (e.g., age, ethnicity, race, languages written/spoken, socioeconomic status, etc.). The member 118 may also be prompted to indicate any personal interests or hobbies that may be used to identify possible experiences that may be of interest to the member 118 (described in greater detail herein). In some instances, the task facilitation service 102 may prompt the member 118 to specify any tasks that the member 118 would like assistance with or would otherwise like to delegate to another entity, such as a representative and/or third-party.

In an embodiment, the task facilitation service 102 can prompt the member 118 to indicate a level or other measure of trust in delegating tasks to others, such as a representative and/or third-party. For instance, the task facilitation service 102 may utilize the identifying information submitted by the member 118 during the onboarding process to identify initial categories of tasks that may be relevant to the member's day-to-day life. In some instances, the task facilitation service 102 can utilize a machine learning algorithm or artificial intelligence to identify the categories of tasks that may be of relevance to the member 118. For instance, the task facilitation service 102 may implement a clustering algorithm to identify similarly situated members based on one or more vectors (e.g., geographic location, demographic information, likelihood to delegate tasks to others, family composition, home composition, etc.). In some instances, a dataset of input member characteristics corresponding to responses to prompts provided by the task facilitation service 102 provided by sample members (e.g., testers, etc.) may be analyzed using a clustering algorithm to identify different types of members that may interact with the task facilitation service 102. Example clustering algorithms that may trained using sample member datasets (e.g., historical member data, hypothetical member data, etc.) to classify a member in order to identify categories of tasks that may be of relevance to the member may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm generated using the member's identifying information, the task facilitation service 102 may prompt the member 118 to provide responses as to a comfort level in delegating tasks corresponding to the categories of tasks provided by the machine learning algorithm. This may reduce the number of prompts provided to the member 118 and better tailor the prompts to the member's needs.

In an embodiment, the member's identifying information, as well as any information related to the member's level of comfort or interest in delegating different categories of tasks to others, is provided to a representative assignment system 104 of the task facilitation service 102 to identify a representative 106 that may be assigned to the member 118. The representative assignment system 104 may be implemented using a computer system or as an application or other executable code implemented on a computer system of the task facilitation service 102. The representative assignment system 104, in an embodiment, uses the member's identifying information, any information related to the member's level of comfort or interest in delegating tasks to others, and any other information obtained during the onboarding process as input to a classification or clustering algorithm configured to identify representatives that may be well-suited to interact and communicate with the member 118 in a productive manner. For instance, representatives 106 may be profiled based on various criteria, including (but not limited to) demographics and other identifying information, geographic location, experience in handling different categories of tasks, experience in communicating with different categories of members, and the like. Using the classification or clustering algorithm, the representative assignment system 104 may identify a set of representatives 106 that may be more likely to develop a positive, long-term relationship with the member 118 while addressing any tasks that may need to be addressed for the benefit of the member 118.

Once the representative assignment system 104 has identified a set of representatives 106 that may be assigned to the member 118 to serve as an assistant or concierge for the member 118, the representative assignment system 104 may evaluate data corresponding to each representative of the set of representatives 106 to identify a particular representative that can be assigned to the member 118. For instance, the representative assignment system 104 may rank each representative of the set of representatives 106 according to degrees or vectors of similarity between the member's and representative's demographic information. For instance, if a member and a particular representative share a similar background (e.g., attended university in the same city, are from the same hometown, share particular interests, etc.), the representative assignment system 104 may rank the particular representative higher compared to other representatives that may have less similar backgrounds. Similarly, if a member and a particular representative are within geographic proximity to one another, the representative assignment system 104 may rank the particular representative higher compared to other representatives that may be further away from the member 118. Each factor, in some instances, may be weighted based on the impact of the factor on the creation of a positive, long-term relationship between members and representatives. For instance, based on historical data corresponding to member interactions with representatives, the representative assignment system 104 may identify correlations between different factors and the polarities of these interactions (e.g., positive, negative, etc.). Based on these correlations (or lack thereof), the representative assignment system 104 may apply a weight to each factor.

In some instances, each representative of the identified set of representatives 106 may be assigned a score corresponding to the various factors corresponding to the degrees or vectors of similarity between the member's and representative's demographic information. For instance, each factor may have a possible range of scores corresponding to the weight assigned to the factor. As an illustrative example, the various factors used to obtain representative scores may each have a possible score between 1 and 10. However, based on the weight assigned to each factor, the possible score may be multiplied by a weighting factor such that a factor having greater weight may be multiplied by a higher weighting factor compared to a factor having a lesser weight. The result is a set of different scoring ranges corresponding to the importance or relevance of the factor in determining a match between a member 118 and a representative. The scores determined for the various factors may be aggregated to obtain a composite score for each representative of the set of representatives 106. These composite scores may be used to create the ranking of the set of representatives 106.

In an embodiment, the representative assignment system 104 uses the ranking of the set of representatives 106 to select a representative that may be assigned to the member 118. For instance, the representative assignment system 104 may select the highest ranked representative and determine the representative's availability to engage the member 118 in identifying and recommending tasks, coordinating resolution of tasks, and otherwise communicating with the member 118 to assure that their needs are addressed. If the selected representative is unavailable (e.g., the representative is already engaged with one or more other members, etc.), the representative assignment system 104 may select another representative according to the aforementioned ranking and determine the availability of this representative to engage the member 118. This process may be repeated until a representative is identified from the set of representatives 106 that is available to engage the member 118. In some instances, representative availability may be used as a factor used to obtain the aforementioned representative scores, whereby a representative that is unavailable or otherwise does not have sufficient bandwidth to accommodate the new member 118 may be assigned a lower representative score. Accordingly, an unavailable representative may be ranked lower than other representatives that may be available for assignment to the member 118.

In an embodiment, the representative assignment system 104 can select a representative from the set of representatives 106 based on information corresponding to the availability of each representative. For instance, the representative assignment system 104 may automatically select the first available representative from the set of representatives 106. In some instances, the representative assignment system 104 may automatically select the first available representative that satisfies one or more criteria corresponding to the member's identifying information (e.g., a representative whose profile best matches the member profile, etc.). For example, the representative assignment system 104 may automatically select an available representative that is within geographic proximity of the member 118, shares a similar background as that of the member 118, and the like.

In an embodiment, the representative 106 can be an automated process, such as a bot, which may be configured to automatically engage and interact with the member 118. For instance, the representative assignment system 104 may utilize the responses provided by the member 118 during the onboarding process as input to a machine learning algorithm or artificial intelligence to generate a member profile and a bot that may serve as a representative 106 for the member 118. The bot may be configured to autonomously chat with the member 118 to generate tasks and proposals, perform tasks on behalf of the member 118 in accordance with any approved proposals, and the like as described herein. The bot may be configured according to the parameters or characteristics of the member 118 as defined in the member profile. As the bot communicates with the member 118 over time, the bot may be updated to improve the bot's interaction with the member 118.

The representative 106 may operate along with one or more automated services configured to provide information to the representative 106 that may assist the representative 106 in providing service to the member 118 such as, but not limited to suggesting tasks, generating proposals, communicating with service providers and/or other third parties, generating status reports, and/or the like. In some instances, the one or more automated services may automate one or more operations of the representative 106. In those instances, the representative 106 may pre-authorize the one or more automated services to automatically perform operations or confirm the execution of each operation executed by an automated service. For example, some interactions between representative 106 and the member 118 may be facilitated by a bot (e.g., those interactions that may be suitable for automation, those interactions that have been occurred previously with the member 118 or another member, or the like), while other interactions between the representative 106 and the member 118 may be facilitated by a user. In those instances, the interactions may be seamless such that the member 118 may not readily detect whether the given communication was generated by a user or the automated process.

Data associated with the member 118 collected during the onboarding process, as well as any data corresponding to the selected representative, may be stored in a user datastore 108. The user datastore 108 may include an entry corresponding to each member 118 of the task facilitation service 102. The entry may include identifying information of the corresponding member 118, as well as an identifier or other information corresponding to the representative assigned to the member 118. As described in greater detail herein, an entry in the user datastore 108 may further include historical data corresponding to communications between the member 118 and the assigned representative made over time. For instance, as a member 118 interacts with a representative 106 over a chat session or stream, messages exchanged over the chat session or stream may be recorded in the user datastore 108.

In an embodiment, the data associated with the member 118 is used by the task facilitation service 102 to create a member profile corresponding to the member 118. As noted above, the task facilitation service 102 may provide, to the member 118, a survey or questionnaire through which the member 118 may provide identifying information associated with the member 118. The responses provided by the member 118 to this survey or questionnaire may be used by the task facilitation service 102 to generate an initial member profile corresponding to the member 118. The task-facilitation service 102 may also receive information associated with the member 118 from devices associated with the member 118 (e.g., Internet-of-Things devices, sensor-based devices, computing devices, and/or the like that are registered to or operating via a network associated with the member 118), services associated with the member 118 (e.g., services subscribed to by the member 118, etc.), information generated by or derived from users connected to the member 118 (e.g., data associated with other members connected to the member 118 such as friends, family, etc.; social media contacts; etc.), and/or the like. In an embodiment, once the representative assignment system 104 has assigned a representative to the member 118, the task facilitation service 102 can prompt the member 118 to generate a new member profile corresponding to the member 118. For instance, the task facilitation service 102 may provide the member 118 with a survey or questionnaire that includes a set of questions that may be used to supplement the information previously provided during the aforementioned onboarding process. For example, through the survey or questionnaire, the task facilitation service 102 may prompt the member 118 to provide additional information about friends, family members, (and/or other individuals associated with the member 118, important dates (e.g., birthdays, etc.), dietary restrictions, and the like. Based on the responses provided by the member 118, the task facilitation service 102 may update the member profile corresponding to the member 118.

In some instances, the member profile may be accessible to the member 118, such as through an application or web portal provided by the task facilitation service 102. Through the application or web portal, the member 118 may add, remove, or edit any information within the member profile. The member profile, in some instances, may be divided into various sections corresponding to the member, the member's family, the member's home, and the like. Each of these sections may be supplemented based on the data associated with the member 118 collected during the onboarding process and on any responses to the survey or questionnaire provided to the member 118 after assignment of a representative to the member 118. Additionally, each section may include additional questions or prompts that the member 118 may use to provide additional information that may be used to expand the member profile. For example, through the member profile, the member 118 may be prompted to provide any credentials that may be used to access any external accounts (e.g., credit card accounts, retailer accounts, etc.) in order to facilitate completion of tasks.

In an embodiment, certain information within the member profile can be obscured from the member 118 or the representative. For example, as the representative develops a relationship with the member 118 through the completion of various tasks, the representative may modify the member profile to provide notes about the member 118 (e.g., the member's idiosyncrasies, any feedback regarding the member, etc.). Thus, when the member 118 accesses their member profile, these notes may be obscured such that the member 118 may be unable to review these notes or otherwise access any sections of the member profile that have been designated by the representative 118 or the task facilitation service 102 as being unavailable to the member.

The representative assigned to the member 118 may add or otherwise modify information within the member profile based on information shared with the representative and/or the representative's own observations regarding the member 118. Additionally, the task facilitation service 102 may automatically surface relevant portions of the member profile when creating or performing a task on behalf of the member 118. For example, if the representative is generating a task related to meal planning for the member 118, the task facilitation service 102 may automatically identify portions of the member profile that may be contextually relevant to meal planning and surface these portions of the member profile to the representative (e.g., dietary preferences, dietary restrictions, etc.). In some instances, if the representative requires additional information for creating or performing a task on behalf of the member 118, the representative may invite the member 118 to update specific portions of the member profile instead of having the member 118 share the additional information through a chat session or other communications session between the member 118 and the assigned representative.

In an embodiment, once the representative assignment system 104 has assigned a particular representative to the member 118, the representative assignment system 104 notifies the member 118 and the particular representative of the pairing. Further, the representative assignment system 104 may establish a chat session or other communications session between the member 118 and the assigned representative to facilitate communications between the member 118 and representative. For instance, via an application provided by the task facilitation service 102 and installed on the computing device 120 or through a web portal provided by the task facilitation service 102, the member 118 may exchange messages with the assigned representative over the chat session or other communication session. Similarly, the representative may be provided with an interface through which the representative may exchange messages with the member 118.

In some instances, the member 118 may initiate or otherwise resume a chat session with an assigned representative. For example, via the application or web portal provided by the task facilitation service 102, the member may transmit a message to the representative over the chat session or other communication session to communicate with the representative. The member 118 can submit a message to the representative to indicate that the member 118 would like assistance with a particular task. As an illustrative example, the member 118 can submit a message to the representative to indicate that the member 118 would like the representative's assistance with regard to an upcoming move to Denver in the coming months. The representative, via an interface provided by the task facilitation service 102, may be presented with the submitted message. Accordingly, the representative may evaluate the message and generate a corresponding task that is to be performed to assist the member 118. For instance, the representative, via the interface provided by the task facilitation service 102, may access a task generation form, through which the representative may provide information related to the task. The information may include information related to the member 118 (e.g., member name, member address, etc.) as well as various parameters of the task itself (e.g., allocated budget, timeframe for completion of the task, and the like). The parameters of the task may further include any member preferences (e.g., preferred brands, preferred third-party services 116, etc.).

In an embodiment, the representative can provide the information obtained from the member 118 for the task specified in the one or more messages exchanged between the member 118 and representative to a task recommendation system 112 of the task facilitation service 102 to dynamically, and in real-time, identify any additional task parameters that may be required for generating one or more proposals for completion of the task. The task recommendation system 112 may be implemented using a computer system or as an application or other executable code implemented on a computer system of the task facilitation service 102. In an embodiment, the task recommendation system 112 provides the representative with an interface through which the representative may generate a task that may be presented to the member over the chat session (e.g., via the application utilized by the member 118, etc.) and that may be completed by the representative and/or one or more third-party services 116 for the benefit of the member 118. For instance, the representative may provide a name for the task, any known parameters of the task as provided by the member (e.g., budgets, timeframes, task operations to be performed, etc.), and the like. As an illustrative example, if the member 118 transmits the message "Hey Russell, can you help with our move to Denver in 2 months," the representative may evaluate the message and generate a task entitled "Move to Denver." For this task, the representative may indicate that the timeframe for completion of the task is two months, as indicated by the member 118. Further, the representative may add additional information known to the representative about the member. For example, the representative may indicate any preferred moving companies, any budgetary constraints, and the like.

In an embodiment, the task recommendation system 112 provides, to the representative, any relevant information from the member profile corresponding to the member 118 that may be used to generate the task. For example, if the representative generates a new task entitled "Move to Denver," the task recommendation system 112 may determine that the new task corresponds to a move to a new city or other location. Accordingly, the task recommendation system 112 may process the member profile to identify portions of the member profile that may be relevant to the task (e.g., the physical location of the member's home, the number of inhabitants in the member's home, the square footage and number of rooms in the member's home, etc.). The task recommendation system 112 may automatically surface these portions of the member profile to the representative in order to allow the representative to use this information to generate the new task. Alternatively, the task recommendation system 112 may automatically use this information to populate one or more fields within a task template for creation of the new task.

In an embodiment, a representative can access a resource library maintained by the task facilitation service 102 to obtain a task template that may be used to generate a new task that may be performed on behalf of the member 118. The resource library may serve as a repository for different task templates corresponding to different task categories (e.g., vehicle maintenance tasks, home maintenance tasks, family-related event tasks, care giving tasks, experience-related tasks, etc.). A task template may include a plurality of task definition fields that may be used to define a task that may be performed for the benefit of the member 118. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. Thus, each task template maintained in the resource library may include fields that are specific to the task category associated with the task template. In some instances, a representative may further define custom fields for a task template, through which the representative may supply additional information that may be useful in defining and completing the task. These custom fields may be added to the task template such that, if the representative obtains the task template in the future to create a similar task, these custom fields may be available to the representative.

In some instances, if the representative selects a particular task template from the resource library, the task recommendation system 112 may automatically identify relevant portions of the member profile corresponding to the member 118. For instance, each template may be associated with a particular task category, as noted above. Further, different portions of a member profile may similarly be associated with different task categories such that, in response to representative selection of a task template, the task recommendation system 112 may identify the relevant portions of the member profile. From these relevant portions of the member profile, the task recommendation system 112 may automatically obtain information that may be used to populate one or more fields of the selected task template. For example, if the member 118 has indicated in their member profile that they drive a 1620 Subaru Outback, and this information is indicated in a portion of the member profile corresponding to the member's vehicle, the task recommendation system 112 may automatically obtain this information from the member profile to populate fields within the task template corresponding to the make, model, and year of the member's vehicle (e.g., "Make=Subaru," "Model=Outback," "Year=1620," etc.). This may reduce the amount of data entry that the representative is required to perform to populate a task template for a new task.

In an embodiment, based on the task template selected by the representative, the task recommendation system 112 automatically determines what portions of the member profile can be accessed by the representative for creation of the task. For instance, if the representative selects, from the resource library, a task template corresponding to vehicle maintenance tasks (e.g., the task category for the template is designated as "vehicle maintenance"), the task recommendation system 112 may process the member profile to identify one or more portions of the member profile that may be relevant to vehicle maintenance tasks (e.g., make and model of the member's vehicle, the age of the vehicle, information corresponding to the last time the vehicle was maintained, etc.). The task recommendation system 112 may present these relevant portions of the member profile to the representative while obscuring any other portions of the member profile that may not be relevant to the task category selected by the representative. This may prevent the representative from accessing any information from the member profile without a particular need for the information, thereby reducing exposure of the member's information.

In an embodiment, the representative can provide the generated task to the task recommendation system 112 to determine whether additional member input is needed for creation of a proposal that may be presented to the member for completion of the task. The task recommendation system 112, for instance, may process the generated task and information corresponding to the member 118 from the user datastore 108 using a machine learning algorithm or artificial intelligence to automatically identify additional parameters for the task, as well as any additional information that may be required from the member 118 for the generation of proposals. For instance, the task recommendation system 112 may use the generated task, information corresponding to the member 118 (e.g., the member profile), and historical data corresponding to tasks performed for other similarly situated members as input to the machine learning algorithm or artificial intelligence to identify any additional parameters that may be automatically completed for the task and any additional information that may be required of the member 118 for defining the task. For example, if the task is related to an upcoming move to another city, the task recommendation system 112 may utilize the machine learning algorithm or artificial intelligence to identify similarly situated members (e.g., members within the same geographic area of member 118, members having similar task delegation sensibilities, members having performed similar tasks, etc.). Based on the task generated for the member 118, characteristics of the member 118 from the member profile stored in the user datastore 108 and data corresponding to these similarly situated members, the task recommendation system 112 may provide additional parameters for the task. As an illustrative example, for the aforementioned task, "Move to Denver," the task recommendation system 112 may provide a recommended budget for the task, one or more moving companies that the member 118 may approve of (as used by other similarly situated members with positive feedback), and the like. The representative may review these additional parameters and select one or more of these parameters for inclusion in the task.

If the task recommendation system 112 determines that additional member input is required for the task, the task recommendation system 112 may provide the representative with recommendations for questions that may be presented to the member 118 regarding the task. Returning to the "Move to Denver" task example, if the task recommendation system 112 determines that it is important to understand one or more parameters of the member's home (e.g., square footage, number of rooms, etc.) for the task, the task recommendation system 112 may provide a recommendation to the representative to prompt the member 118 to provide these one or more parameters. The representative may review the recommendations provided by the task recommendation system 112 and, via the chat session, prompt the member 118 to provide the additional task parameters. This process may reduce the number of prompts provided to the member 118 in order to define a particular task, thereby reducing the cognitive load on the member 118. In some instances, rather than providing the representative with recommendations for questions that may be presented to the member 118 regarding the task, the task recommendation system 112 can automatically present these questions to the member 118 via the chat session. For instance, if the task recommendation system 112 determines that a question related to the square footage of the member's home is required for the task, the task recommendation system 112 may automatically prompt the member 118, via the chat session, to provide the square footage for the member's home. In an embodiment, information provided by the member 118 in response to these questions may be used to automatically supplement the member profile such that, for future tasks, this information may be readily available to the representative and/or to the task recommendation system 112 for defining new tasks.

In an embodiment, the task facilitation service 102 automatically generates a specific chat or other communications session corresponding to the task. This specific chat or other communications session corresponding to the task may be distinct from the chat session previously established between the member 118 and the representative. Through this task-specific chat or other communications session, the member 118 and the representative may exchange messages related to the particular task. For example, through this task-specific chat or other communications session, the representative may prompt the member 118 for information that may be required to determine one or more parameters of the task. Similarly, if the member 118 has questions related to the particular task, the member 118 may provide these questions through the task-specific chat or other communications session. The implementation of task-specific chat or other communications sessions may reduce the number of messages exchanged through other chat or communications sessions while ensuring that communications within these task-specific chat or other communications sessions are relevant to the corresponding tasks.

In an embodiment, once the representative has obtained the necessary task-related information from the member 118 and/or through the task recommendation system 112 (e.g., task parameters garnered via evaluation of tasks performed for similarly situated members, etc.), the representative can utilize a task coordination system 114 of the task facilitation service 102 to generate one or more proposals for resolution of the task. The task coordination system 114 may be implemented using a computer system or as an application or other executable code implemented on a computer system of the task facilitation service 102. In some examples, the representative may utilize a resource library maintained by the task coordination system 114 to identify one or more third-party services 116 and/or resources (e.g., retailers, restaurants, websites, brands, types of goods, particular goods, etc.) that may be used for performance the task for the benefit of the member 118 according to the one or more task parameters identified by the representative and the task recommendation system 112, as described above. A proposal may specify a timeframe for completion of the task, identification of any third-party services 116 (if any) that are to be engaged for completion of the task, a budget estimate for completion of the task, resources or types of resources to be used for completion of the task, and the like. The representative may present the proposal to the member 118 via the chat session to solicit a response from the member 118 to either proceed with the proposal or to provide an alternative proposal for completion of the task.

In an embodiment, the task recommendation system 112 can provide the representative 106 with a recommendation as to whether the representative should provide the member 118 with a proposal and provide the member 118 with an option to defer to the representative 106 with regard to completion of the defined task. For instance, in addition to providing member and task-related information to the task recommendation system 112 to identify additional parameters for the task, the representative may indicate its recommendation to the task recommendation system 112 to present the member 118 with one or more proposals for completion of the task and to either present or omit an option to defer to the representative for completion of the task. The task recommendation system 112 may utilize the machine learning algorithm or artificial intelligence to generate the aforementioned recommendation. The task recommendation system 112 may utilize the information provided by the representative, as well as data for similarly situated members from the user datastore 108 and task data corresponding to similar tasks from a task datastore 110 (e.g., tasks having similar parameters to the submitted task, tasks performed on behalf of similarly situated members, etc.), to determine whether to recommend presentation of one or more proposals for completion of the task and whether to present the member 118 with an option to defer to the representative for completion of the task.

If the representative determines that the member is to be presented with an option to defer to the representative for completion of the task, the representative may present this option to the member over the chat session. The option may be presented in the form of a button or other graphical user interface (GUI) element that the member may select to indicate its approval of the option. For example, the member may be presented with a "Run With It" button to provide the member with an option to defer all decisions related to performance of the task to the representative. If the member 118 selects the option, the representative may present a proposal that has been selected by the representative for completion of the task on behalf of the member 118 and may proceed to coordinate with one or more third-party services 116 for performance and completion of the task according to the proposal. Thus, rather than allowing the member 118 to select a particular proposal for completion of the task, the representative may instead select a particular proposal on behalf of the member 118. The proposal may still be presented to the member 118 in order for the member 118 to verify how the task is to be completed. Any actions taken by the representative on behalf of the member 118 for completion of the task may be recorded in an entry corresponding to the task in the task datastore 110. Alternatively, if the member 118 rejects the option and instead indicates that the representative is to provide one or more proposals for completion of the task, the representative may generate one or more proposals, as described above.

In an embodiment, the task recommendation system 112 records the member's reaction to being presented with an option to defer to the representative for completion of a task for use in training the machine learning algorithm or artificial intelligence used to make recommendations to the representative for presentation of the option. For instance, if the representative opted to present the option to the member 118, the task recommendation system 112 may record whether the member 118 selected the option or declined the offer and requested presentation of one or more proposals related to the task. Similarly, if the representative opted to present one or more proposals without presenting the option to defer to the representative, the task recommendation system 112 may record whether the member 118 was satisfied with the presentation of these one or more proposals or requested that the representative select a proposal on the member's behalf, thus deferring to the representative for completion of the task. These member reactions, along with data corresponding to the task, the representative's actions (e.g., presentation of the option, presentation of proposals, etc.), and the recommendation provided by the task recommendation system 112 may be stored in the task datastore 110 for use by the task recommendation system 112 in training and/or reinforcing the machine learning algorithm or artificial intelligence.

In an embodiment, the representative can suggest one or more tasks based on member characteristics, task history, and other factors. For instance, as the member 118 communicates with the representative over the chat session, the representative may evaluate any messages from the member 118 to identify any tasks that may be performed to reduce the member's cognitive load. As an illustrative example, if the member 118 indicates, over the chat session, that their spouse's birthday is coming up, the representative may utilize its knowledge of the member 118 to develop one or more tasks that may be recommended to the member 118 in anticipation of their spouse's birthday. The representative may recommend tasks such as purchasing a cake, ordering flowers, setting up a unique travel experience for the member 118, and the like. In some embodiments, the representative can generate task suggestions without member input. For instance, as part of the onboarding process, the member 118 may provide the task facilitation service 102 with access to one or more member resources, such as the member's calendar, the member's personal fitness devices (e.g., fitness trackers, exercise equipment having communication capabilities, etc.), the member's vehicle data, and the like. Data collected from these member resources may be monitored by the representative, which may parse the data to generate task suggestions for the member 118.

In an embodiment, the data collected from a member 118 over a chat session with the representative may be evaluated by the task recommendation system 112 to identify one or more tasks that may be presented to the member 118 for completion. For instance, the task recommendation system 112 may utilize natural language processing (NLP) or other artificial intelligence to evaluate received messages or other communications from the member 118 to identify an intent. An intent may correspond to an issue that a member 118 wishes to have resolved. Examples of intents can include (for example) topic, sentiment, complexity, and urgency. A topic can include, but is not limited to, a subject, a product, a service, a technical issue, a use question, a complaint, a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). The intent may be used by the NLP algorithm or other artificial intelligence to identify possible tasks that may be recommended to the member 118. For instance, the task recommendation system 112 may process any incoming messages from the member 118 using NLP or other artificial intelligence to detect, based on an identified intent, a new task or other issue that the member 118 would like to have resolved. In some instances, the task recommendation system 112 may utilize historical task data and corresponding messages from the task datastore 110 to train the NLP or other artificial intelligence to identify possible tasks. If the task recommendation system 112 identifies one or more possible tasks that may be recommended to the member 118, the task recommendation system 112 may present these possible tasks to the representative, which may select tasks that can be shared with the member 118 over the chat session.

In some examples, the task recommendation system 112 can utilize computer vision or other artificial intelligence to process images or video recordings provided by the member 118 to identify potential tasks that may be recommended to the member 118 for completion. For instance, the representative may prompt the member 118 to record images or video during a walkthrough of the member's home to identify potential tasks that may be completed for the benefit of the member 118. As an illustrative example, the member 118 may use a mobile device (e.g., smartphone, digital video recorder, etc.) to record digital images or video related to a damaged baseboard that needs repair. These digital images or video may be processed by the task recommendation system 112 in real-time to detect the damaged baseboard, identify the possible scope of repairs required to the baseboard, and possible tasks that may be performed to repair the damaged baseboard. Additionally, while the digital images or video may be related to the damaged baseboard, the task recommendation system 112 may further process the digital images or video to identify additional and/or alternative issues for which tasks may be recommended. For example, if the task recommendation system 112 detects that, in addition to a damaged baseboard, the member 118 may be experiencing a termite issue within the baseboard, the task recommendation system 112 may recommend a task corresponding to extermination of the detected termites. Thus, the task recommendation system 112, using computer vision or other artificial intelligence, may detect possible issues that the member 118 may not be aware of.

In an embodiment, the task recommendation system 112 can generate a list of possible tasks that may be presented to the member 118 for completion to reduce the member's cognitive load. For instance, based on an evaluation of data collected from different member sources (e.g., personal fitness or biometric devices, video and audio recordings, etc.), the task recommendation system 112 may identify an initial set of tasks that may be completed for the benefit of the member 118. Additionally, the task recommendation system 112 can identify additional and/or alternative tasks based on external factors. For example, the task recommendation system 112 can identify seasonal tasks based on the member's geographic location (e.g., foliage collection, gutter cleaning, etc.). As another example, the task recommendation system 112 may identify tasks performed for the benefit of other members within the member's geographic region and/or that are otherwise similarly situated (e.g., share one or more characteristics with the member 118). For instance, if various members within the member's neighborhood are having their gutters cleaned or driveways sealed for winter, the task recommendation system 112 may determine that these tasks may be performed for the benefit of the member 118 and may be appealing to the member 118 for completion.

In an embodiment, the task recommendation system 112 can use the initial set of tasks, member-specific data from the user datastore 108 (e.g., characteristics, demographics, location, historical responses to recommendations and proposals, etc.), data corresponding to similarly-situated members from the user datastore 108, and historical data corresponding to tasks previously performed for the benefit of the member 118 and the other similarly-situated members from the task datastore 110 as input to a machine learning algorithm or artificial intelligence to identify a set of tasks that may be recommended to the member 118 for performance. For instance, while an initial set of tasks may include a task related to gutter cleaning, based on the member's preferences, the member 118 may prefer to perform this task themself. As such, the output of the machine learning algorithm or artificial intelligence (e.g., the set of tasks that may be recommended to the member 118) may omit this task. Further, in addition to the set of tasks that may be recommended to the member 118, the output of the machine learning algorithm or artificial intelligence may specify, for each identified task, a recommendation for presentation of the button or other GUI element that the member 118 may select to indicate that it would like to defer to the representative for performance of the task, as described above.

A listing of the set of tasks that may be recommended to the member 118 may be provided to the representative for a final determination as to which tasks may be presented to the member 118 through task-specific interfaces (e.g., a communications session specific to these tasks, etc.). In an embodiment, the task recommendation system 112 can rank the listing of the set of tasks based on a likelihood of the member 118 selecting the task for delegation to the representative for performance and/or coordination with third-party services 116. Alternatively, the task recommendation system 112 may rank the listing of the set of tasks based on the level of urgency for completion of each task. The level of urgency may be determined based on member characteristics (e.g., data corresponding to a member's own prioritization of certain tasks or categories of tasks) and/or potential risks to the member 118 if the task is not performed. For example, a task corresponding to replacement or installation of carbon monoxide detectors within the member's home may be ranked higher than a task corresponding to the replacement of a refrigerator water dispenser filter, as carbon monoxide filters may be more critical to member safety. As another illustrative example, if a member 118 places significant importance on the maintenance of their vehicle, the task recommendation system 112 may rank a task related to vehicle maintenance higher than a task related to other types of maintenance. As yet another illustrative example, the task recommendation system 112 may rank a task related to an upcoming birthday higher than a task that can be completed after the upcoming birthday.

The representative may review the set of tasks recommended by the task recommendation system 112 and select one or more of these tasks for presentation to the member 118 via task-specific interfaces corresponding to these tasks. Further, as described above, the representative may determine whether a task is to be presented with an option to defer to the representative for performance of the task (e.g., with a button or other GUI element to indicate the member's preference to defer to the representative for performance of the task). In some instances, the one or more tasks may be presented to the member 118 according to the ranking generated by the task recommendation system 112. Alternatively, the one or more tasks may be presented according to the representative's understanding of the member's own preferences for task prioritization. Through an interface provided by the task facilitation service 102, the member 118 may access any of the task-specific interfaces related to these tasks to select one or more tasks that may be performed with the assistance of the representative. The member 118 may alternatively dismiss any presented tasks that the member 118 would rather perform personally or that the member 118 does not otherwise want performed.

In an embodiment, the task recommendation system 112 can automatically select one or more of the tasks for presentation to the member 118 via a task-specific interface without representative interaction. For instance, the task recommendation system 112 may utilize a machine learning algorithm or artificial intelligence to select which tasks from the listing of the set of tasks previously ranked by the task recommendation system 112 may be presented to the member 118 through task-specific interfaces. As an illustrative example, the task recommendation system 112 may use the member profile corresponding to the member 118 (which can include historical data corresponding to member-representative communications, member feedback corresponding to representative performance and presented tasks/proposals, etc.), from the user datastore 108, tasks currently in progress for the member 118, and the listing of the set of tasks as input to the machine learning algorithm or artificial intelligence. The output generated by the machine learning algorithm or artificial intelligence may indicate which tasks of the listing of the set of tasks are to be presented automatically to the member 118 via task-specific interfaces corresponding to these tasks. As the member 118 interacts with these newly presented tasks, the task recommendation system 112 may record these interactions and use these interactions to further train the machine learning algorithm or artificial intelligence to better determine which tasks to present to member 118 and other similarly situated members.

In an embodiment, the task recommendation system 112 can monitor the chat session between the member 118 and the representative, as well as member interactions with task-specific interfaces provided by the task facilitation service 102 and related to different tasks that may be performed on behalf of the member 118 to collect data with regard to member selection of tasks for delegation to the representative for performance. For instance, the task recommendation system 112 may process messages corresponding to tasks presented to the member 118 by the representative over the chat session, as well as any interactions with the task-specific interfaces corresponding to these tasks (e.g., any task-specific communications sessions, member creation of discussions related to particular tasks, etc.) to determine a polarity or sentiment corresponding to each task. For instance, if a member 118 indicates, in a message to the representative, that it would prefer not to receive any task recommendations corresponding to vehicle maintenance, the task recommendation system 112 may ascribe a negative polarity or sentiment to tasks corresponding to vehicle maintenance. Alternatively, if a member 118 selects a task related to gutter cleaning for delegation to the representative and/or indicates in a message to the representative that recommendation of this task was a great idea, the task recommendation system 112 may ascribe a positive polarity or sentiment to this task. In an embodiment, the task recommendation system 112 can use these responses to tasks recommended to the member 118 to further train or reinforce the machine learning algorithm or artificial intelligence utilized to generate task recommendations that can be presented to the member 118 and other similarly situated members of the task facilitation service 102.

In an embodiment, in addition to recommending tasks that may be performed for the benefit of the member 118, a representative may recommend one or more curated experiences that may be appealing to the member 118 to take their mind off of urgent matters and to spend more time on themselves and their families. As noted above, during an onboarding process, a member 118 may be prompted to indicate any of its interests or hobbies that the member 118 finds enjoyable. Further, as the representative continues its interactions with the member 118 over the chat session, the representative may prompt the member 118 to provide additional information regarding its interests in a natural way. For instance, a representative may ask the member 118 "what will you be doing this weekend?" Based on the member response, the representative may update the member profile to indicate the member's preferences. Thus, over time, the representative and the task facilitation service 102 may develop a deeper understanding of the member's interests and hobbies.

In an embodiment, the task facilitation service 102 generates, in each geographic market in which the task facilitation service 102 operates, a set of experiences that may be available to members. For instance, the task facilitation service 102 may partner with various organizations within each geographic market to identify unique and/or time-limited experience opportunities that may be of interest to members of the task facilitation service. Additionally, for experiences that may not require curation (e.g., hikes, walks, etc.), the task facilitation service 102 may identify popular experiences within each geographic market that may be appealing to its members. The information collected by the task facilitation service 102 may be stored in a resource library or other repository accessible to the task recommendation system 112 and the various representatives 106.

In an embodiment, for each available experience, the task facilitation service 102 can generate a template that includes both the information required from a member 118 to plan the experience on behalf of the member 118 and a skeleton of what the proposal for the experience recommendation will look like when presented to the member 118. This may make it easier for a representative to complete definition of task(s) associated with the experience. In some instances, the template may incorporate data from various sources that provide high-quality recommendations, such as travel guides, food and restaurant guides, reputable publications, and the like. In an embodiment, if the representative selects a particular template for creation of a task associated with an experience, the task recommendation system 112 can automatically identify the portions of the member profile that may be used to populate the template. For example, if the representative selects a template corresponding to an evening out at a restaurant, the task recommendation system 112 may automatically process the member profile to identify any information corresponding to the member's dietary preferences and restrictions that may be used to populate one or more fields within the task template selected by the representative.

In an embodiment, the task recommendation system 112, periodically (e.g., monthly, bi-monthly, etc.) or in response to a triggering event (e.g., a set number of tasks are performed, member request, etc.), selects a set of experiences that may be recommended to the member 118. For instance, similar to the identification of tasks that may be recommended to the member 118, the task recommendation system 112 may use at least the set of available experiences and the member's preferences from the user datastore 108 as input to a machine learning algorithm or artificial intelligence to obtain, as output, a set of experiences that may be recommended to the member 118. The task recommendation system 112, in some instances, may present this set of experiences to the member 118 over the chat session on behalf of the representative or through task-specific interfaces corresponding to each of the set of experiences. Each experience recommendation may specify a description of the experience and any associated costs that may be incurred by the member 118. Further, for each experience recommendation presented, the task recommendation system 112 may provide a button or other GUI element that may be selectable by the member 118 to request curation of the experience for the member 118.

If the member 118 selects a particular experience recommendation corresponding to an experience that the member 118 would like to have curated on its behalf, the task recommendation service 112 or representative may generate one or more new tasks related to the curation of the selected experience recommendation. For instance, if the member 118 selects an experience recommendation related to a weekend picnic, the task recommendation system 112 or representative may add a new task to the member's tasks list such that the member 118 may evaluate the progress in completion of the task. Further, the representative may ask the member 118 particularized questions related to the selected experience to assist the representative in determining a proposal for completion of tasks associated with the selected experience. For example, if the member 118 selects an experience recommendation related to the curation of a weekend picnic, the representative may ask the member 118 as to how many adults and children will be attending, as this information may guide the representative in curating the weekend picnic for all parties and to identify appropriate third-party services 116 and possible venues for the weekend picnic. The responses provided by the member 118 may be used to update the member profile such that, for similar experiences and related tasks, these responses may be used to automatically obtain information that may be used for curation of the experience.

Similar to the process described above for the completion of a task for the benefit of a member 118, the representative can generate one or more proposals for curation of a selected experience. For instance, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 118 over a chat or communications session specific to the experience (e.g., a task-specific interface corresponding to the particular experience) and via the application or web portal provided by the task facilitation service 102. Based on the member responses to the various options presented in the proposal, the representative may indicate that it is starting the curation process for the experience. Further, the representative may provide information related to the experience that may be relevant to the member 118. For example, if the member 118 has selected an option to pick-up food from a selected restaurant for a weekend picnic, the representative may provide detailed driving directions from the member's home to the restaurant to pick up the food (this would not be presented if the member 118 had selected a delivery option), detailed driving directions from the restaurant to the selected venue, parking information, a listing of the food that is to be ordered, and the total price of the food order. The member 118 may review this proposal and may determine whether to accept the proposal. If the member 118 accepts the proposal, the representative may proceed to perform various tasks to curate the selected experience.

Once a member 118 has selected a particular proposal for a particular task or has selected a button or other GUI element associated with the particular task to indicate that it wishes to defer to the representative for performance of the task, if the task is to be completed using third-party services 116, the representative may coordinate with one or more third-party services 116 for completion of the task for the benefit of the member 118. For instance, the representative may utilize a task coordination system 114 of the task facilitation service 102 to identify and contact one or more third-party services 116 for performance of a task. As noted above, the task coordination system 114 may include a resource library that includes detailed information related to third-party services 116 that may be available for the performance of tasks on behalf of members of the task facilitation service 102. For example, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative may query the resource library to identify the one or more third-party services that are to perform the task and determine an estimated cost for performance of the task. In some instances, the representative may contact the one or more third-party services 116 to obtain quotes for completion of the task and to coordinate performance of the task for the benefit of the member 118.

In some instances, the resource library may further include detailed information corresponding to other services and other entities that may be associated or affiliated with the task facilitation service 102 and that are contracted to perform various tasks on behalf of members of the task facilitation service 102. These other services and other entities may provide their services or goods at rates agreed upon with the task facilitation service 102. Thus, if the representative selects any of these other services or other entities from the resource library, the representative may be able to determine the particular parameters (e.g., price, availability, time required, etc.) for completion of the task.

In an embodiment, for a given task, the representative (such as through a web portal or application provided by the task facilitation service) can query the resource library to identify one or more third-party services and other services/entities affiliated with the task facilitation service 102 from which to solicit quotes for completion of the task. For instance, for a newly created task, the representative may transmit a job offer to these one or more third-party services and other services/entities. The job offer may indicate various characteristics of the task that is to be completed (e.g., scope of the task, general geographic location of the member 118 or of where the task is to be completed, desired budget, etc.). Through an application or web portal provided by the task facilitation service 102, a third-party service or other service/entity may review the job offer and determine whether to submit a quote for completion of the task or to decline the job offer. If a third-party service or other service/entity opts to reject the job offer, the representative may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative may use any provided quotes from the third-party services and/or other services/entities to generate different proposals for completion of the task. These different proposals may be presented to the member 118 through the task-specific interface corresponding to the particular task that is to be completed. If the member 118 selects a particular proposal from the set of proposals presented through the task-specific interface, the representative may transmit a notification to the third-party service or other service/entity that submitted the quote associated with the selected proposal to indicate that it has been selected for completion of the task. Accordingly, the representative may utilize a task coordination system 114 to coordinate with the third-party service or other service/entity for completion of the task.

In some instances, if the task is to be completed by the representative 106, the representative 106 may utilize the task coordination system 114 of the task facilitation service 102 to identify any resources that may be utilized by the representative 106 for performance of the task. The resource library may include detailed information related to different resources available for performance of a task. As an illustrative example, if the representative 106 is tasked with purchasing a set of filters for the member's home, the representative 106 may query the resource library to identify a retailer that may sell filters of a quality and/or price that is acceptable to the member 118 and that corresponds to the proposal accepted by the member 118. Further, the representative 106 may obtain, from the user datastore 108, available payment information of the member 118 that may be used to provide payment for any resources required by the representative 106 to complete the task. Using the aforementioned example, the representative 106 may obtain payment information of the member 118 from the user datastore 108 to complete a purchase with the retailer for the set of filters that are to be used in the member's home.

In an embodiment, the task coordination system 114 uses a machine learning algorithm or artificial intelligence to select one or more third-party services 116 and/or resources on behalf of the representative for performance of a task. For instance, the task coordination system 114 may utilize the selected proposal or parameters related to the task (e.g., if the member 118 has deferred to the representative for determination of how the task is to be performed), as well as historical task data from the task datastore 110 corresponding to similar tasks as input to the machine learning algorithm or artificial intelligence. The machine learning algorithm or artificial intelligence may produce, as output, a listing of one or more third-party services 116 that may perform the task with a high probability of satisfaction to the member 118. If the task is to be performed by the representative 106, the machine learning algorithm or artificial intelligence may produce, as output, a listing of resources (e.g., retailers, restaurants, brands, etc.) that may be used by the representative 106 for performance of the task with a high probability of satisfaction to the member 118. As noted above, the resource library may include, for each third-party service 116, a rating or score associated with the satisfaction with the third-party service 116 as determined by members of the task facilitation service 102. Further, the resource library may include a rating or score associated with the satisfaction with each resource (e.g., retailers, restaurants, brands, goods, materials, etc.) as determined by members of the task facilitation service 102. For example, when a task is completed, the representative may prompt the member 118 to provide a rating or score with regard to the performance of a third-party service in completing a task for the benefit of the member 118. As another example, if the task is performed by the representative 106, the representative may prompt the member 118 to provide a rating or score with regard to the representative's performance and to the resources utilized by the representative for completion of the task. Each rating or score is associated with the member that provided the rating or score, such that the task coordination system 114 may determine, using the machine learning algorithm or artificial intelligence, a likelihood of satisfaction for performance of a task based on the performance of the third-party service or of the satisfaction with the resources utilized by representatives with regard to similar tasks for similarly situated members. The task coordination system 114 may generate a listing of recommended third-party services 116 and/or resources for performance of a task, whereby the listing may be ranked according to the likelihood of satisfaction (e.g., score or other metric) assigned to each identified third-party service and/or resource.

In some instances, if the task cannot be completed by the third-party service or other service/entity according to the estimates provided in the selected proposal, the member 118 may be provided with an option to cancel the particular task or otherwise make changes to the task. For instance, if the new estimated cost for performance of the task exceeds the maximum amount specified in the selected proposal, the member 118 may ask the representative to find an alternative third-party service or other service/entity for performance of the task within the budget specified in the proposal. Similarly, if the timeframe for completion of the task is not within the timeframe indicated in the proposal, the member 118 can ask the representative to find an alternative third-party service or other service/entity for performance of the task within the original timeframe. The member's interventions may be recorded by the task recommendation system 112 and the task coordination system 114 to retrain their corresponding machine learning algorithms or artificial intelligence to better identify third-party services 116 and/or other services/entities that may perform tasks within the defined proposal parameters.

In an embodiment, once the representative has contracted with one or more third-party services 116 or other services/entities for performance of a task, the task coordination system 114 may monitor performance of the task by these third-party services 116 or other services/entities. For instance, the task coordination system 114 may record any information provided by the third-party services 116 or other services/entities with regard to the timeframe for performance of the task, the cost associated with performance of the task, any status updates with regard to performance of the task, and the like. The task coordination system 114 may associate this information with the data record in the task datastore 110 corresponding to the task being performed. Status updates provided by third-party services 116 or other services/entities may be provided automatically to the member 118 via the application or web portal provided by the task facilitation service 102 and to the representative.

In an embodiment, if the task is to be performed by the representative 106, the task coordination system 114 can monitor performance of the task by the representative 106. For instance, the task coordination system 114 may monitor, in real-time, any communications between the representative 106 and the member 118 regarding the representative's performance of the task. These communications may include messages from the representative 106 indicating any status updates with regard to performance of the task, any purchases or expenses incurred by the representative 106 in performing the task, the timeframe for completion of the task, and the like. The task coordination system 114 may associate these messages from the representative 106 with the data record in the task datastore 110 corresponding to the task being performed.

In some instances, the representative may automatically provide payment for the services and/or goods provided by the one or more third-party services 116 on behalf of the member 118 or for purchases made by the representative for completion of a task. For instance, during an onboarding process, the member 118 may provide payment information (e.g., credit card numbers and associated information, debit card numbers and associated information, banking information, etc.) that may be used by a representative to provide payment to third-party services 116 or for purchases to be made by the representative 106 for the benefit of the member 118. Thus, the member 118 may not be required to provide any payment information to allow the representative 106 and/or third-party services 116 to initiate performance of the task for the benefit of the member 118. This may further reduce the cognitive load on the member 118 to manage performance of a task.

As noted above, once a task has been completed, the member 118 may be prompted to provide feedback with regard to completion of the task. For instance, the member 118 may be prompted to provide feedback with regard to the performance and professionalism of the selected third-party services 116 in performance of the task. Further, the member 118 may be prompted to provide feedback with regard to the quality of the proposal provided by the representative and as to whether the performance of the task has addressed the underlying issue associated with the task. Using the responses provided by the member 118, the task facilitation service 102 may train or otherwise update the machine learning algorithms or artificial intelligence utilized by the task recommendation system 112 and the task coordination system 114 to provide better identification of tasks, creation of proposals, identification of third-party services 116 and/or other services/entities for completion of tasks for the benefit of the member 118 and other similarly-situated members, identification of resources that may be provided to the representative 106 for performance of a task for the benefit of the member 118, and the like.

It should be noted that for the processes described herein, various operations performed by the representative 106 may be additionally, or alternatively, performed using one or more machine learning algorithms or artificial intelligence. For example, as the representative 106 performs or otherwise coordinates performance of tasks on behalf of a member 118 over time, the task facilitation service 102 may continuously and automatically update the member profile according to member feedback related to the performance of these tasks by the representative 106 and/or third-party services 116. In an embodiment, the task recommendation system 112, after a member's profile has been updated over a period of time (e.g., six months, a year, etc.) or over a set of tasks (e.g., twenty tasks, thirty tasks, etc.), may utilize a machine learning algorithm or artificial intelligence to automatically and dynamically generate new tasks based on the various attributes of the member's profile (e.g., historical data corresponding to member-representative communications, member feedback corresponding to representative performance and presented tasks/proposals, etc.) with or without representative interaction. The task recommendation system 112 may automatically communicate with the member 118 to obtain any additional information required for new tasks and automatically generate proposals that may be presented to the member 118 for performance of these tasks. The representative 106 may monitor communications between the task recommendation system 112 and the member 118 to ensure that the conversation maintains a positive polarity (e.g., the member 118 is satisfied with its interaction with the task recommendation system 112 or another bot, etc.). If the representative 106 determines that the conversation has a negative polarity (e.g., the member 118 is expressing frustration, the task recommendation system 112 or bot is unable to process the member's responses or asks, etc.), the representative 106 may intervene in the conversation. This may allow the representative 106 to address any member concerns and perform any tasks on behalf of the member 118.

Thus, unlike automated customer service systems and environments, wherein these systems and environment may have little to no knowledge of the users interacting with agents or other automated systems, the task recommendation system 112 can continuously update the member profile to provide up-to-date historical information about the member 118 based on the member's automatic interaction with the system or interaction with the representative 106 and on the tasks performed on behalf of the member 118 over time. This historical information, which may be automatically and dynamically updated as the member 118 or the system interacts with the representative 106 and as tasks are devised, proposed, and performed for the member 118 over time, may be used by the task recommendation system 112 to anticipate, identify, and present appropriate or intelligent responses to member 118 queries, needs, and/or goals.

Figure 2:
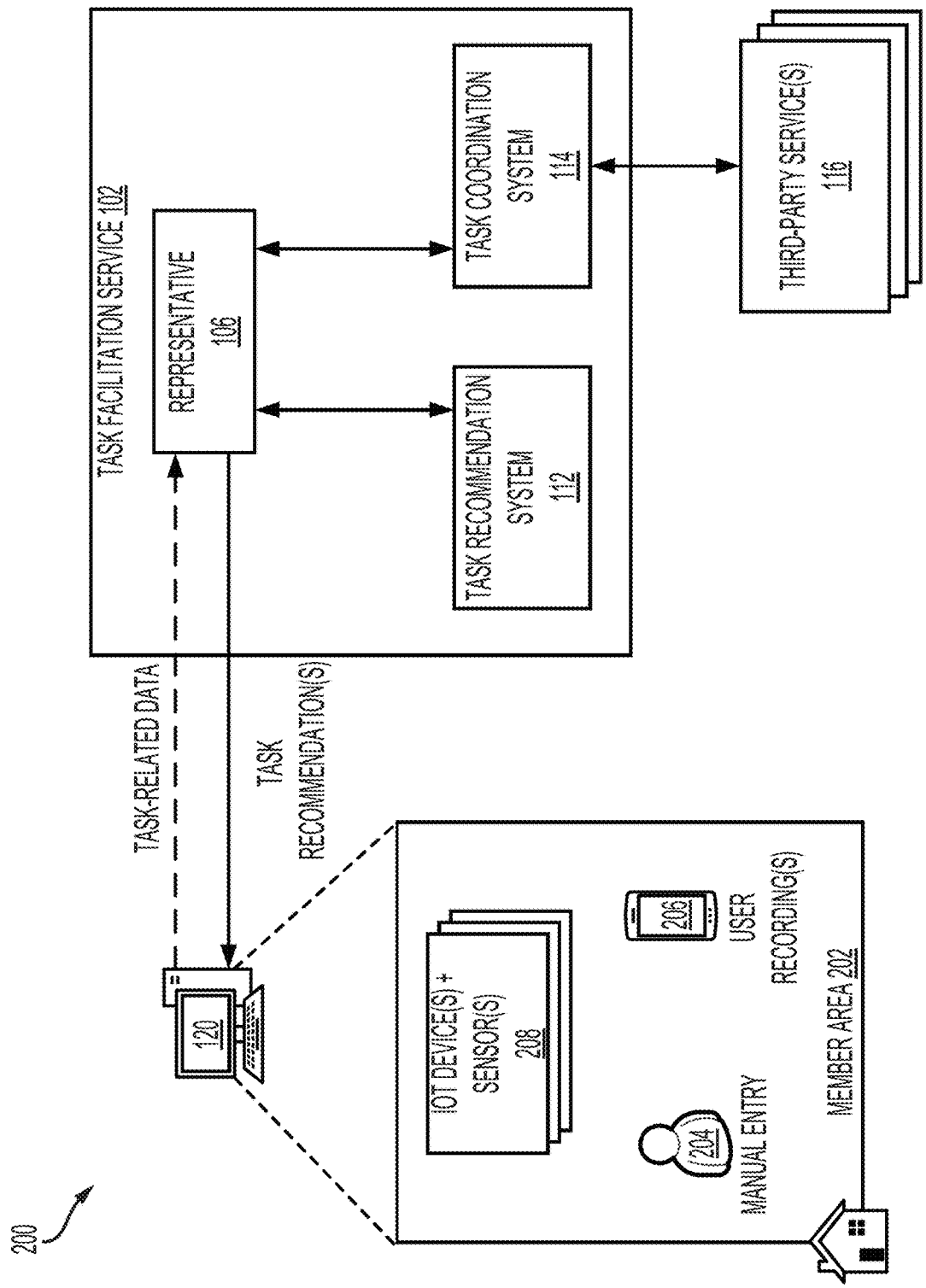
FIG. 2 shows an illustrative example of an environment in which task-related data is collected and aggregated from a member area to identify one or more tasks that can be recommended to the member for performance by a representative and/or third-party services in accordance with aspects of the present disclosure.

FIG. 2 shows an illustrative example of an environment 200 in which task-related data is collected and aggregated from a member area 202 to identify one or more tasks that can be recommended to the member for performance by a representative 106 and/or third-party services 116 in accordance with aspects of the present disclosure. In the environment 200, a member, via a computing device 120 (e.g., laptop computer, smartphone, etc.), may transmit task-related data to the representative 106 assigned to the member to identify one or more tasks that may be performed for the benefit of the member. For example, the member can manually enter one or more tasks that the member would like to delegate to the representative 106 for performance. The task facilitation service 102 may provide, to the member and via an application or web portal provided by the task facilitation service 102, an option for manual entry 204 of a task that may be delegated to the representative 106 or that may otherwise be added to the member's list of tasks.

If the member selects an option for manual entry 204 of a task, the task facilitation service 102 may provide, via an interface of the application or web portal, a task template through which the member may enter various details related to the task. The task template may include various fields through which the member may provide a name for the task, a description of the task (e.g., "I need to have my gutters cleaned before the upcoming storm," "I'd like to have painters touch up my powder room," etc.), a timeframe for performance of the task (e.g., a specific deadline date, a date range, a level of urgency, etc.), a budget for performance of the task (e.g., no budget limitation, a specific maximum amount, etc.), and the like.

In some instances, if the member selects an option for manual entry 304 of a task, the task facilitation service 102 may provide the member with different task templates that may be used to generate a new task. As noted above, the task facilitation service may maintain a resource library that serves as a repository for different task templates corresponding to different task categories (e.g., vehicle maintenance tasks, home maintenance tasks, family-related event tasks, care giving tasks, experience-related tasks, etc.). A task template may include a plurality of task definition fields that may be used to define a task that may be performed for the benefit of the member. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. Thus, each task template maintained in the resource library may include fields that are specific to the task category associated with the task template.

Through the resource library, the member may evaluate each of the available task templates to select a particular task template that may be strongly associated with the new task the member wishes to create. Once the member has selected a particular task template, the member may populate one or more task definition fields that may be used to define a task that may be performed for the benefit of the member. These fields may be specific to the task category associated with the task template. In some instances, based on the selected task template, the task facilitation service 102 may automatically populate one or more task definition fields based on information specified within the member profile, as described above.

In some examples, the task template provided to the member may be tailored specifically according to the characteristics of the member identified by the task facilitation service 102. As noted above, the task facilitation service 102, during a member onboarding process, may generate a member profile or model for the member that may be used to identify and recommend tasks and proposals to the member over time. The member profile or model may define a set of attributes of the member that may be used by a representative 106 to determine how best to approach the member in conversation, in recommending tasks and proposals to the member, and in performance of the tasks for the benefit of the member. These attributes may include a measure of member behavior or preference in delegating certain categories of tasks to others or in performing certain categories of tasks itself. These member attributes may indicate whether the member is concerned with budgets, with brand recognition, with reviews (e.g., restaurant reviews, product reviews, etc.), with punctuality, with speed of response, and the like. Based on these member attributes, the task facilitation service 102 may omit particular fields from the task template. For example, if a member attribute specifies that the member is not concerned with budgets for completion of tasks, the task facilitation service 102 may omit a field from the task template corresponding to the member's budget for the task. As another illustrative example, if the task facilitation service 102 determines that the member prefers either high-end or top-rated brands for performance of its tasks, the task facilitation service 102 may omit one or more fields corresponding to selection or identification of brands for performance of the task, as the task facilitation service 102 may utilize a resource library to identify high-end or top-rated brands for the performance of the task.

If the member submits, via the computing device 120 or through an interface provided by the task facilitation service 102, a task template corresponding to a task that is to be performed for the benefit to the member, the representative 106 assigned to the member may obtain and evaluate the completed task template to determine how best to perform the task for the benefit of the member. For instance, the representative 106 may evaluate the completed task template and generate a new task for the member corresponding to the task-related details provided by the completed task template. Further, based on the representative's knowledge of the member (e.g., from interaction with the member, from the member profile, etc.), the representative 106 may determine whether to prompt the member for additional information that may be used to determine how best to perform the task. For instance, if the member has indicated that the member wants their gutters cleaned but has not indicated when the gutters should be cleaned via the completed task template, the representative 106 may communicate with the member via an active communication session to inquire as to the timeframe for cleaning of the gutters. As another example, if the member has submitted a task without a particular budget for performance of the task, and the representative 106 knows (e.g., based on the member profile, personal knowledge of the member, etc.) that the member is budget-conscious, the representative 106 may communicate with the member to determine what the budget should be for performance of the task. Any information obtained may be used to supplement the member profile such that, for future tasks, this newly obtained information may be automatically retrieved from the member profile without requiring additional prompts to the member.

In some examples, a member can submit a request to the representative 106 to generate a project for which one or more tasks may be determined by the representative 106 and/or by the task recommendation system 112 or that otherwise may include one or more tasks that are to be completed for the project. For example, via the chat session established between the member and the assigned representative 106, the member may indicate that it would like to initiate a project. As an illustrative example, a member may transmit a message to the representative 106 that the member would like help in planning a move to Denver in August. In response to this message, the representative 106 may identify one or more tasks that may be involved with this project (e.g., move to Denver) and generate these one or more tasks for presentation to the member. For instance, the representative 106 may generate tasks including, but not limited to, defining a moving budget, finding a moving company, purging any unwanted belongings, coordinating utilities at the present location and at the new location, and the like. These tasks may be presented to the member via an interface specific to the project to allow the member to evaluate each of these tasks associated with the project and coordinate with the representative 106 to determine how each of these tasks may be performed (e.g., the member performs certain tasks itself, the member delegates certain tasks to the representative, the member defines parameters for performance of the tasks, etc.).

If the member requests creation of a project that includes one or more tasks that are to be performed as part of the project, an interface specific to the project may be created. The project interface may include links or other graphical user interface (GUI) elements corresponding to each of the tasks associated with the project. Selection of a particular link or other GUI element corresponding to a particular task associated with the project may cause the task facilitation service 102 to present an interface specific to the particular task. Through this interface, the member may communicate with the representative 106 to exchange messages related to the particular task, to review proposals related to the particular task, to monitor performance of the particular task, and the like.

In some examples, messages exchanged between the member and the representative 106 may be processed by the task recommendation system 112 to identify potential projects and/or tasks that may be recommended to the representative 106 for presentation to the member. As noted above, the task recommendation system 112 may utilize NLP or other artificial intelligence to evaluate exchanged messages or other communications from the member to identify possible tasks that may be recommended to the member. For instance, the task recommendation system 112 may process any incoming messages from the member using NLP or other artificial intelligence to detect a new project, new task, or other issue that the member would like to have resolved. In some instances, the task recommendation system 112 may utilize historical task data and corresponding messages from a task datastore to train the NLP or other artificial intelligence to identify possible tasks. If the task recommendation system 112 identifies one or more possible projects and/or tasks that may be recommended to the member, the task recommendation system 112 may present these possible tasks to the representative 106, which may select projects and/or tasks that can be shared with the member over the chat session.

In some examples, if the task recommendation system 112 identifies a project that may be proposed to the member based on messages exchanged between the member and the representative 106, the task recommendation system 112 can utilize a resource library maintained by the task facilitation service 102 to identify one or more tasks associated with the project that may be recommended to the representative 106. For example, if the task recommendation system 112 identifies a project related to the member's indication that it is preparing to move to Denver, the task recommendation system 112 may query the resource library to identify any tasks associated with a move to a new location. In some instances, the query to the resource library may include member attributes from the member profile. This may allow the task recommendation system 112 to identify any tasks that may have been performed or otherwise proposed to similar members (e.g., members in similar geographic locations, members having similar attributes to that of the present member, etc.) for similar projects.

In some examples, the task recommendation system 112 uses a machine learning algorithm or other artificial intelligence to identify the tasks that may be recommended to the representative 106 for an identified project. For example, the task recommendation system 112 may identify, from the aforementioned resource library, any tasks that may be associated with the identified project. The task recommendation system 112 may process the identified tasks and the member profile using the machine learning algorithm or other artificial intelligence to determine which of the identified tasks may be recommended to the representative 106 for presentation to the member. Further, the task recommendation system 112 may provide, to the representative 106, any tasks that may need to be performed for the benefit of the member with an option to defer to the representative 106 for completion of the task. For example, if the task recommendation system 112 determines that, based on the member profile, that the member is likely to fully delegate a task to the representative 106 without need to review or provide any other input, the task recommendation system 112 may provide the task to the representative 106 with a recommendation to present an option to the member to defer performance of the task to the representative 106 (such as through a "Run With It" button).

In some instances, the task recommendation system 112 may provide a listing of the set of tasks that may be recommended to the member to the representative 106 for a final determination as to which tasks may be presented to the member. As noted above, the task recommendation system 112 can rank the listing of the set of tasks based on a likelihood of the member selecting the task for delegation to the representative for performance and coordination with third-party services 116 or other services/entities affiliated with the task facilitation service 102. Alternatively, the task recommendation system 112 may rank the listing of the set of tasks based on the level of urgency for completion of each task. For example, if the task recommendation system 112 determines that a task corresponding to the hiring of a moving company is of greater urgency that a task corresponding to the coordination of utilities, the task recommendation system 112 may rank the former task higher than the latter task.

In some examples, if the task recommendation system 112 identifies a project that may be created based on the messages exchanged between the member and the representative 106, and the task recommendation system 112 identifies one or more tasks associated with the identified project, the task recommendation system 112, via the representative 106, may provide the member with a project definition and the tasks associated with the identified project to obtain the member's approval to proceed with the project. For instance, via an application or web portal provided by the task facilitation service 102 and accessed through a computing device 120, the member may review the proposed project and the associated tasks to determine whether to proceed with the proposed project. The member may communicate with the representative 106 to further define the project and/or any tasks associated with the project, including defining the scope of the project and of any of the tasks proposed for completion of the project. As an illustrative example, if the representative 106 through a project-specific communications session proposes a project corresponding to the member's upcoming move to Denver and any tasks associated with this proposed project, the member may communicate with the representative 106 to discuss the proposed project and the associated tasks (e.g., inquire about timelines, inquire about budgets, etc.). Based on the member's communications with the representative 106, the representative 106 and/or task recommendation system 112 may identify any questions that may be provided to the member to further define the scope of the project and any associated tasks. For example, the representative 106 may prompt the member to indicate the amount of square footage in their existing home, which may be useful in determining the scope of moving services that may be required for the project corresponding to the upcoming move to Denver. Information obtained through member responses to these prompts may be used to supplement the member profile.

In some examples, once the member has approved a particular project that is to be executed for the benefit of the member, the task recommendation system 112 assigns a priority to the project and the associated tasks based on input from the member (e.g., deadlines, desired priority, etc.). For example, if the member has indicated that the project associated with an upcoming move to Denver is more pressing than projects related to vehicle maintenance, the task recommendation system 112 may prioritize the project associated with the upcoming move to Denver over other projects related to vehicle maintenance. This may cause the application or the web portal accessed by the member via the computing device 120 to more prominently display the project related to the upcoming move to Denver over these other projects. In some instances, the priority assigned to a particular project may further be assigned to the tasks associated with the project. For example, the task recommendation system 112 may use the priority of each of the projects created for the member as another factor in ranking the various tasks identified by the representative 106 and/or task recommendation system 112.

Tasks associated with a project may be added to an active queue that may be used by the task recommendation system 112 to determine which tasks a representative 106 may work on for the benefit of the member. For instance, a representative 106 may be presented with a limited set of tasks that the representative 106 based on the prioritization or ranking of tasks performed by the task recommendation system 112. The selection of a limited set of tasks may limit the number of tasks that may be worked on by the representative 106 at any given time, which may reduce the risk to the representative 106 of being overburdened with working on a member's task list.

In some examples, the task facilitation service 102 can present the member, via the application implemented on the member's computing device 120 or accessed via a web portal provided by the task facilitation service 102, a task list corresponding to the member's current and upcoming tasks. The task facilitation service 102 may provide, via the task list, the status of each task (e.g., created, in-progress, recurring, completed, etc.). In some instances, the task facilitation service 102 may allow the member to filter tasks as needed such that the member can customize and determine which tasks are to be presented to the member via the application or web portal.

The task facilitation service 102, in addition to presenting the task list corresponding to the member's current and upcoming tasks, may signal which of these tasks are assigned to the member or to the representative 106. For instance, the task facilitation service 102 may display an assignment tag to each task presented to the member via the application or web portal. The assignment tag may explicitly indicate whether a corresponding task is assigned to the member or to the representative 106. Additionally, or alternatively, a task may be presented to the member via the application or web portal using color coding, wherein the color used for the task may further indicate whether the task is assigned to the member or to the representative 106. As an illustrative example, if a task is assigned to the representative 106, the task may be presented with a "REPRESENTATIVE" attribute tag and within a task bubble using a shade of orange to further indicate that the task is assigned to the representative 106. Alternatively, if a task is assigned to the member, the task may be presented with a "MEMBER" attribute tag and within a task bubble using a shade of green to further indicate that the task is assigned to the member. It should be noted that while attribute tags and color indicators are used throughout the present disclosure for the purpose of illustration, other assignment indicators may be utilized to differentiate tasks assigned to the member and tasks assigned to the representative 106.

In some examples, the task facilitation service 102 can provide members, via the application or web portal, with options to obtain more information about specific tasks from the task list. For instance, each task presented via the task list may include an option to obtain more information related to the task. In some examples, if a member selects an option to obtain more information for a particular task, the task facilitation service 102 can evaluate the member profile to determine how much information is to be provided to the member without increasing the likelihood of cognitive overload for the member. For instance, if the member has a propensity to delegate tasks to the representative 106 and generally delegates all aspects of a task to the representative 106, the task facilitation service 102 may provide basic information associated with the task (e.g., short task description, estimated completion time for the task, etc.). However, if the member is more detail oriented and is heavily involved in the completion of tasks, the task facilitation service 102 may provide more information associated with the task (e.g., detailed task description, steps being performed to complete the task, any budget information for the task, etc.). In some examples, the task facilitation service 102 can utilize a machine learning algorithm or artificial intelligence to determine how much information related to a task should be presented to the member 102. For instance, the task facilitation service 102 may use the member profile and data corresponding to the task as input to the machine learning algorithm or artificial intelligence. The resulting output may provide a recommendation as to what information regarding the task should be presented to the member. In some instances, the recommendation can be provided to the representative 106, which may evaluate the recommendation and determine what information may be presented to the member for the selected task. When information for a task is provided to the member, the task facilitation service 102 may monitor member interaction with the representative 106 to identify the member's response to the presentation of the information. The response may be used to further train the machine learning algorithm or artificial intelligence to provide better recommendations with regard to task information that may be presented to members of the task facilitation service 102.

In some examples, a member, via a computing device 120, can submit one or more user recordings 206 that may be used to identify tasks that can be performed for the benefit of the member. For instance, a member may upload, to the task facilitation service 102, one or more digital images of the member area 202 that may be indicative of issues within the member area 202 for which tasks may be created. As an illustrative example, the member may capture an image of a broken baseboard that needs repair. As another illustrative example, the member may capture an image of a clogged gutter. The representative 106 may obtain these digital images and manually identify one or more tasks that may be performed to address the issues represented in the uploaded digital images. For instance, if the representative 106 receives a digital image that illustrates a broken baseboard, the representative 106 may generate a new task corresponding to the repair of the broken baseboard. Similarly, if the representative 106 receives a digital image that illustrates a clogged gutter, the representative 106 may generate a task corresponding to the cleaning of the member's gutters.

User recordings 206 may further include audio and/or video recordings within the member area 202 corresponding to possible issues for which tasks may be generated. For instance, the member may utilize their smartphone or other recording device to generate an audio and/or video recording of different portions of the member area 202 to highlight issues that may be used to generate one or more tasks that may be performed to address the issues. As an illustrative example, during a chat session with the representative 106, a member may walk through the member area 202 with their smartphone and record a video highlighting issues that the member would like addressed by the task facilitation service 102. During this walkthrough of the member area 202, the member may indicate (e.g., by speaking into the smartphone, pointing at issues, etc.) what these issues are and possible instructions or other parameters for addressing these issues (e.g., timeframes, budgets, level of urgency, etc.). Using the example of the broken baseboard described above, the member may record a video highlighting the broken baseboard while indicating "I would like to have this baseboard fixed soon as we're getting ready to sell the house." This video, thus, may highlight an issue related to a broken baseboard and a level of urgency in having the baseboard repaired within a short timeframe due to the member selling their home.

The member, via the computing device 120, may provide the user recordings 206 to the representative 106, which may review the user recordings 206 to identify any tasks that may be recommended to the member to address any of the issues indicated by the member in the user recordings 206. For instance, the representative 106 may analyze the provided user recordings 206 and identify tasks that may be performed to address any issues identified by the member in the user recordings 206 and/or detected by the representative 106 based on its analysis of the user recordings 206. As an illustrative example, if the member provider a user recording 206 in which the member indicates that there is a broken baseboard that the member would like repaired, the representative 106 may additionally determine, based on the user recording 206, that the member's home may have a termite issue (e.g., presence of termites or termite damage in the broken baseboard). As such, the representative 106 may communicate with the member over the chat session to indicate the additional issue and recommend a task to address the additional issue.

In some instances, the representative 106 may prompt the member to generate one or more user recordings 206 (e.g., one or more images, audio segments, video segments, alphanumeric strings, and/or the like) that may be used to assist the representative 106 in defining one or more tasks that may be performed for the benefit of the member. For example, if the member indicates, via the chat session, that it is preparing to move to Denver, the representative 106 may request that the member generate one or more user recordings 206 related to the member area 202 (e.g., home, apartment, etc.) so that the representative 106 may identify tasks that may be associated with this project. For instance, using the user recordings 206 provided by the member, the representative 106 may determine the square footage of the member area 202, identify any special moving requirements for completion of the project (e.g., special moving instructions for fragile items, insurance, etc.), identify any repair or maintenance items that may need to be addressed for the project, and the like. In some instances, the representative 106 may use the user recordings 206 to identify one or more task parameters that may be used in defining a task to be performed for the benefit of the member. For instance, if the member has manually entered a new task related to repairing their broken baseboard, the representative 106 may use any user recordings 206 associated with the broken baseboard to identify the type of baseboard that is to be repaired, the scope of the repair, the timeframe for the repair, and the like.

In some examples, the representative 106 can provide the user recordings 206 submitted by the member to the task recommendation system 112 to identify any projects and/or tasks that may be recommended to the member. As noted above, the task recommendation system 112 may use member-specific data (e.g., characteristics, demographics, location, historical responses to recommendations and proposals, etc.), data corresponding to similarly-situated members, and historical data corresponding to tasks previously performed for the benefit of the member and the other similarly-situated members as input to a machine-learning algorithm or artificial intelligence to identify a set of tasks that may be recommended to the member for performance. Further, the task recommendation system 112 may utilize computer vision, NLP, and/or other artificial intelligence to process the user recordings 206 provided by the member to identify any potential tasks that may be recommended to the member. For example, if the task recommendation system 112 (using computer vision or other artificial intelligence to process video recordings) detects that, in addition to a damaged baseboard, the member may be experiencing a termite issue within the baseboard, the task recommendation system 112 may recommend a task corresponding to the extermination of the detected termites.

As another example, if the member, in a user recording 206, states "I have thought about painting this room but I just haven't found the time to do it," the task recommendation system 112 may utilize NLP or other artificial intelligence to identify a possible task related to painting of the identified room. Using the user recording 206, the task recommendation system 112 may further utilize computer vision or other artificial intelligence to evaluate the identified room (e.g., square footage, furniture in the room, lighting in the room, etc.) to identify one or more parameters associated with the painting task (e.g., amount of paint that may be required, the colors that may be recommended to the member, a possible budget for completion of the painting task, etc.). Thus, the task recommendation system 112 may utilize computer vision, NLP, and/or other machine-learning algorithms or artificial intelligence to process user recordings 206 to identify possible tasks and parameters associated with these identified possible tasks.

In some examples, the task-facilitation service 102 can also obtain task-related data from various IoT devices and/or sensors 208 within the member area 202. For instance, if the member maintains a smart thermostat within the member area 202 that monitors performance of a member's heating, ventilation, and air conditioning (HVAC) system, the smart thermostat may transmit data to the task-facilitation service 102 related to the performance and maintenance of the HVAC system. For example, the smart thermostat may transmit a notification to the task-facilitation service 102 indicating that it is recommended for the member to change the air filters within the member area 202. As another example, the smart thermostat may transmit a notification to indicate a fault or other issue related to the HVAC system (e.g., furnace malfunction, compressor failure, etc.). Further, the smart thermostat may transmit data related to the environment in the member area 202 (e.g., temperature readings, humidity level readings, energy usage readings, etc.).

The task-facilitation service 102 may utilize the task-related data from the various IoT devices and/or sensors 208 to identify any potential tasks that may be recommended to the member and/or to support existing tasks (e.g., recurring tasks related to maintaining a temperature in the member area 202, tasks related to maintaining a particular light level within a room, etc.). For instance, if the task-facilitation service 102 receives a notification from an IoT device within the member area 202 that it is time for the member to change out the air filters for the member's HVAC system, the task-facilitation service 102, via the task recommendation system 112, may automatically generate a task recommendation that may be presented to the representative 106 for the replacement of the member's existing air filters. As another example, if the task-facilitation service 102 receives a notification from one or more IoT devices and/or sensors 208 that the member's HVAC system has failed (e.g., furnace malfunction, compressor failure, etc.), the task recommendation system 112 may automatically generate a task recommendation that may be presented to the representative 106 for repairing the member's HVAC system. The presentation of the task and corresponding parameters to the member may be determined by the representative 106 and/or the task recommendation system 112 as described above.

In some examples, the task facilitation system 102 implements a data model that may be used to enable communication between the various IoT devices and/or sensors 208 within the member area 202, applications utilized by the member (e.g., smartphone applications, etc.), and the task-facilitation service 102. The data model may provide a common data representation among the various IoT devices and/or sensors 208, the applications utilized by the member, and the task-facilitation service 102. For instance, a light fixture, a window shade, a smoke detector, and a television within the member area 202 may all include an ambient light sensor. Each of these devices may utilize the same data representation of the sensor readings, which may enable the task-facilitation service 102, via an automated lighting adjustment algorithm, to process these sensor readings from all devices without concern about device type. Further, the addition of any new device may enable for the contribution to the input without any changes to the algorithm.

In some examples, the various IoT devices and/or sensors 208, as well as all other devices and services in the ecosystem (e.g., the member's mobile devices, the task-facilitation service 102, etc.) utilize the data model to ensure that there is no need for data translation between any device communications. As an illustrative example, a member may utilize an application on its mobile device to communicate with an IoT device over a local network or via the task-facilitation service 102 to control the IoT device from any location. The IoT devices and/or sensors 208, applications implemented on a member's computing device 120 to control these IoT devices and/or sensors 208, and the task-facilitation service 102 may thus rely on the data model to enable communications amongst these elements of the ecosystem.

In some examples, the task-facilitation service 102 can use the data model to assign each IoT device and/or sensor 208, application, or any other actor (e.g., cloud service hosting a feature, etc.) with a unique identifier. The task-facilitation service 102 may utilize these unique identifiers to generate logical groupings of devices to facilitate certain features. These logical groupings may be generated based on location (e.g., bedroom, kitchen, etc.) and/or space (e.g., indoor, outdoor, vehicular, etc.). These groupings may enable group control. For instance, if a member submits a task to prepare a bedroom for sleep, the task facilitation system 102 may identify the devices associated with the bedroom and perform any operations defined by the member for sleep preparation. These groups may further enable data analysis, whereby the task-facilitation service 102 may use readings from devices in the logical grouping to make a determination about the immediate environment. For example, based on readings from devices in the member's living room, the task-facilitation service 102 may determine whether it is likely that a window is open, affecting the performance of the member's HVAC system.

In some examples, the task-facilitation service 102, via the data model, can dictate that all published data is to include metadata that specifies the time of data generation. This may ensure that any delay in publication of data does not skew any algorithms that rely on this data. For example, if a device generating occupancy data loses network connectivity for a brief period, data generated during this brief period may include, as metadata, a timestamp corresponding to the time that the occupancy events occurred. The data may be preserved and published as soon as connectivity is restored. This allows for the consumer of this data to determine when these occupancy events occurred and react accordingly.

In some examples, the data model implemented by the task-facilitation service 102 also provides a sequential numbering system for all published data. This sequential numbering system may provide a mechanism to detect any loss of data and retrieve any lost data. For instance, if data is lost in transit, the consumer of the data may be able to detect a gap in the numbering, which may denote the data loss. The data model may provide a protocol for the consumer of data to request republishing of any missing data. For instance, the consumer may submit a request to an IoT device and/or sensor to retrieve any data having numbers corresponding to the gap in data obtained by the consumer.

In some examples, a representative 106 can generate one or more proposals for completion of any given task presented to the member via the application or web portal provided by the task facilitation service 102. A proposal may include one or more options presented to a member that may be created and/or collected by a representative 106 while researching a given task. In some instances, a representative 106 may be provided with one or more templates that may be used to generate these one or more proposals. For example, the task facilitation service 102 may maintain proposal templates for different task types, whereby a proposal template for a particular task type may include various data fields associated with the task type. As an illustrative example, for a task associated with planning a birthday party, a representative 106 may utilize a proposal template corresponding to event planning. The proposal template corresponding to event planning may include data fields corresponding to venue options, catering options, entertainment options, and the like.

In some examples, the data fields within a proposal template can be toggled on or off to provide a representative 106 with the ability to determine what information is presented to the member in a proposal. For example, for a task associated with renting a balloon jump house for a party, a corresponding proposal template may include data fields corresponding to the location/address of a rental business, the business hours and availability of the rental business, an estimated cost, ratings/reviews for the rental business, and the like. The representative 106, based on its knowledge of the member's preferences, may toggle on or off any of these data fields. For example, if the representative 106 has established a relationship with the member whereby the representative 106, with high confidence, knows that the member trusts the representative 106 in selecting reputable businesses for its tasks, the representative 106 may toggle off a data field corresponding to the ratings/reviews for corresponding businesses from the proposal template. Similarly, if the representative 106 knows that the member is not interested in the location/address of the rental business for the purpose of the proposal, the representative 106 may toggle off the data field corresponding to the location/address for corresponding businesses from the proposal template. While certain data fields may be toggled off within the proposal template, the representative 106 may complete these data fields to provide additional information that may be used by the task facilitation service 102 to supplement a resource library of proposals as described in greater detail herein.

In some examples, the task facilitation service 102 utilizes a machine learning algorithm or artificial intelligence to generate recommendations for the representative 106 regarding data fields that may be presented to the member in a proposal. For example, the task facilitation service 102 may use, as input to the machine learning algorithm or artificial intelligence, a member profile or model associated with the member, historical task data for the member (e.g., previously completed tasks, tasks for which proposals have been provided, etc.), and information corresponding to the task for which a proposal is being generated (e.g., a task type or category, etc.). The output of the machine learning algorithm or artificial intelligence may define which data fields of a proposal template should be toggled on or off. For example, if the task facilitation service 102 determines, based on an evaluation of the member profile or model, historical task data for the member, and the information corresponding to the task for which the proposal is being generated, that the member is likely not interested in viewing information related to the ratings/reviews for the business nor the location/address of the business, the task facilitation service 102 may automatically toggle off these data fields from the proposal template. The task facilitation service 102, in some instances, may retain the option to toggle on these data fields in order to provide the representative 106 with the ability to present these data fields to the member in a proposal. For example, if the task facilitation service 102 has automatically toggled off a data field corresponding to the estimated cost for a balloon jump house rental from a particular business, but the member has expressed an interest in the possible cost involved, the representative 106 may toggle on the data field corresponding to the estimated cost.

In some instances, when a proposal is presented to a member, the task facilitation service 102 may monitor member interaction with the representative 106 and with the proposal to obtain data that may be used to further train the machine learning algorithm or artificial intelligence. For example, if a representative 106 presents a proposal without any ratings/reviews for a particular business based on the recommendation generated by the machine learning algorithm or artificial intelligence, and the member indicates (e.g., through messages to the representative 106, through selection of an option in the proposal to view ratings/reviews for the particular business, etc.) that they are interested in ratings/reviews for the particular business, the task facilitation service may utilize these feedback to further train the machine learning algorithm or artificial intelligence to increase the likelihood of recommending presentation of ratings/reviews for businesses selected for similar tasks or task types.

In some examples, the task facilitation service 102 maintains, via the task coordination system 114, a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 106 generates a proposal for a task related to repairing a roof near Lynnwood, Washington, the task coordination system 114 may obtain information associated with the roofer selected by the representative 106 for the task. The task coordination system 114 may generate an entry corresponding to the roofer in the resource library and associate this entry with "roof repair" and "Lynnwood, Washington." Thus, if another representative receives a task corresponding to repairing a roof for a member located near Lynnwood, Washington (e.g., Everett, Washington), the other representative may query the resource library for roofers near Lynnwood, Washington. The resource library may return, in response to the query, an entry corresponding to the roofer previously selected by the representative 106. If the other representative selects this roofer, the task coordination system 114 may automatically populate the data fields of the proposal template with the information available for the roofer from the resource library.

In some examples, the task facilitation service 102 can utilize a machine learning algorithm or artificial intelligence to automatically process the member profile associated with the member 118, the selected proposal template, and the resource library to dynamically identify any resources that may be relevant for preparation of the proposal. The machine learning algorithm or artificial intelligence may be trained using supervised training techniques. For instance, a dataset of sample member profiles, proposal templates and/or tasks, available resources (e.g., entries corresponding to third-party services, other services/entities, retailers, goods, etc.), and completed proposals can be selected for training of the machine learning model. The machine learning model may be evaluated to determine, based on the sample inputs supplied to the machine learning model, whether the machine learning model is identifying appropriate resources that may be used to automatically complete a proposal template for presentation of a proposal. Based on this evaluation, the machine learning model may be modified to increase the likelihood of the machine learning model generating the desired results. The machine learning model may further be dynamically trained by soliciting feedback from representatives and members of the task facilitation service with regard to the identification of resources from the resource library and to the proposals automatically generated by the task facilitation service 102 using these resources. For instance, if the task facilitation service 102 generates, based on the member profile associated with the member 118 and the selected resources from the resource library, a proposal that is not appealing to the member 118 (e.g., the proposal is not relevant to the task, the proposal corresponds to resources that are not available to the member 118, the proposal includes resources that the member 118 disapproves of, etc.), the task facilitation service 102 may update the machine learning algorithm or artificial intelligence based on this feedback to reduce the likelihood of similar resources and proposals being generated for similarly-situated members.

The representative 106, via a proposal template, may generate additional proposal options for businesses and/or products that may be used for completion of a task. For instance, for a particular proposal, the representative 106 may generate a recommended option, which may correspond to the businesses or products that the representative 106 is recommending for completion of a task. Additionally, in order to provide the member with additional options or choices, the representative 106 can generate additional options corresponding to other businesses or products that may complete the task. In some instances, if the representative 106 knows that the member has delegated the decision-making with regard to completion of a task to the representative 106, the representative 106 may forego generation of additional proposal options outside of the recommended option. However, the representative 106 may still present, to the member, the selected proposal option for completion of the task in order to keep the member informed about the status of the task.

In some examples, once the representative 106 has completed defining a proposal via use of a proposal template, the task facilitation service 102 may present the proposal to the member through the application or web portal provided by the task facilitation service 102. In some instances, the representative 106 may transmit a notification to the member to indicate that a proposal has been prepared for a particular task and that the proposal is ready for review via the application or web portal provided by the task facilitation service 102. The proposal presented to the member may indicate the task for which the proposal was prepared, as well as an indication of the one or more options that are being provided to the member. For instance, the proposal may include links to the recommended proposal option and to the other options (if any) prepared by the representative 106 for the particular task. These links may allow the member to navigate amongst the one or more options prepared by the representative 106 via the application or web portal.

For each proposal option, the member may be presented with information corresponding to the business (e.g., third-party service or other service/entity associated with the task facilitation service 102) or product selected by the representative 106 and corresponding to the data fields selected for presentation by the representative 106 via the proposal template. For example, for a task associated with a roof inspection at the member's home, the representative 106 may present for a particular roofer (e.g., proposal option) one or more reviews or testimonials for the roofer, the rate and availability for the roofer subject to the member's task completion timeframe (if any), the roofer's website, the roofer's contact information, any estimated costs, and an indication of next steps for the representative 106 should the member select this particular roofer for the task. In some instances, the member may select what details or data fields associated with a particular proposal are presented via the application or web portal. For example, if the member is presented with the estimated total for each proposal option and the member is not interested in reviewing the estimated total for each proposal option, the member may toggle off this particular data field from the proposal via the application or web portal. Alternatively, if the member is interested in reviewing additional detail with regard to each proposal option (e.g., additional reviews, additional business or product information, etc.), the member may request this additional detail to be presented via the proposal.

In some examples, based on member interaction with a provided proposal, the task facilitation service 102 can further train a machine learning algorithm or artificial intelligence used to determine or recommend what information should be presented to the member and to similarly-situated members for similar tasks or task types. As noted above, the task facilitation service 102 may use a machine learning algorithm or artificial intelligence to generate recommendations for the representative 106 regarding data fields that may be presented to the member in a proposal. The task facilitation service 102 may monitor or track member interaction with the proposal to determine the member's preferences regarding the information presented in the proposal for the particular task. Further, the task facilitation service 102 may monitor or track any messages exchanged between the member and the representative 106 related to the proposal to further identify the member's preferences. For example, if the member sends a message to the representative 106 indicating that the member would like to see more information with regard to the services offered by each of the businesses specified in the proposal, the task facilitation service 102 may determine that the member may want to see additional information with regard to the services offered by businesses associated with the particular task or task type. In some instances, the task facilitation service 102 may solicit feedback from the member with regard to proposals provided by the representative 106 to identify the member's preferences. This feedback and information garnered through member interaction with the representative 106 regarding the proposal and with the proposal itself may be used to retrain the machine learning algorithm or artificial intelligence to provide more accurate or improved recommendations for information that should be presented to the member and to similarly situated members in proposals for similar tasks or task types.

In some instances, each proposal presented to the member may specify any costs associated with each proposal option. These costs may be presented in different formats based on the requirements of the associated task or project. For instance, if a task or project corresponds to the purchase of an airline ticket, each proposal option for the corresponding proposal may present a fixed price for the airline ticket. As another illustrative example, a representative 106 can provide, for each proposal option, a budget for completion of the task according to the selected option (e.g., "will spend up to $150 on Halloween decorations for the party"). As yet another illustrative example, for tasks or projects where payment schedules may be involved, proposal options for a proposal related to a task or project may specify the payment schedule for each of these proposal options (e.g., "$100 for the initial consultation, with $300 for follow-up servicing," "$1,500 up-front to reserve the venue, with $1,500 due after the event," etc.).

If a member accepts a particular proposal option for a task or project, the representative 106 may communicate with the member to ensure that the member is consenting to payment of the presented costs and any associated taxes and fees for the particular proposal option. In some instances, if a proposal option is selected with a static payment amount (e.g., fixed price, "up to $X," phased payment schedules with static amounts, etc.), the member may be notified by the representative 106 if the actual payment amount required for fulfillment of the proposal option exceeds a threshold percentage or amount over the originally presented static payment amount. For example, if the representative 106 determines that the member may be required to spend more than 120% of the cost specified in the selected proposal option, the representative 106 may transmit a notification to the member to re-confirm the payment amount before proceeding with the proposal option.

In some examples, if a member accepts a proposal option from the presented proposal, the task facilitation service 102 moves the task associated with the presented proposal to an executing state and the representative 106 can proceed to execute on the proposal according to the selected proposal option. For instance, the representative 106 may contact one or more third-party services 116 to coordinate performance of the task according to the parameters defined in the proposal accepted by the member.

In some examples, the representative 106 utilizes the task coordination system 114 to assist in the coordination of performance of the task according to the parameters defined in the proposal accepted by the member. For instance, if the coordination with a third-party service 116 may be performed automatically (e.g., third-party service 116 provides automated system for ordering, scheduling, payments, etc.), the task coordination system 114 may interact directly with the third-party service 116 to coordinate performance of the task according to the selected proposal option. The task coordination system 114 may provide any information (e.g., confirmation, order status, reservation status, etc.) to the representative 106. The representative 106, in turn, may provide this information to the member via the application or web portal utilized by the member to access the task facilitation service 102. Alternatively, the representative 106 may transmit the information to the member via other communication methods (e.g., e-mail message, text message, etc.) to indicate that the third-party service 116 has initiated performance of the task according to the selected proposal option. If the representative 106 is performing the task for the benefit of the member 118, the representative 106 may provide status updates with regard to its performance of the task to the member 118 via the application or web portal provided by the task facilitation service 102.

In some examples, the task coordination system 114 can monitor performance of tasks by the representative 106, third-party services 116, and/or other services/entities associated with the task facilitation service 102 for the benefit of the member. For instance, the task coordination system 114 may record any information provided by the third-party services 116 with regard to the timeframe for performance of the task, the cost associated with performance of the task, any status updates with regard to performance of the task, and the like. The task coordination system 114 may associate this information with a data record corresponding to the task being performed. Status updates provided by third-party services 116 may be provided automatically to the member via the application or web portal provided by the task facilitation service 102 and to the representative 106. Alternatively, the status updates may be provided to the representative 106, which may provide these status updates to the member over a chat session established between the member and the representative 106 for the particular task/project or through other communication methods. In some instances, if the task is to be performed by the representative 106, the task coordination system 114 may monitor performance of the task by the representative 106 and record any updates provided by the representative 106 to the member via the application or web portal.

Once a task has been completed, the member may provide feedback with regard to the performance of the representative 106 and/or third-party services 116, and/or other services/entities associated with the task facilitation service 102 that performed the task according to the proposal option selected by the member. For instance, the member may exchange one or more messages with the representative 106 over the chat session corresponding to the particular task/project being completed to indicate its feedback with regard to the completion of the task. For instance, a member may indicate that they are pleased with how the task was completed. The member may additionally, or alternatively, provide feedback indicating areas of improvement for performance of the task. For instance, if a member is not satisfied with the final cost for performance of the task and/or has some input with regard to the quality of the performance (e.g., timeliness, quality of work product, professionalism of third-party services 116, etc.), the member may indicate as such in one or more messages to the representative 106. In some examples, the task facilitation service uses a machine learning algorithm or artificial intelligence to process feedback provided by the member to improve the recommendations provided by the task facilitation service 102 for proposal options, third-party services 116 or other services/entities, and/or processes that may be performed for completion of similar tasks. For instance, if the task facilitation service 102 detects that the member is unsatisfied with the result provided by a third-party service 116 or other services/entities for a particular task, the task facilitation service 102 may utilize this feedback to further train the machine learning algorithm or artificial intelligence to reduce the likelihood of the third-party service 116 or other services/entities being recommended for similar tasks and to similarly-situated members. As another example, if the task facilitation service 102 detects that the member is pleased with the result provided by a representative 106 for a particular task, the task facilitation service 102 may utilize this feedback to further train the machine learning algorithm or artificial intelligence to reinforce the operations performed by representatives for similar tasks and/or for similarly-situated members.

Figure 3:
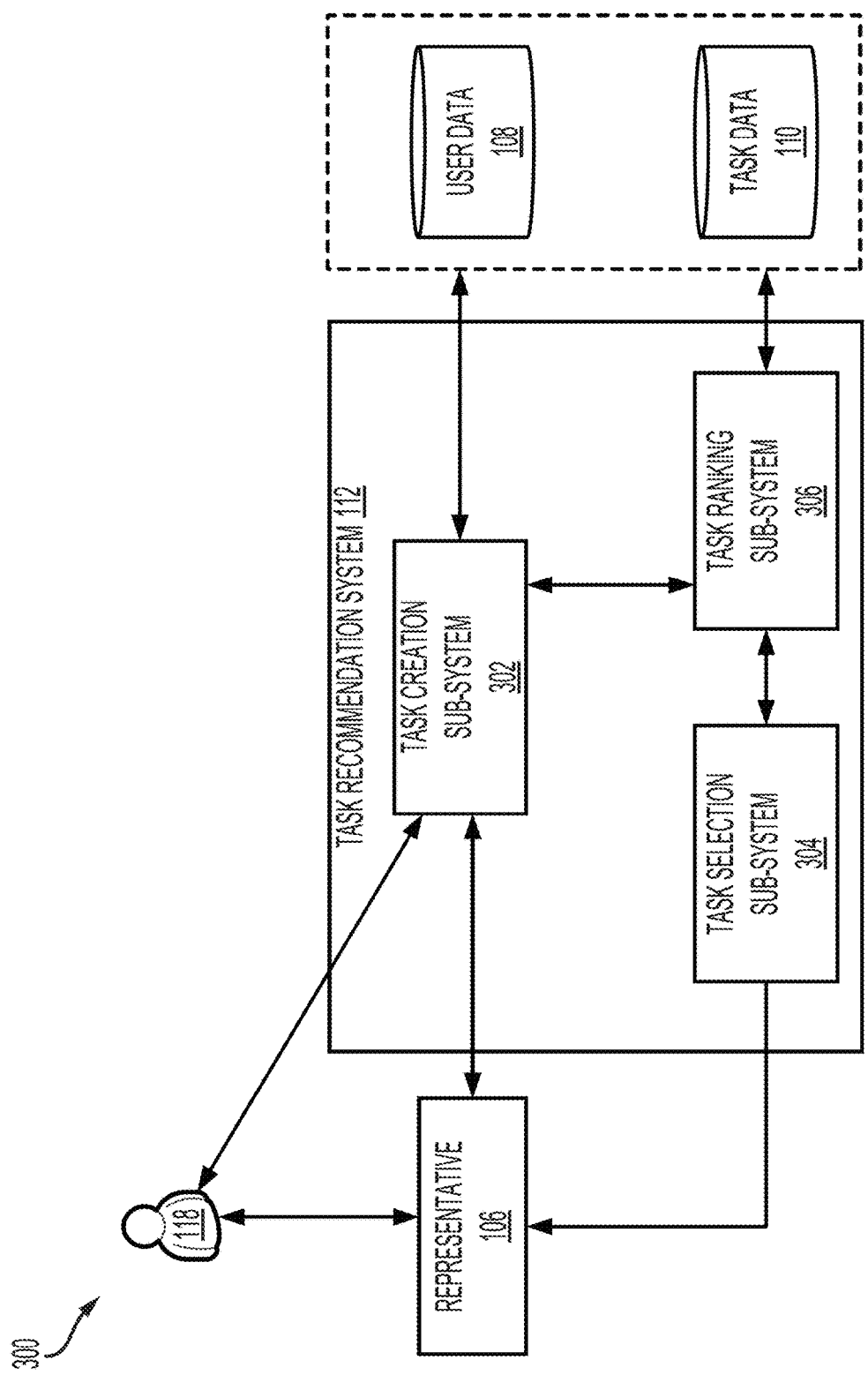
FIG. 3 shows an illustrative example of an environment in which a task recommendation system generates and ranks recommendations for tasks to be performed for the benefit of a member in accordance with aspects of the present disclosure.

FIG. 3 shows an illustrative example of an environment 300 in which a task recommendation system 112 generates and ranks recommendations for tasks to be performed for the benefit of a member 118 in accordance with aspects of the present disclosure. In the environment 300, a member 118 and/or representative 106 interacts with a task creation sub-system 302 of the task recommendation system 112 to generate a new task or project that can be performed for the benefit of the member 118. The task creation sub-system 302 may be implemented using a computer system or as an application or other executable code implemented on a computer system of the task recommendation system 112.

In some examples, the member 118 can access the task creation sub-system 302 to request creation of one or more tasks as part of an onboarding process implemented by the task facilitation service. For instance, during an onboarding process, the member 118 can provide information related to one or more tasks that the member 118 wishes to possibly delegate to a representative 106. The task creation sub-system 302 may utilize this information to identify parameters related to the tasks that the member 118 wishes to delegate to a representative 106 for performance of the tasks. For instance, the parameters related to these tasks may specify the nature of these tasks (e.g., gutter cleaning, installation of carbon monoxide detectors, party planning, etc.), a level of urgency for completion of these tasks (e.g., timing requirements, deadlines, date corresponding to upcoming events, etc.), any member preferences for completion of these tasks, and the like. The task creation sub-system 302 may utilize these parameters to automatically create the task, which may be presented to the representative 106 once assigned to the member 118 during the onboarding process.

The member 118 may further access the task creation sub-system 302 to generate a new task or project at any time after completion of the onboarding process. For example, the task facilitation service may provide, via an application or web portal of the task facilitation service, a widget or other user interface element through which a member 118 may generate a new task or project manually. In some examples, the task creation sub-system 302 provides various task templates that may be used by the member 118 to generate a new task or project. The task creation sub-system 302 may maintain, in a task datastore 110, task templates for different task types or categories. Each task template may include different data fields for defining the task, whereby the different task fields may correspond to the task type or category for the task being defined. The member 118 may provide task information via these different task fields to define the task that may be submitted to the task creation sub-system 302 or representative 106 for processing. The task datastore 110, in some instances, may be associated with a resource library. This resource library may maintain the various task templates for the creation of new tasks.

Task templates may be associated with a particular task category. The plurality of task definition fields within a particular task template may be associated with the task category assigned to the task template. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. In some instances, a member accessing a particular task template may further define custom fields for the task template, through which the member may supply additional information that may be useful in defining and completing the task. These custom fields may be added to the task template such that, if a member and/or representative obtains the task template in the future to create a similar task, these custom fields may be available to the member and/or representative.

In some examples, the data fields presented in a task template used by the member 118 to manually define a new task can be selected based on a determination generated using a machine learning algorithm of artificial intelligence. For example, the task creation sub-system 302 can use, as input to the machine learning algorithm or artificial intelligence, a member profile from the user datastore 108 and the selected task template from the task datastore 110 to identify which data fields may be omitted from the task template when presented to the member 118 for definition of a new task or project. For instance, if the member 118 is known to delegate maintenance tasks to a representative 106 and is indifferent to budget considerations, the task creation sub-system 302 may present to the member 118, a task template that omits any budget-related data fields and other data fields that may define, with particularity, instructions for completion of the task. In some instances, the task creation sub-system 302 may allow the member 118 to add, remove, and/or modify the data fields for the task template. For example, if the task creation sub-system 302 removes a data field corresponding to the budget for the task based on an evaluation of the member profile, the member 118 may request to have the data field added to the task template to allow the member 118 to define a budget for the task. The task creation sub-system 302, in some instances, may utilize this member change to the task template to retrain the machine learning algorithm or artificial intelligence to improve the likelihood of providing task templates to the member 118 without need for the member 118 to make any modifications to the task template for defining a new task.

In some instances, if the member selects a particular task template for creation of a task associated with an experience, the task creation sub-system 402 can automatically identify the portions of the member profile that may be used to populate the selected task template. For example, if the member selects a task template corresponding to an evening out at a restaurant, the task creation sub-system 402 may automatically process the member profile to identify any information corresponding to the member's dietary preferences and restrictions that may be used to populate one or more fields within the task template selected by the member. The member may review these automatically populated data fields to ensure that these data fields have been populated accurately. If the member makes any changes to the information within an automatically populated data field, the task creation sub-system 402 may use these changes to automatically update the member profile to incorporate these changes.

In some examples, the task creation sub-system 302 may also enable a representative 106 to create a new task or project on behalf of a member 118. The representative 106 may request, from the task creation sub-system 302, a task template corresponding to the task type or category for the task being defined. The representative 106, via the task template, may define various parameters associated with new task or project, including assignment of the task (e.g., to the representative 106, to the member 118, etc.). In some instances, the task creation sub-system 302 may use a machine learning algorithm or artificial intelligence to identify which data fields are to be presented in the task template to the representative 106 for creation of a new task or project. For example, similar to the process described above related to member creation of a task or project, the task creation sub-system 302 may use, as input to the machine learning algorithm or artificial intelligence, a member profile from the user datastore 108 and the selected task template from the task datastore 110. However, rather than identifying which data fields may be omitted from the task template, the task creation sub-system 302 may indicate which data fields may be omitted from the task when presented to the member 118 via the application or web portal provided by the task facilitation service. Thus, the representative 106 may be required to provide all necessary information for a new task or project regardless of whether all information is presented to the member 118 or not.

The task creation sub-system 402 may automatically identify the portions of the member profile that may be used to populate the fields of the selected task template. The representative 106 may review these automatically populated data fields to ensure that these data fields have been populated accurately. If the representative 106 makes any changes to the information within an automatically populated data field (based on the representative's personal knowledge of the member 118, etc.), the task creation sub-system 402 may use these changes to automatically update the member profile to incorporate these changes. In some instances, if changes are to be made to the member profile as a result of the changes made to the task template by the representative 106, the task creation sub-system 402 may prompt the member 118 to verify that the proposed change to the member profile is accurate. If the member 118 indicates that the proposed change is inaccurate, or the member 118 provides an alternative change, the task creation sub-system 402 may automatically update the corresponding data fields in the task template and the member profile to reflect the accurate information, as indicated by the member 118.

In some examples, the task creation sub-system 302 can monitor, automatically and in real-time, messages exchanged between the member 118 and the representative 106 to identify tasks that may be recommended to the member 118. For instance, the task creation sub-system 302 may utilize natural language processing (NLP) or other artificial intelligence to evaluate received messages or other communications from the member 118 to identify possible tasks that may be recommended to the member 118. For instance, the task creation sub-system 302 may process any incoming messages from the member 118 using NLP or other artificial intelligence to detect a new task or other issue that the member 118 would like to have resolved. In some instances, the task creation sub-system 302 may utilize historical task data from the task datastore 110 and corresponding messages from the task datastore 110 to train the NLP or other artificial intelligence to identify possible tasks. If the task creation sub-system 302 identifies one or more possible tasks that may be recommended to the member 118, the task creation sub-system 302 may present these possible tasks to the representative 106, which may select tasks that can be shared with the member 118 over the chat session.

In some examples, the task creation sub-system 302 can utilize computer vision or other artificial intelligence to process images, audio, video, natural language communications, sensor data, and/or the like to identify potential tasks that may be recommended to the member 118 for completion. For instance, images or video of a home (e.g., associated with the member 118) may be processed to identify potential tasks that may be completed for the benefit of the member 118. These images or video may be processed by the task creation sub-system 302 in real-time to detect issues within the member's home and identify possible tasks that may be performed to address these issues. Additionally, while the digital images or video may be related to a particular issue, the task creation sub-system 302 may further process the digital images or video to identify additional and/or alternative issues for which tasks may be recommended. Thus, the task creation sub-system 302, using computer vision or other artificial intelligence, may detect possible issues that the member 118 may not be aware of.

The task recommendation system 112 may further include a task ranking sub-system 306, which may be configured to rank the set of tasks of a member 118, including tasks that may be recommended to the member 118 for completion by the member 118 or the representative 106. The task ranking sub-system 306 may be implemented using a computer system or as an application or other executable code implemented on a computer system of the task recommendation system 112. In some examples, the task ranking sub-system 306 can rank the listing of the set of tasks based on a likelihood of the member 118 selecting the task for delegation to the representative for performance and coordination with third-party services and/or other services/entities associated with the task facilitation service. Alternatively, the task ranking sub-system 306 may rank the listing of the set of tasks based on the level of urgency for completion of each task. The level of urgency may be determined based on member characteristics from the user datastore 108 (e.g., data corresponding to a member's own prioritization of certain tasks or categories of tasks) and/or potential risks to the member 118 if the task is not performed.

In some examples, the task ranking sub-system 306 provides the ranked list of the set of tasks that may be recommended to the member 118 to a task selection sub-system 304. The task selection sub-system 304 may be implemented using a computer system or as an application or other executable code implemented on a computer system of the task recommendation system 112. The task selection sub-system 304 may be configured to select from the ranked list of the set of tasks, which tasks may be recommended to the member 118 by the representative 106. For instance, if the application or web portal provided by the task facilitation service is configured to present, to the member 118, a limited number of task recommendations from the ranked list of the set of tasks, the task selection sub-system 304 may process the ranked list and the member profile from the user datastore 108 to determine which task recommendations should be presented to the member 118. In some instances, the selection made by the task selection sub-system 304 may correspond to the ranking of the set of tasks in the list. Alternatively, the task selection sub-system 304 may process the ranked list of the set of tasks, as well as the member profile and the member's existing tasks (e.g., tasks in progress, tasks accepted by the member 118, etc.), to determine which tasks may be recommended to the member 118. For instance, if the ranked list of the set of tasks includes a task corresponding to gutter cleaning but the member 118 already has a task in progress corresponding to gutter repairs due to a recent storm, the task selection sub-system 304 may forego selection of the task corresponding to gutter cleaning, as this may be performed in conjunction with the gutter repairs. Thus, the task selection sub-system 304 may provide another layer to further refine the ranked list of the set of tasks for presentation to the member 118.

The task selection sub-system 304 may provide, to the representative 106, a new listing of tasks that may be recommended to the member 118. The representative 106 may review this new listing of tasks to determine which tasks may be presented to the member 118 via the application or web portal provided by the task facilitation service. For instance, the representative 106 may review the set of tasks recommended by the task selection sub-system 304 and select one or more of these tasks for presentation to the member 118 via individual interfaces corresponding to these one or more tasks. Further, as described above, the representative 106 may determine whether a task is to be presented with an option to defer to the representative 106 for performance of the task (e.g., with a button or other GUI element to indicate the member's preference to defer to the representative 106 for performance of the task). In some instances, the one or more tasks may be presented to the member 118 according to the ranking generated by the task ranking sub-system 306 and refined by the task selection sub-system 304. Alternatively, the one or more tasks may be presented according to the representative's understanding of the member's own preferences for task prioritization. Through the interfaces corresponding to the one or more tasks recommended to the member 118, the member 118 may select one or more tasks that may be performed with the assistance of the representative 106. The member 118 may alternatively dismiss any presented tasks that the member 118 would rather perform personally or that the member 118 does not otherwise want performed.

In some examples, the task selection sub-system 304 monitors the different interfaces corresponding to the recommended tasks, including any corresponding chat or other communication sessions between the member 118 and the representative 106 to collect data with regard to member selection of tasks for delegation to the representative 106 for performance. For instance, the task selection sub-system 304 may process messages corresponding to tasks presented to the member 118 by the representative 106 over the different interfaces corresponding to the recommended tasks to determine a polarity or sentiment corresponding to each task. For example, if a member 118 indicates, in a message to the representative 106 transmitted through a communications session associated with a particular task, that it would prefer not to receive any task recommendations corresponding to vehicle maintenance, the task selection sub-system 304 may ascribe a negative polarity or sentiment to tasks corresponding to vehicle maintenance. Alternatively, if a member 118 selects a task related to gutter cleaning for delegation to the representative 106 and/or indicates in a message to the representative 106 (such as through a communications session associated with a gutter cleaning task presented to the member 118) that recommendation of this task was a great idea, the task selection sub-system 304 may ascribe a positive polarity or sentiment to this task. In some examples, the task selection sub-system 304 can use these responses to tasks recommended to the member 118 to further train or reinforce the machine learning algorithm or artificial intelligence utilized by the task ranking sub-system 306 to generate task recommendations that can be presented to the member 118 and other similarly situated members of the task facilitation service. Further, the task selection sub-system 304 may update the member's profile or model to update the member's preferences and known behavior characteristics based on the member's selection of tasks from those recommended by the representative 106 and/or sentiment with regard to the tasks recommended by the representative 106.

Figure 4:
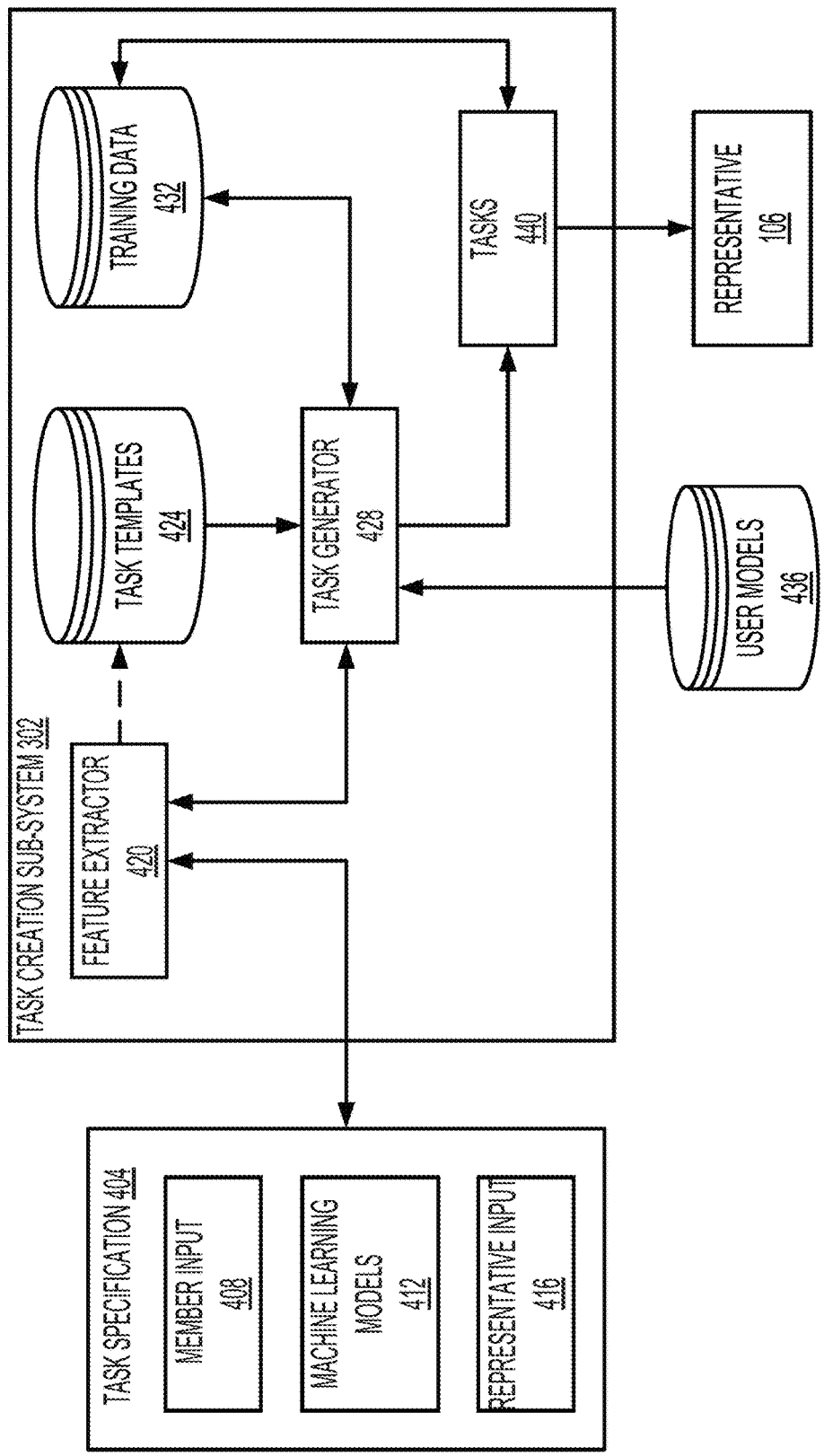
FIG. 4 depicts an illustrative example of a task create sub-system, which generates and ranks recommended tasks configured to be performed for the benefit of a member in accordance with aspects of the present disclosure.

FIG. 4 depicts an illustrative example of an environment 400 for generating and ranking recommended tasks configured to be performed for the benefit of a member in accordance with aspects of the present disclosure. Environment 400 may be operated by a task facilitation service 102 for generating recommended tasks the performance of which can be facilitated by the task facilitation service 102, one or more representatives thereof, one or more third-party service providers, and/or the like. In some instances, the generated tasks may be requested by a member. For example, a member may request tickets to an upcoming show. In those instances, the member may define the task. Alternatively, or additionally, the representative assigned to the member may define the task on behalf of the member. The representative may transmit the task to the member and request approval to facilitate the task (e.g., obtain tickets to the show, arrange travel or accommodations, etc.). In another alternative arrangement, the task facilitation service 102 may process a communication session (e.g., chat session, audio communication session, video communication session, etc.) between the member and the representative using a natural language processor, speech processors, image processors, and/or the like. The task facilitation service 102 may detect an interest in attending the show and automatically generate a task recommendation for the member. In some instances, the representative may determine whether to present the automatically generated task recommendation to the member. In other instances, the task facilitation service may determine a likelihood that the member will approve the recommended task. If the likelihood is greater than a threshold, the task facilitation service 102 may automatically present the member with the automatically generated recommended task.

The task facilitation service 102 may generate task recommendations associated with other tasks provided by the member. For example, the member may indicate a need for tasks associated with an upcoming move to Denver. The task facilitation service 102 may recommend tasks that are associated with moving. For instance, the task facilitation service 102 may generate task recommendations that correspond to, but are not limited to, canceling the members utilities that the members current address, obtaining movers, obtaining auto transport, obtaining travel accommodations to the new address, obtaining utilities at the new address, obtaining moving supplies, combinations thereof, or the like. Some task recommendations generated by the task facilitation service 102 may not be based on a task provided to or suggested by the member. For example, a calendar application associated with the member may indicate an upcoming birthday. The task facilitation service 102 may generate task recommendations associated the upcoming event such as, but not limited, throwing a birthday party, obtaining a cake, obtaining a birthday present or card, visiting the family member, communicating with the family member or other family members, combinations thereof, or the like.

The task recommendation may include an identification of the task and any sub-tasks that may execute to implement the task. For example, a task recommendation may be to attend a show and include sub-tasks such as but not limited to, obtain tickets to a particular show on a particular date, obtain travel accommodations, identify food accommodations, and/or the like. In some instances, a task recommendation can include some or all of the implementation details needed to execute the task and/or sub-tasks thereof. For example, a task recommendation that corresponds to obtain tickets for a show may include an identification of the show, the type of tickets to be obtained, the cost of the tickets, an identification of how to acquire the tickets, the time/date of the show, identification of any travel accommodations to the show, an identification of any food accommodations, and/or the like.

The task creation sub-system 302 may generate task recommendations based on a task specification 404 that may include member input 408, representative input 416, output from machine-learning models 412, and/or the like. The task specification 404 may include information from which a task may be identified. The information may correspond to an identification of a task that may correspond to a predefined task of the task creation sub-system 302 (e.g., a previously generated and/or executed task, a previously identified task, a hardcoded task, and/or the like), an identification of a task that may not be associated with a predefined task (e.g., an unknown task), or may not identify a particular task. The task specification 404 may be processed by task creation sub-system 302 to identify a task that can be executed by the task facilitation service 102 (e.g., by a representative, third-party service provider, etc.).

In some instances, the task specification 404 may include input from the member (e.g., member input 408, etc.) identifying a task or providing data from which a task may be identified. In other instances, the task specification 404 may include input from the representative (e.g., representative input 416, etc.) identifying a task or providing data from which a task may be identified. In still yet other instances, the task specification 404 may include an output from the machine-learning models 412 (e.g., using the dataset and/or data associated with the member such as, but not limited to, the user model associated with the member, member input 408, representative input 416, machine-learning models 412, and/or the like) that identifies a task and/or includes a task dataset associated with the member from which a task may be identified. The task dataset may include data received and/or derived from the data associated with the member (e.g., from the user model associated with the member, member input 408, representative input 416, machine-learning models 412, etc.). For example, the task specification 404 may include data associated with the member (e.g., such as communications between the member and the representative, the user model, and/or the like) over a predetermined time interval (e.g., such as over a previous day) from which one or more tasks may be identified and recommended to the user for performance by the task facilitation service. The task specification 404 may include all data associated with the member, a predetermined quantity of data, a data received and/or generated over a particular time interval, and/or the like. In some instances, the task specification 404 may include a combination of member input 408, output from machine-learning models 412, and/or representative input 416.

In some instances, the task specification 404 may be augmented with additional data associated with the member, the identified task of the task specification 404, and/or the like. For example, when a task is suggested (e.g., between a communication session between the member and a representative, between a conversation between the member and another individual, etc.) or expressly defined (e.g., by the member or the representative), a task specification 404 may be generated to encapsulate a dataset that corresponds to the defined or suggested task. Data from devices associated with the member, sensors, cameras, application data associated with the member, third-party service associated with the member, other members, other individuals associated with the member, combinations thereof, or the like.

The member input 408 may correspond to any type of input from the member that may be related to a task. The representative input 416 may correspond to any type of input from the representative that may be related to a task for the member. The member input 408 and/or the representative input 416 may include text, audio, video, data from other sources (e.g., devices, applications, and/or sensors associated with the member, or the like), combinations thereof, or the like. For example, the member input 408 may define a task by providing input "I need help with an upcoming move to Denver". In another example, the member input 408 indicating "I really like the beach" may define a task specification 408 that corresponds to a beach event (e.g., a trip to the beach, a vacation, beach activities, etc.).

Some input (from the member, representative, or from the other sources) may be processed by the machine-learning models 412. For example, sensor data may be processed by the machine-learning models to identify possible task recommendations for the member. For example, sensor data may be processed to indicate the member's HVAC system may be losing efficiency or otherwise not operating as it should. Similarly, some input from the member or representative (e.g., such as natural language input) may be processed to identify possible tasks. For example, a member may correspond with the representative to discuss activities that the member is interested in. The activities are not expressly defined as tasks but may be indicative of tasks that the member may approve.

The machine-learning models 412 may be configured to process the member input 408 (e.g., text, audio, video, and/or the like), the representative input 416 (e.g., text, audio video, and/or the like), input from one or more other sources associated with the member, and/or the like to identify input indicative of a possible task. For instance, the other sources may include input such as, but not limited to, information generated from devices associated with the member (e.g., IoT devices, mobile devices, sensors, home-automation devices, and/or the like), information from other members associated with the member (e.g., such as friends and/or family), information from applications or software services associated with the member (e.g., calendars, contacts, SMS or direct messaging, email, to-do lists, shopping lists, and/or the like), information from services subscribed to by the member (e.g., meal-prep services, media services, etc.), combinations thereof, or the like.

In some instances, the member may determine a quantity of information, types of information, sources of information, and/or the like that can be input to task facilitation service 102 or processed by task facilitation service 102. Some members may provide all information to the task facilitation service 102 and/or indicate that the task facilitation service 102 can provide any recommended tasks based on that information. Other members may limit the information provided to the task facilitation service 102 and/or the quantity and/or types of tasks that the task facilitation service 102 can generate. This may prevent the task facilitation service 102 from being too invasive to some members (e.g., having access to information and/or recommending tasks that the member may not intend for a third-party, etc.). The task facilitation service 102 may provide an interface to the member to enable selection of information, information types, information sources, etc. In some instances, the representative 106 assigned to the member may request input confirming that access to some information is to remain restricted or the like. Similarly, the task facilitation service 102 may provide an interface to the member to enable selection of a quantity of tasks, type of tasks, frequency with which to recommend tasks, etc. for the task creation sub-system 302.

The machine-learning models 412 may include multiple machine-learning models each being configured to process a particular set of inputs, generate particular outputs, generate particular types of predictions, and/or the like. The machine-learning models 412 may process input data according to a hierarchical design in which models may execute in a particular order. In some instances, when a set of input data indicative of a task is identified (e.g., with a likelihood that is greater than a threshold), data processing may temporarily pause to prevent wasting processing resources and/or identifying too many possible tasks and overloading the member or representative). In other instances, the data processing may continue until the data is processed (e.g., regardless of how many tasks are identified). In those instances, the representative and/or the task facilitation service 102 may determine which tasks identified by the machine-learning model are to be presented to the member.

Examples of machine-learning models in the machine-learning models 412 include, one or more machine-learning models configured to parse natural language input from the member to identify data corresponding to a possible task for the member. The one or more machine-learning models may include one or more natural language processors that can convert audio and/or video to text, parse text to derive a semantic meaning such as an interest or intent. The one or more machine-learning models may also include classifiers that may predict a likelihood that a member will select a particular task. If the likelihood is greater than a threshold, then a task-specification according to the task may be generated. In some instances, the threshold may be set low (e.g., approximately 40%), to increase a quantity of possible tasks that can be provided to the member. The threshold may be dynamically determined based on a quantity of tasks that are being generated and the member feedback.

Natural language processors may include a set of layers that parse text, audio, and/or video conversations of the member to determine possible intents and/or interests of the member. For example, the natural language processors may include a first layer that parses the input to derive a structure and semantic meaning of the input. The natural language processors may include a second layer that classifies the structure and semantic meaning according to a particular intent, interest, task type, category, location, timestamp (e.g., date and/or time), event, combinations thereof, or the like. In some instances, another machine-learning model (e.g., another classifier, or the like) may be used to categorize the output from the natural language processors as corresponding to a particular task, task type, or the like.

The first layer of the natural language processor may first derive a text from of the input (e.g., if the input is not already in text form) using a speech recognition machine-learning model, gesture-based machine-learning model (e.g., for defining text from gestures such as facial expression, sign language, combinations thereof, or the like). The text is then processed by removing punctuation and stop words (e.g., words that do not provide semantic meaning such as articles, etc.). A lemmatizing process is then executed that reduces words to a root form (e.g., removing conjugation, suffix, etc.). In some instances, the word variation may be further reduced by replacing words with a particular synonym. For example, the words "enabling" and "facilitating" may be processed to a base form of "enable" and "facilitate" and "facilitate may be replaced with "enable" to reduce the quantity of words that need to be classified. The data may then be vectorized (e.g., input vector comprising an order subset of the remaining processed words) and the vector may be classified by a semantic classifier.

In one example, the input "I love hiking or surfing near Cocoa Beach", may be processed as "I", "love", "hike", "surf", "Cocoa Beach". Once passed into the semantic classifier, the semantic classifier may identify that the member has interests including hiking and surfing. The classifier may additionally qualify the interests based on the other information identified in the input. For example, the term Cocoa Beach may be used to modify the interest hiking to include hiking near beaches, hiking near the Atlantic Ocean, or hiking in Florida. A last layer of the set of layers of a natural language processors may include another classifier that classifies an interest and/or intent as a potential task. Returning to the previous example, the last layer may classify interest "hike", "Cocoa Beach" by identifying hiking-based activities near Cocoa Beach, Florida.

In some instances, the natural language processor may be a first machine-learning model of the machine-learning models 412 to execute in the hierarchy due to the models classifying input from the member. Other machine-learning models may execute after the natural language processor (or in parallel therewith). As an example, a next set of machine-learning models in the hierarchy can include machine-learning models that process sensor data (e.g., that may identify anomalies within the member's environment that may need to be addressed, etc.). For example, a machine-learning model may process sensor data IoT devices or other sensor-based devices accessible to the task facilitation service 102. Examples of the events detectable by the machine-learning model include, but are not limited to, excessing energy usage events, water events (e.g., from humidity and temperature sensors, or the like), HVAC events (e.g., from one or more temperature sensors, or the like), security events (e.g., break ins from microphones and/or computer vision, open doors or windows, etc.), environmental repair events (e.g., detected through computer vision image processing, or the like of video data), and/or any other event that may be detected through processing of data from device associated with the member.

A next set of machine-learning models in the hierarchy may include machine-learning models configured to process application data and/or data from third-party services, such as, but not limited calendar, email, direct messaging services (e.g., SMS or the like), social media services, music streaming services, video streaming services, to-do lists, shopping lists, and/or any application executing on a device associated with the member that may be usable to suggest a task of interest to the member. For example, these machine-learning models may process the members calendar to identify an upcoming birthday or a streaming service to determine musicians of interest to the member that the member may want to see live, etc. Additional machine-learning models may be added to process other types of data or data from other information sources.

In some instances, the member and/or the representative may define the hierarchy of machine-learning models. In other instances, the hierarchy of machine-learning models may be defined by the task facilitation service. The member and/or the representative may modify the hierarchy at any time through a user interface. For instance, the member may select a particular machine-learning model to be higher or lower in the hierarchy than initially presented. The member and/or the representative may also indicate how hierarchy of machine-learning models is to execute, the quantity of potential tasks before processing is terminated, and/or the like.

Once a potential task is defined by the member, defined by the representative, suggested by the member, suggested by the representing, identified by the machine-learning models 412, or the like, a task specification 404 may be generated that encapsulates the data associated with the task. The data may be structured (e.g., according to type, source, time, and/or the like) or unstructured (e.g., stored in a same or similar format as it is received from a respective information source). In some instances, the task specification 404 may include a predetermined quantity information from the member input 408, the machine-learning models 412, the representative 416, and/or from other sources. The information included in the predetermined quantity of received information may be selected based on a semantic classification of the information (e.g., information associated with a suggested task using a semantic classifier, natural language processors, and/or the like as previously described), timestamp (e.g., such as that information received over the last x hours once a potential task was identified), data types, data sources, and/or the like.

The task specification 404 may be passed to feature extractor 420 which may derive a set of features from which the representative or another machine-learning model can identify a predetermined task. In some instances, too many features in the set of features may reduce the accuracy of task identification. Too many features may cause noise, improper feature weights, etc. that can affect the quality and/or accuracy of the result of processing the feature set. In some examples, feature extractor 420 may reduce the set of features to improve the quality of the tasks identified. For example, feature extractor may derive new features from the set of features that correspond to two or more features. Alternatively, or additionally a dimensionality reduction algorithm may be executed on the set of features or on the task specification 404 to reduce the quantity of features. For example, the task specification 404 may perform principal component analysis, a discriminant analysis (linear, general, etc.), or the like. In other examples, feature extractor 420 may add new features derived from features in the set of features to compensate for unbalanced feature weights (e.g., adding additional features to under weighted features may increase those weights), or the like.

The feature extractor 420 may generate a feature vector from the set of features. The feature vector may be an ordered sequence of features from the set of features. The features may be ordered according to a particular dimension (e.g., task type, data type, time, information source, etc.).

Task creation sub-system 302 may determine whether the feature vector includes an identification of task type that corresponds to predefined task type of the creation sub-system 302 (e.g., such as a known task, a previously generated task, and/or the like). If the feature vector does not include an identification of a task type that corresponds to a predefined task type of the task creation sub-system 302, then the feature vector, may be passed directly to task generator.

If the feature vector includes an identification of a task type that corresponds to a predefined task type of the creation sub-system 302, then the feature vector may be passed to task templates 424. The task templates 424 may include a database of task templates. A task template can include a set of empty fields that can be populated with features from the feature vector and/or derived from the feature vector by task generator 428. For example, the task template "buy an object" includes a field "object" to be replaced with a particular object included in or derived from the feature vector. More specific task templates may include many fields (e.g., particular objects, vendors, timestamps, locations, third-party services, activities, etc.) that may be inserted into the task template.

The task templates 424 may be organized according to hierarchy of increasing specificity. The hierarchy may begin with task templates that correspond to a base type (e.g., object, service, event, etc.). The next layer of the hierarchy may include task templates that are more specific variation of the previous layer's task templates. For example, a subsequent layer after a task template of object may include an action in association with the object such as buy an object, sell an object, rent an object, etc. A subsequent layer may include task templates that are even more specific such as buy a particular object from a particular vender at a particular time, etc. The task creation sub-system 302 may identify a task template that is closest to the possible task identified by task creation sub-system 302. The identified task template may be passed to task generator with the feature vector.

The task generator 428 may include a machine-learning model, an automated process, a software process driven by the representative, or the like that analyzes the feature vector (and the task template if received from task templates 424) and outputs a task recommendation. Task generator 428 may be trained using training data 432 and user models 436 (associated with a particular member for which task recommendations are to be generated and/or associated with other members having similar characteristics to the particular member, etc.) to improve the generation of task recommendations that are tailored to a particular member. In a machine-learning model context, training the task generator 428 includes training the machine-learning model using supervised learning, unsupervised learning, semi supervised learning, reinforcement learning, and/or the like. The machine-learning model may be trained over a set of iterations, over a predetermined time interval, and/or until a predetermined accuracy metric is reached.

In a non-machine-learning-model context, training the task generator 428 may include processing data associated with the member to enable automatic selection of task templates that corresponds to the feature vector (if one has not been previously identified), automatic selection of values of fields of task templates, and/or the like. For example, features associated with the member (e.g., from the feature vector, user model, and/or the like) may be associated with a use metric usable to define a likelihood that the feature may be used for a particular field type when defining a task. The task generator 428 may suggest, for each field of a task template, the feature having a highest use metric associated with the particular field. For example, a task recommendation corresponding to "order a birthday cake" may include a set of features that may correspond to a date in which the cake should be ordered (e.g., birthdays stored in the user model that corresponds the member, family of the member, friends of the member, etc.) with each feature being associated with a use metric. The task generator 428 may identify the feature with the highest use metric (e.g., a date of a close family member for which the member has previously purchased a birthday cake, the date for which the member is most likely to select based on the user model, etc.) to suggest as being the value for the date field of the "order a birthday cake" task recommendation. Alternatively, the task generator 428 may automatically populate the date field with the feature having a highest use metric. The representative and/or the member may approve the date feature or select a different date feature if needed.

Training data 432 may include historical task specifications 404, task templates 424, and task recommendations generated for the member (or members having similar characteristics to the member). Training data 432 may also include additional data such as, but limited to, historical task specifications generated for other members, historical task templates generated for other members, user models of other members, task recommendations generated for other members, procedurally generated data, and/or the like. The training data 432 may be used to train the machine-learning model of the task generator 428 and/or the representative to generate task recommendations that may be of interest to the member.

The training data 432 may include data that indicates the member's preferences, interests, and/or the like. For example, the training data 432 may indicate events that the member is likely to find of interest, particular vendors or third-party services for use in performing tasks, etc. The training data may also cause the task generator 428 and/or the representative to generate task recommendations that conform to a format preferable to the member, include one or more values for fields that correspond to preferences of the member, and/or communicated in a format preferable to the member. For example, the training data may indicate that the member prefers task recommendation to be communicated via push notifications rather than SMS or email. The task generator 428 may identify these details in the training data 432 so as to generate task recommendations that are tailored to the member and in a manner preferable to the member.

User models 436 may include information associated with the member (e.g., such as the member profile or the like) that is generated or received from the task facilitation service (e.g., such as but not limited to, historical tasks of the member, historical tasks of members have similar characteristics, etc.), the member (e.g., such as, but not limited to, member provided answers to survey questions, input provided by the member, devices associated with the member which the member has provided access, devices accessible to the task facilitation service, applications associated with the member, third-party services connected to the member, etc.), the representative interacting with the member, other members interacting with the member, other individuals interacting with the member, combinations therefor, or the like.

In some instances, features may be extracted and/or derived from the member information. The features may be passed as input into a trained machine-learning model to generate a trained model that corresponds to the member. The model may be queried, executed, and/or parsed to generate predictions associated with the member (e.g., likelihood of interest in particular tasks, identification of predicted preferences, identification of known preferences, etc.), identify characteristics of the member, identify historical tasks requested and/or executed by the member, identify information associated with the member, derive new information associated with the user (e.g., based any of the aforementioned information associated with the member), and/or the like.

The user model may be used to tailor task recommendations to particular members (e.g., via selection of particular vendors that the member has used before or indicated a preference for, selection of particular travel accommodations the member has used before or indicated a preference for, selection of particular communication protocols and/or formats, selection of particular task recommendation formats, etc.).

The trained task generator 428 may generate a task recommendation form the feature vector that tailored to the particular member. As previously noted, the task generator 428 may also generate that is likely to be approved by the member, in a format that is preferable to the member, transmitted or presented using a communication protocol that is preferable to the member, and/or the like. In some instances, the task generator 428 may generate the task recommendations by populating the fields in the task template (if present) with the features in the feature vector. If any information is unknown or missing, the task generator 428 and/or the representative may request the information from the member (e.g., through the chat interface, SMS, email, the task facilitation service, and/or the like).

If no task template is identified, then the task generator 428 and/or the representative may process the feature vector and predict a task that can be recommended to the member. The task generator 428 may generate tasks that are likely to be of interest to the member, based on preferences of the member, and/or based on other criteria associated with the member. For example, the task generator 428 and/or the representative may generate a task recommendation of an activity that may be of interest to the member, which may be based on the task specification 404, the user model associated with the member, and/or the training data 432 (e.g., the user model and/or historical tasks performed by or for the member, etc.). In some instances, the task generator 428 and/or the representative may select a task from a list of tasks. The list may be generated for particular members based on previous tasks performed by the member, tasks previously selected by the member, tasks predicted to be of interest to the member (e.g., based on the user model associated with the member), and/or the like. In other instances, the task generator 428 and/or the representative may select any task that the task generator 428 and/or the representative predicts is likely to be of interest to the member. Once a task is selected (from a list, by the machine-learning model or representative, etc.), the task generator 428 may retrieve the task template that corresponds to the task to define a task recommendation for the member. The task generator 428 may then populate the fields of the task template using the feature vector, user model associated with the member, member input 408 and/or other input, representative input 416 and/or other input, and/or the like In some examples, the task generator 428 may output the task recommendation as well as an accuracy metric. The accuracy metric may be indicative of how well the generated task recommendation corresponds to the feature vector and/or user model, the internal data of the task generator 428, and/or from historical task recommendations generated for the member. In other words, the accuracy metric may indicate a likelihood that the generated task recommendation is likely to be approved by the member. If likelihood is less that a threshold, then the task recommendation may be purged. If the likelihood is greater than the threshold, then the task recommendation may be transmitted to tasks 440.

Tasks 440 may be a buffer that stores a set of tasks for presentation to the representative 106 for selection (e.g., by the representative 106 and/or the member). Tasks 440 may include an interface (e.g., such as a display interface, communication interface, application programming interface, and/or the like) that can present the tasks generated by task generator 428 to the representative 106 and/or the member 118. Tasks 436 may rank the tasks in an order determined by task generator 428, by the member 118 (e.g., via user input, the user model, or the like), and/or by the representative 106. For example, the ranking may be based on the output from the task generation 428 (e.g., the accuracy metric and/or a metric indicating the likelihood that the task recommendation will be approved by a member, etc.).

In some examples, the representative 106 may review the task recommendations via an interface to: select one or more task recommendations to be transmitted to (or displayed by) the member, rank the task recommendations (if more than one), modify one or more task recommendations, delete one or more task recommendations, combinations thereof, or the like. For example, a task recommendation may be modified by the representative 106 to better suit the member. In some examples, the task recommendations may be presented to the member for selection. In those examples, the task recommendations may be automatically generated by the task creation sub-system 304 and selected by the member (e.g., without intervention by the representative 106). The selected task recommendation may then be presented to the member for approval/selection.

The aspects of the task creation sub-system 304 may be further trained through reinforcement learning. The output from the task generator 428 (e.g., task recommendations, accuracy metrics, and/or the like), may be transmitted to training data 432 in addition to tasks 440. Over time the training data 432 may include more data associated with recent task recommendations, which may be more likely to be of interest to the member than older task recommendations. The training data 432 may also receive feedback from the member 118 and/or input from the representative 106 indicating which task recommendations were selected (e.g., approved for presentation to the member), which task recommendations were not selected, which task recommendations were modified (e.g., including an identification of those modifications), information associated with the entities that performed and/or executed the task (e.g., the task facilitation service, the third-party service provider, the representative, other representatives, combinations thereof, or the like), and/or the like. The training data 432 may store an associated between the task recommendations generated by the task generator 428 and an assigned label that is based on the input from the representative 106. In one example, approved task recommendations may be assigned a label of "true", "1", or the like task recommendations that were not approved may be assigned "false", "0", or the like. Modified task recommendations may be assigned neutral value (e.g., "0.5", null, or the like) or the same value as the value assigned to task recommendations that were not approved.

For reinforcement learning, the task generator 428 may periodically (e.g., after every task recommendation is generated, after every n task recommendation is generated, after n hours, etc.) execute a training step that processes one or more task recommendations and their corresponding labels to refine the machine-learning models or other processes of the task generator 428 or representative. Reinforcement learning may incrementally improve the task recommendations output from the task generator 428 (e.g., also increasing the accuracy metric).

In some instances, the accuracy metric (or other metrics output from the task generator 428 such as precision, logarithmic loss area under the curve F1 score, mean squared error, and/or the like) may indicate that the accuracy of the machine-learning models or representative 106 is below a threshold accuracy (or exceeds a threshold defined based on the other metrics). In one example, the member may indicate that the task creation sub-system 304 may not be generating quality task recommendations. An indication that the task generator 428 may not be generating proper task recommendations (e.g., task recommendations with errors, a high frequency of unapproved task recommendations, etc.). In those instances, the task generator, the representative 106, and/or the task creation sub-system, may be retrained. For example, the training data 432 (which may include recent output from the task generator 428 and corresponding labels) may be used to retrain the task generator 428 and/or the representative 106 to enable generation of more accurate task recommendations (e.g., more likely to be of interest to the member, meet the member's expectations, etc.). In some examples, the task generator 428 may be purged (e.g., returned to an untrained state) and retrained. In other examples, the task generator 428 may re-execute the training phase.

Since the training data 432 includes additional data from execution of the task generator 428 since the last training phase, training or retraining the task generator 428 may improve the performance of the task generator 428 (and/or the representative 106) in even when the training phase is triggered on a working task generator 428. In some instances, the task generator 428 may periodically be retrained. The retraining may be executed in addition to the reinforcement learning. For example, the task generator 428 may be retrained every x days, while reinforcement learning may trigger reinforcement training every n hours (or after n task recommendations are generated, or as previously described).

The output from the task generator 428 may also be transmitted to the feature extractor 420. In some instances, the task generator 428 and/or the representative 106 may determine features of the feature vector that are indicative of an identification of a task or may be usable in generating the task recommendation. Other features in the feature vector may be less useful, may not be used at all, may induce noise, or otherwise reduce the accuracy of the task generator 428 and/or the representative 106, or the like. For example, a feature corresponding a feature corresponding to when a correspondence occurred may not be indicative of the task identified in the correspondence or when the task is to be performed. The output from the task generator 428 may be used by the feature extractor 420 and/or the representative 106 to refine the feature extraction (e.g., removing features, adding features, modifying features, deriving new features, etc.). In some instances, the feature extractor 420 may transmit an indication of the refinement to the task specification 404 to improve future member input 408, machine-learning models 412 (e.g., through retraining, reinforcement learning, and/or the like), and/or the representative input 416. The improvement may provide better task specifications by eliminating unnecessary or superfluous data (e.g., which may cause noise, etc.), adding or removing information sources (e.g., which may improve feature extractor 420, the resulting feature vector, and/or task recommendations generated by the task generator 428, etc., combinations thereof, or the like.

Figure 5:
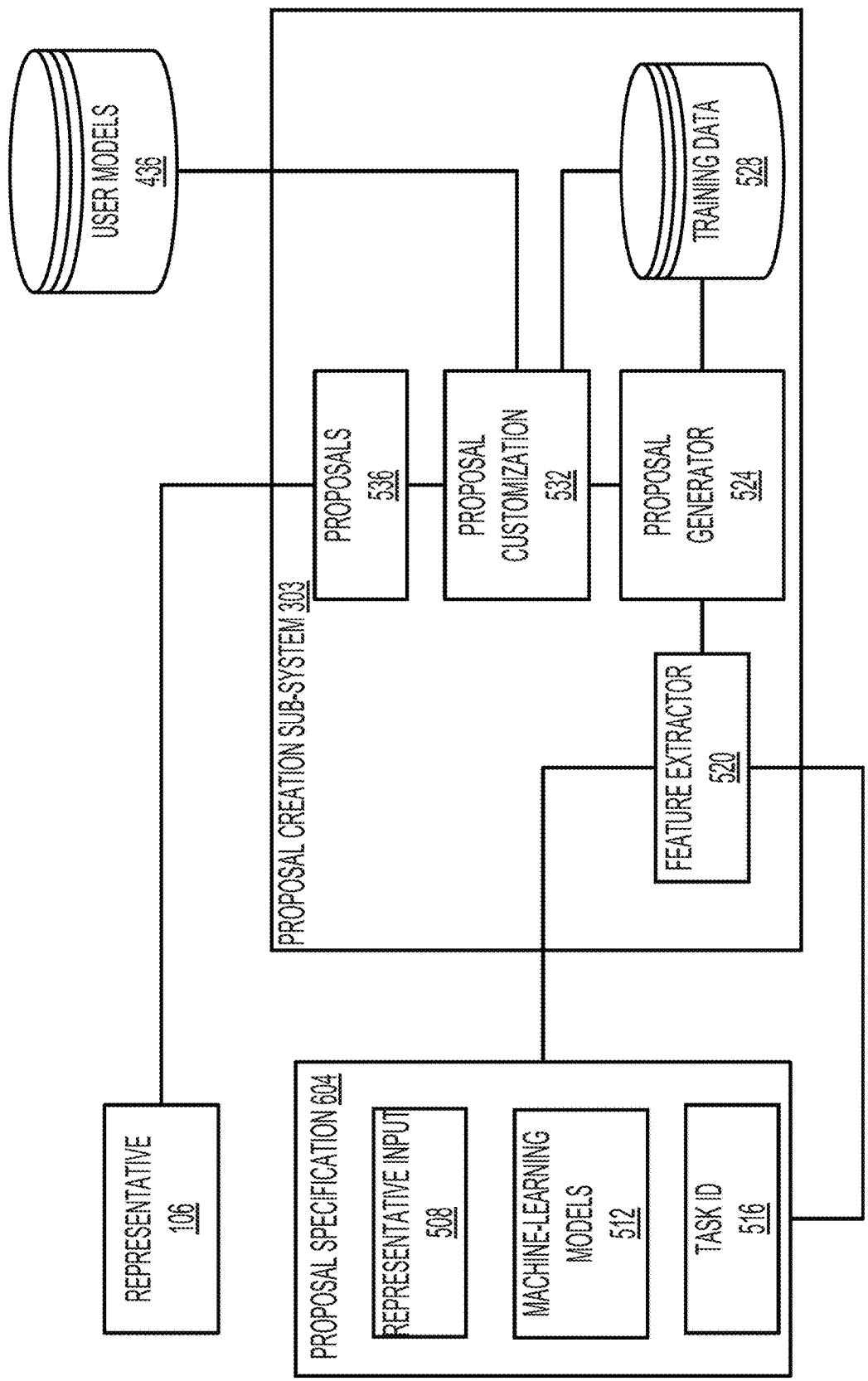
FIG. 5 depicts an illustrative example of a proposal creation sub-system, which generates and ranks proposals of recommended tasks configured to be performed for the benefit of a member in accordance with aspects of the present disclosure.

FIG. 5 depicts an illustrative example of a proposal creation sub-system 303, which generates and ranks proposals of recommended tasks configured to be performed for the benefit of a member in accordance with aspects of the present disclosure. In some instances, a proposal may be an implementation of a task that is configured for execution (e.g., performable by the member, the representative, by one or more third-party service providers, and/or the like). For example, the proposal for an evening activity may include (but is not limited to) an identification of the activity, identification of the cost of the activity, an identification of one or more particular vendors or service providers, identification of travel accommodations (e.g., flights, taxis, public transportation, hotels, etc.), cost of travel accommodations, reservations for the travel accommodations (e.g., airline tickets, hotel reservations, metro cards, etc.), food accommodations (restaurant reservations, etc.), and/or the like. In another example, a proposal for a roof repair may include an identification of the roof repair vendor, an identification of the cost, and an identification of the time over which the repair is to occur, and/or the like. In some instances, a proposal may be a complete implementation of the task such that the member need only authorize the performance of the proposal to facilitate performance of the task. In other instances, the proposal may include options and/or fields to be selected by the member.

A proposal specification 504 may include data usable by proposal creation sub-system 303 to generate a proposal such as, but not limited to representative input 508, machine-learning models 512, a task identifier 516, and/or the like. In some instances, the proposal specification 504 may include additional data such as data associated with the member (e.g., such as the user model, etc.), data associated with the selection or generation of the task by the member, data associated with the selection or generation of the task the representative 106, data associated with the selection or generation of the task by the task creation sub-system 304, and/or the like. The task specification 504 may be generated in response to a selection of task recommendation by the member (e.g., as previously described), by the representative 106 (e.g., if authorized by the member and/or the task facilitation service 102 to do so), by an automated service (e.g., such as an application or web portal, etc.), and/or the like.

The task ID 516 may identify a task for which a proposal is to be generated. A task template or task recommendation may be retrieved using the task ID 516. Alternatively, the representative 106 may select a task template that corresponds to the task ID 516. The task template or task recommendation may include one or more fields (e.g., a timestamp, third-party service provider, cost, activity, etc.) for which information can be included do define the implementation.

The representative input 508 may include information associated with the task, task template, task recommendations, any fields thereof, and/or the like. In some instances, the representative input 508 may include natural language correspondence (e.g., between the representative 106 and the member 118, between the representative 106 and another representative, between the representative 106 and other members, between the representative 106 and the task facilitation service 102, and/or the like). In some instances, the natural language input may be included in the proposal specification 504. In other instances, the natural language input may be processed by the machine-learning models 512 and the output of that processing may be included in the proposal specification 504. Machine-learning models 512 may include one or more machine-learning models trained to process member data (e.g., any of the data described in connection to the task specification 404) to identify fields content to be added to a field. The machine-learning models may include, but are not limited to, natural language processors, image processors (e.g., object recognition, computer vision, etc.), classifiers (e.g., that generate singlevariate or multivariate predictions based on input features, etc.), combinations thereof, or the like.

The proposal specification 504 may be passed to feature extractor 520, which may derive a set of features from which the proposal generator 524 can generate a proposal. Feature extractor 520 may operate as a filter that refines the raw set of data of the proposal specification 504 into a subset of the set of data that corresponds to the particular proposal being generated. For example, deriving features for all datapoints in the set of data may generate too many features (e.g., more features than are unusable by proposal generator 524 and/or a representative 106, features that may be contradictory or noisy, etc.), which may reduce the accuracy of the proposal generation. In some examples, feature extractor 520 may reduce the quantity of features generated by analyzing the set of data and generating and/or deriving features from the data known or likely to be usable by the proposal generator 524. In some instances, a machine-learning model (e.g., such as a classifier, or the like) may be used to classify datapoints and/or features according to a likelihood of being usable to proposal generator 524. to improve the identification tasks.

The feature extractor 520 may reduce the quantity of features generated by, eliminating features unlikely to be usably by the proposal generator 524 (e.g., below a threshold likelihood, or the like), deriving features from two or more features, applying dimensionality reduction algorithm (e.g., principal component analysis, a discriminant analysis such as linear or general, and/or the like), combinations thereof, or the like. In other examples, feature extractor 520 may add new features derived from features in the set of features to compensate for unbalanced feature weights (e.g., adding additional features to under weighted features may increase those weights to ensure equal representation), or the like.

The features extracted by feature extractor 520 may be passed to proposal generator 524. Proposal generator 524 may include one or more machine-learning models configured to generate a proposal. Alternatively, the proposal generator 524 may include one or more processes operated automatically or by the representative 106. The machine-learning models may identify each aspect of the proposal by predicting a likelihood that particular fields of the proposal will be approved by the member (e.g., particular dates, vendors, costs, etc.). For example, the machine-learning model may predict a particular flight and seat assignment that the member would want to select. Each prediction may be associated with a corresponding accuracy metric (e.g., a degree in which the prediction fits the model, training data 528, input features, and/or a likelihood that the prediction will be selected or approve by the member). The machine-learning models may also output an accuracy metric that corresponds to the overall proposal to provide the representative 106 and/or the member with an idea as to how well the overall proposal corresponds to the input features, the training data 528, the models, etc.

The machine-learning models and/or the representative 106 may be trained using unsupervised learning with reinforced learning thereafter. Since little may be known about the member when the member establishes a connection with the representative 106 and/or the task facilitation service, the training data 528 may that corresponds to the particular member may be too small for supervised learning. The training data 528 may be padded with additional data corresponding to other representatives, other members, procedurally generated data, and/or the like. Once the machine-learning models are trained, the machine-learning models may be refined using reinforcement learning (e.g., executing an intermediate retraining of the proposal generator in regular intervals such when a proposal is generated and user input approving, disapproving, and/or modifying the proposal is received). For example, a generated proposal that is approved may refine the machine-learning models (e.g., internal weights, etc.) to ensure a similar set of input features will be more likely to generate the approved proposal. In some instances, the reinforcement learning may also use execution information (e.g., information associated with the entities that performed the tasks and/or portions thereof such as the task facilitation service 102, the representative 106, other representatives, the third-party service providers, and/or the like).

Once trained, the machine-learning models and/or the representative 106 may be periodically retrained (e.g., every n days, based on the member input, based on the representative input, based on the accuracy metrics, and/or the like). Since information associated with each generated proposal and the indication as to whether the proposals were approved, disapproved, and/or modified is stored in the training data 528, the training data 528 include more information that is associated with the particular member the longer the proposal creation sub-system 303 operates for a particular member.

In some instances, the training data 528 may store a predetermined quantity of data. Initially, when little may be known about the member, the training data 528 may mostly include information associated with the representative 106, other representatives, other members, procedurally generated data, and/or the like. As new data is stored in the training data 528 (e.g., proposal generated for the particular member), the older data may be removed from the training data 528 to preserve the data limit (e.g., the predetermined quantity of data). If the proposal creation sub-system 303 operates long enough, the training data 528 may be filled with only data corresponding to the particular member then only recent data corresponding to the particular member, etc. When retraining occurs, the resulting machine-learning models may be more accurate than the machine-learning models trained on the initial data.

The generated proposals may be output to a proposal customization 532. The proposal customization 532 includes interfaces (e.g., graphical user interfaces, application programming interfaces, and/or the like), for presenting the proposal to the representative 106 and/or the member 118. The proposal customization 532 may also include interfaces that can receive input from the representative 106 and/or the member 118 to approve, disapprove, and/or modify portions of the proposal and/or the overall proposal. For example, a proposal for task of repairing the HVAC system may include an identification of a third-party service provider providing the repair, an identification of parts, an identification of a vendor to acquire the parts and at what cost, an identification of the cost, and an identification of a time interval over which the repair is scheduled. The member 118 may provide input selecting a different third-party service provider, a different vendor to acquire the parts and/or different parts, and/or a different time interval over which to conduct the repair.

The proposal customization 532 may receiving input form user models and/or representative models (not shown). The user models 426 stores a user model that corresponds to the particular member, which may be usable to tailor a proposal to the particular member. In some instances, the proposal customization 532 may automatically (e.g., through an automated service) modify the proposal based on the user model and/or representative models. In other instances, the representative 106 may modify the proposal using the user models 436. The user model may be queried and/or executed to predict preferences of the member. The predicted preferences may be based on previously executed proposals (e.g., such as a vendor that the member has previously acquired an object from, etc.), information associated with the member, information obtained from device and/or applications associated with the member, information obtained from third-party services, combinations thereof.

Once the proposal customization 532 terminates, the results of the proposal customization 532 may be passed to training data 528 for improving the performance of the proposal generator 524 (e.g., training the machine-learning models and/or the representative 106, retraining the machine-learning models and/or the representative 106, reinforcement learning of the machine-learning models and/or the representative 106, etc.).

Proposals 540 may be a buffer that stores a set of proposals for presentation to the representative 106 for selection (e.g., by the representative 106 and/or the member 118). Proposals 540 may include an interface (e.g., such as a display interface, communication interface, application programming interface, and/or the like) that can present the proposals generated by proposal generator 528 to the representative 106 and/or the member 118. In some instances, proposals 540 may rank the proposals in an order determined by proposal generator 528 (e.g., based on the accuracy metrics, or the like), by the member 118 (e.g., via user input, the user model, or the like), and/or by the representative 106. The set of proposals may include a proposal for multiple tasks or multiple proposals for a single task. For example, the proposal generator 524 and/or the representative 106 may generate multiple variations of a proposal for the member. A first proposal for a task corresponding to a HVAC repair may include an identification of a first third-party service provider providing the repair a first time interval for the repair. A second proposal for that task, may include a different time interval and/or a different third-party service provider providing the repair, or the like. Proposal generator 524 and/or the representative 106 may generate a single proposal for a given task, a predetermined quantity of proposals for a given task (e.g., to prevent overloading the member), or any quantity of proposals for a given task.

The representative 106 may select the proposals from the proposals 536 to present to the member for member approval. In some instances, the member may request further customization of a particular proposal. In those instances, the process may return to proposal customization 532, where the proposal may be customized according to the member input. Approved proposal may be transmitted to the party assigned to execute the proposal (e.g., the representative 106, another representative, the task facilitation service, third-party service provider, and/or the like identified by the proposal as implementing some or all of the task). The task facilitation service may transmit the proposal to the assigned party (e.g., using an application programming interface configured to enable communications between the task facilitation service and the assigned party, etc.). An indication of the approval, disapproval, and/or modification of the set of proposals of proposals 536 may be transmitted to the training data 528 (e.g., to further refine the proposal generator 524 and/or the representative 106) and/or to the user models 436 and/or representative models (not shown).

Figure 6:
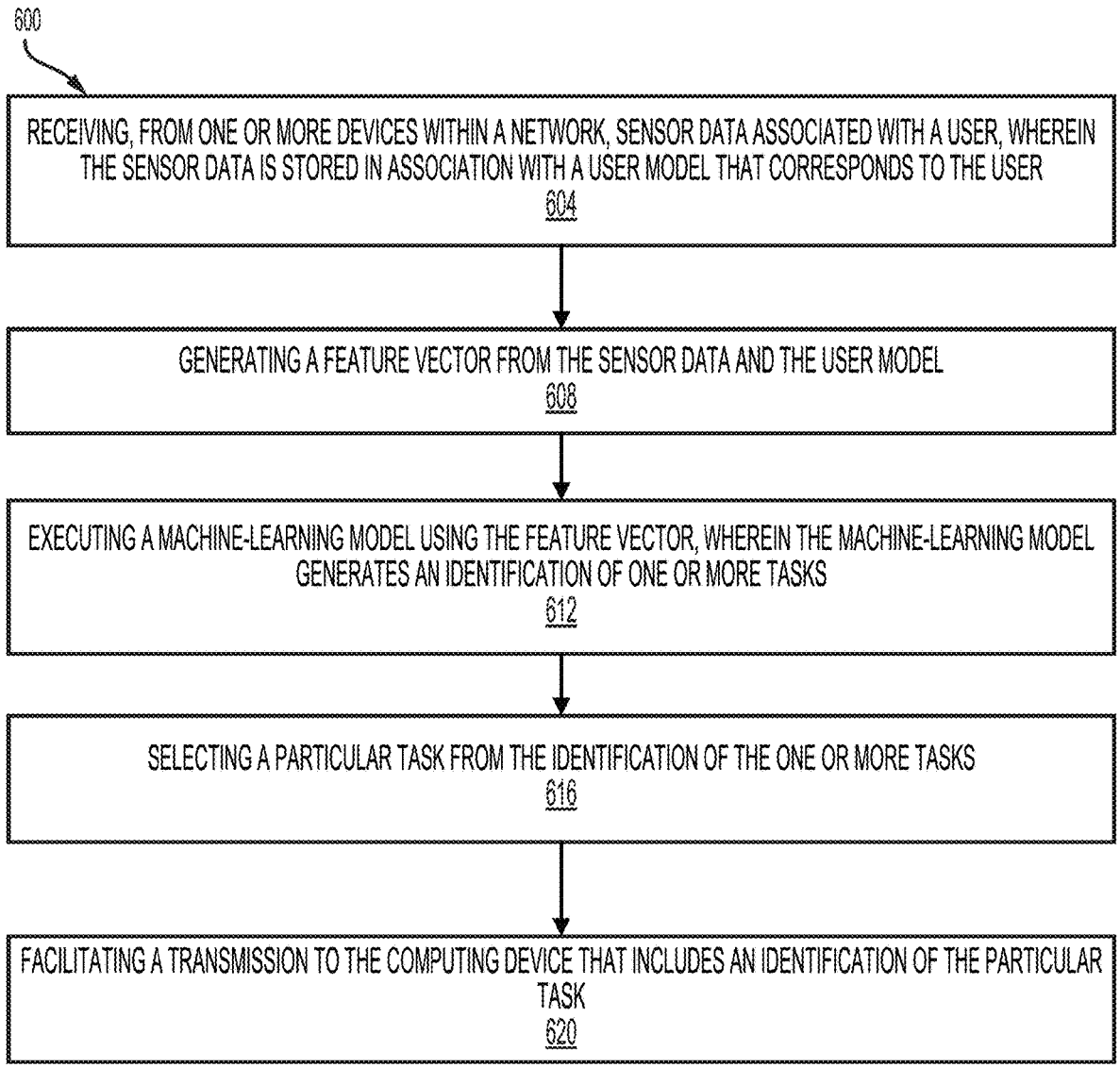
FIG. 6 depicts a flowchart of an example process for generating task recommendations for performance by a task facilitation service in accordance with aspects of the present disclosure.

FIG. 6 depicts a flowchart of an example process 600 for generating task recommendations for performance by a task facilitation service in accordance with aspects of the present disclosure. At block 604, sensor data associated with a user (e.g., such as a member, as previously described) may be received (e.g., by a task facilitation service 102, a representative 106, and/or the like). The sensor data may be stored in association with a user model that corresponds to the user. The sensor data may include any data associated with the user such as user input (e.g., text, audio, and/or video transmitted directly or indirectly from the user, or the like), data generated or derived from a device associated with the user (e.g., such as IoT devices; mobile devices such as smartphones, personal digital assistants, and/or the like; computing devices such as personal computers, servers, database, and/or the like; sensor devices such as, but not limited to thermometers, hygrometers, magnetometers, pressure sensors, accelerometers, and/or the like; cameras such as still image cameras; motion cameras; infrared cameras, and/or the like; microphones; combinations thereof; or the like), applications associated with the user (e.g., calendar, contacts, SMS and/or direct messaging applications, email, to-do lists, shopping lists, other lists, social media, games, and/or the like), third-party services (e.g., applications and/or services used by the user such as, but not limited to, music streaming services, video streaming services, food preparation services, cleaning services, child/elder care services, and/or any other application and/or service), devices associated with other users (e.g., family members, friends, acquaintances that may have information associated with the user and who have agreed to share information with a task facilitation service), combinations thereof, or the like. In some instances, the sensor data may be received in real time.

Alternatively, or additionally, the sensor data may be received from a resource library that stores information received from any of the aforementioned sources.

A user model may be generated from information associated with the user obtained over a predetermined time interval (e.g., such as the duration over which the user has been utilizing the services of the task facilitation service). In some instances, the user model may be generated by a machine-learning model and/or the representative to encapsulate the information. The user model may be queried to obtain particular information. In some instances, the user model may be executed using input features to generate a prediction associated with the user. The prediction may correspond to a task that may be of interest to the user, a preference of the user, a decision that the member would make given particular question and/or information, and/or the like.

In some instances, the sensor data may include a portion of the data associated with the user that may be likely to correspond to a task or from which a task can be identified. For example, the sensor data may include one or more communications between the user and a representative of the task facilitation service, the user and a user associated with the user (e.g., such as a family member, friend, coworker, etc.), and/or the like that include a topic (e.g., identified by a machine-learning classifier, keywords, the representative, or the like) associated with a task (e.g., such as an event, an action, a previously executed or identified task, etc.). The sensor data may be augmented with other information associated with the member and the topic or task. For example, the user may discuss a preferred musician (e.g., topic) that may be associated with a "concert" task. The sensor data may then be augmented with other data associated with the user (e.g., availability of the user to attend a concert, preferred ticket types, preferred travel types, etc.), data associated with the topic or "concert" task (e.g., tour dates, ticket availability and/or cost, etc.). Such that the augmented sensor data may include a complete set of data usable to generate a task recommendation and a proposal (if approved by the user).

At block 608, a feature vector may be generated from the sensor data and the user model. The feature vector may include a set of features organized according to a particular taxonomy such as time (e.g., with the features organized according to the time in which the underlying data was received and/or generated), data type, task type, user type, and/or the like. Features may be derived directly from the sensor data and/or user model, derived from the sensor data and/or user model, and/or the like. In some instances, feature selection (e.g., deriving one feature from one or more other features, executing dimensionality reduction algorithms, and/or the like) may be utilized to reduce the features to be included in the feature vector.

The feature vector may be generated by selecting features that are predictive of a particular task, task type, class of tasks, class of task types, and/or the like. The predictiveness of each feature may be assessed by previous tasks facilitated by the task facilitation service for the user, correspondence with the user, the user model, user input, and/or the like. Features that are predictive for particular tasks, task types, class of tasks, class of task types, etc. may be identified for inclusion into the feature vector. The identified features may then be organized according to the particular taxonomy of the feature vector. Features that do not have a high indicated predictiveness (e.g., based on thresholds, etc.), may be omitted from the feature vector and/or from further processing for this iteration of the task facilitation service.

A block 612, a machine-learning model may be executed using the feature vector to generate an identification of one or more tasks. Alternatively, or additionally, the feature vector may be processed by an automated service, a representative of the task facilitation service, etc. to generate the identification of the one or more tasks. The one or more tasks may be configured to be performed and/or executed entirely, or in part, by one or more of the task facilitation service 102, the representative 106, other representatives, the user, other users, one or more third-party service providers, and/or the like. The machine-learning model may include one or more of the machine-learning models of the task generator 428 of FIG. 4. An identification of a task may correspond to an output of the task generator 428 or proposal generator 528. The machine-learning model may identify a task type and/or template from the feature vector. The task type and/or task template may be a generalized task with a set of empty fields configured to particularize the task to the user. For example, the task template may include "repair object at location" where both object and location may be empty fields of the task template. The machine-learning model (and/or automated service, representative, etc.) may then generate a multivariate output that corresponds to predictions for the fields in the task template. Tasks and/or task templates may include any number of fields. Returning to the previous example, the machine-learning model may output "repair roof at primary residence". The machine-learning model may include a natural language generator configured to convert the task and predicted fields into conversational format that can be communicated to the user. In some instances, the functionality of the machine-learning model may be provided by the representative.

The machine-learning model may generate an accuracy metric associated with the output from the machine-learning model. The accuracy metric may indicate a degree in which the predicted task, task type, field, group of fields, and/or the like correspond fit the input feature vector or correspond to values that would have been selected by the user. The accuracy metric may also indicate a quality of hyperparameters, training data, the training process, weights of the machine-learning model, other internal data of the machine-learning model, and/or the like. The accuracy metric may be used to determine if an identification of a task should be presented to the user for approval. If the accuracy metric of a field is below a threshold, then the field may be set to null or otherwise left empty. In some instances, the accuracy metric may be used modify or adjust aspects of the machine-learning model (e.g., the hyperparameters, internal weights, etc.), to initiate a training iteration (for reinforcement learning, etc.), to train a new machine-learning model to replace this machine-learning model, and/or the like.

At block 616, A particular task from the one or more tasks may be selected. The particular task may be selected based on the accuracy metric of the one or more tasks, user input, representative 106 input, task type, a priority metric, and/or the like. In some instances, the particular task may be selected based on a correspondence between the sensor data and/or feature vector and a task type of the particular task. For example, the sensor data and/or feature vector may be indicative of a particular task type. During execution of the machine-learning model, an identification of two tasks may be generated with one task having a stronger correlation to the sensor data and/or feature vector (e.g., determined by correlation coefficient or R-value, or the like). As a result, the particular task may be a task having the strongest correlation to the sensor data and/or feature vector.

The selection of the particular task may be used by the machine-learning model (or the representative 106) for reinforcement learning. The selection may be indicative of an accuracy of the machine-learning model (or the representative 106) in selecting, prediction, and/or generating tasks for the user. The selection may be used with the output from the machine-learning model (or the representative 106) to refine the operations of the model in favor of tasks that were selected by the representative 106 and/or user and away from tasks that were not selected (or that were modified by) the representative 106 and/or the user.

At block 620, a transmission that includes an identification of the particular task may be facilitated. Facilitating the transmission may include causing the identified transmission to be transmitted to a device. In some instances, facilitating the transmission may include transmitting the identification of the particular task to the user for user approval (if the user has not already approved the task). In other instances, facilitating the transmission may include transmitting the identification of the particular task (or a portion thereof) to one or more of, the task facilitation service, the representative 106, one or more third-party service provider, and/or the like for performance of the particular task.

Once the task is transmitted for performance by one or more assigned entities, the process may return to block 604. In some instances, sensor data may be continuously received. As a result, the process of FIG. 6 may be executed continuously. In some instances, multiple instances of the process may execute. In those instances, the processes may execute in series and/or in parallel with other instances of the process. Alternatively, if no further sensor data is received, the process may terminate.

Figure 7:
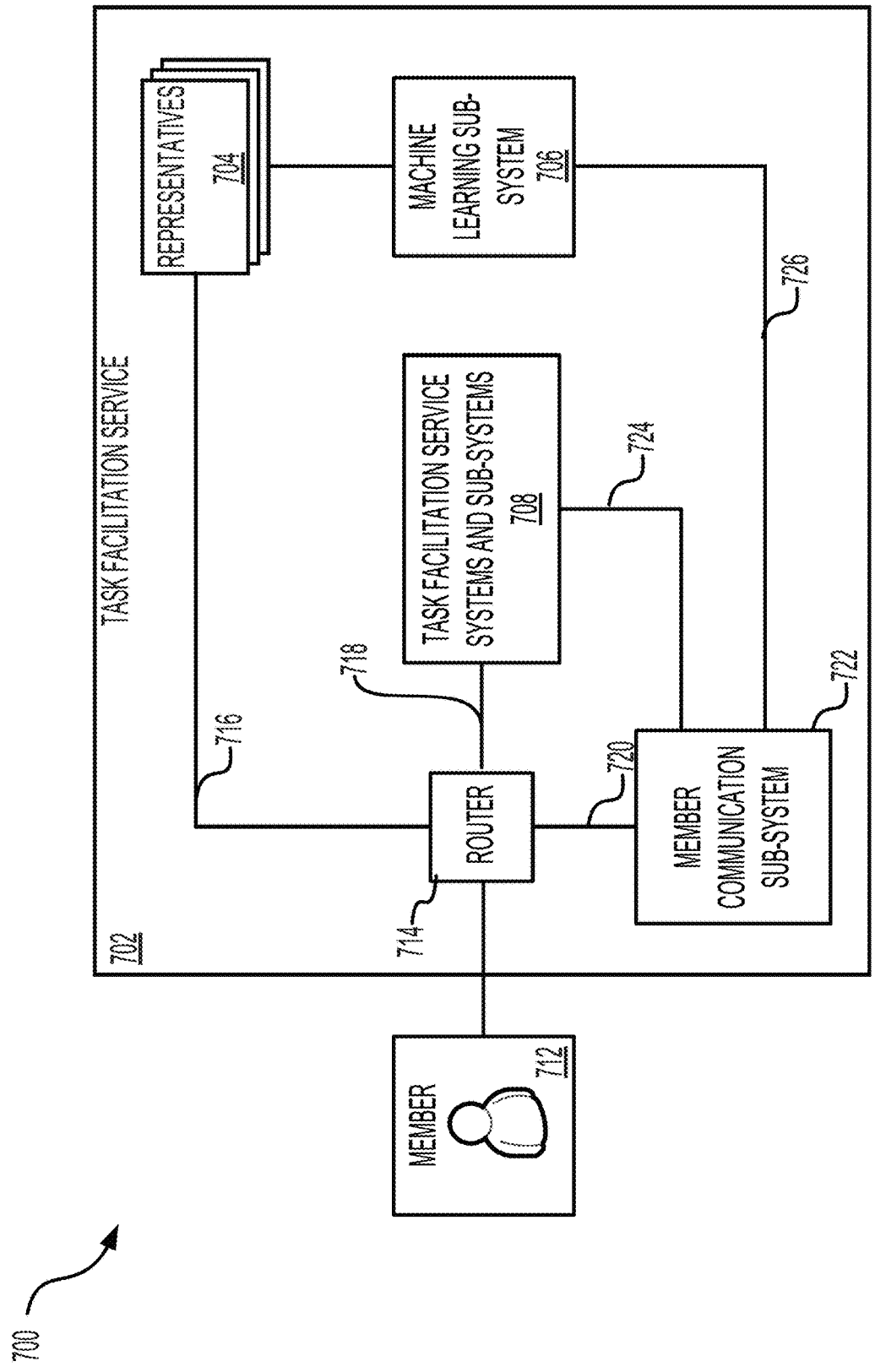
FIG. 7 illustrates a block diagram of an example environment for facilitating task execution in accordance with aspects of the present disclosure.

FIG. 7 illustrates a block diagram of an example environment 700 for facilitating task execution in accordance with aspects of the present disclosure. In some examples, operations performed by representatives 704 are partially and/or fully performed using one or more machine-learning algorithms, artificial intelligence systems and/or computational models. For example, as the representatives 704 perform or otherwise coordinate performance of tasks on behalf of a member 712, the task facilitation service 702 may update a profile of the member 712 and/or a computational model of the profile of the member 712.

In some examples, as the representatives 704 perform or otherwise coordinate performance of tasks on behalf of a member 712, the task facilitation service 702 updates a profile of the member 712 and/or a computational model of the profile of the member 712 continuously. For example, as a member 712 communicates with a system of the task facilitation service 702, the task facilitation service 702 may update the profile of the member 712 and/or a computational model of the profile of the member 712 continuously during the course of the interaction.

In some examples, as the representatives 704 perform or otherwise coordinate performance of tasks on behalf of a member 712, the task facilitation service 702 updates a profile of the member 712 and/or a computational model of the profile of the member 712 dynamically. For example, as a task is performed on behalf of a member 712, a vendor performing the task may provide regular updates to the task facilitation service 702 and the task facilitation service 702 may update the profile of the member 712 and/or a computational model of the profile of the member 712 dynamically at each update from the vendor.

In some examples, as the representatives 704 perform or otherwise coordinate performance of tasks on behalf of a member 712, the task facilitation service 702 updates a profile of the member 712 and/or a computational model of the profile of the member 712 automatically. For example, when a proposal is generated for the member, the task facilitation service 702 may update the profile of the member 712 and/or a computational model of the profile of the member 712 automatically as part of the proposal generation process.

In some examples, as the representatives 704 perform or otherwise coordinate performance of tasks on behalf of a member 712, the task facilitation service 702 updates a profile of the member 712 and/or a computational model of the profile of the member 712 in real-time. For example, when a member 712 accepts a proposal, the task facilitation service 702 may update the profile of the member 712 and/or a computational model of the profile of the member 712 at the time that the proposal acceptance is provided, rather than delaying the update.

In some examples, the task facilitation service 702 updates a profile of the member 712 and/or a computational model of the profile of the member 712 using a machine learning sub-system 706 of the task facilitation service 702. In some examples, a machine learning sub-system 706 is a component of the task facilitation service 702 that is configured to implement machine-learning algorithms, artificial intelligence systems, and/or computation models. In an example, a machine learning sub-system 706 may use various algorithms to train a machine-learning model using sample and/or live data. Additionally, a machine learning sub-system 706 may update the machine-learning model as new data is received. In another example, the machine learning sub-system 706 may train and/or update various artificial intelligence systems or generate, train and/or update various computational models. For example, a computational model of the profile of the member 712 may be generated, trained and/or updated by the machine learning sub-system 706 as new information is received about the member 712.

In some examples, after the profile of the member 712 and/or a computational model of the profile of the member 712 has been updated over a period of time (e.g., six months, a year, etc.) and/or over a set of tasks (e.g., twenty tasks, thirty tasks, etc.), systems of the task facilitation service 702 (e.g., a task recommendation system) utilize one or more machine-learning algorithms, artificial intelligence systems and/or computational models to generate new tasks continuously, automatically, dynamically, and in real-time. For example, the task recommendation system may generate new tasks based on the various attributes of the member's profile (e.g., historical data corresponding to member-representative communications, member feedback corresponding to representative performance and presented tasks/proposals, etc.) with or without representative interaction. In some examples, systems of task facilitation service 702 (e.g., a task recommendation system) can automatically communicate with the member 712 to obtain any additional information needed and can also generate proposals that may be presented to the member 712 for performance of these tasks.

In the example illustrated in FIG. 7, communications between the member 712 and the task facilitation service 702 may be routed to one or more entities within the task facilitation service 702. The example illustrated in FIG. 7 shows a communication router 714 (referred to in the illustration as a "router") however, as may be contemplated and as illustrated in FIG. 7, the router 714 is an abstract representation of one or more techniques for routing communications between entities. Accordingly, communications from the member 712 to the task facilitation service 702 may be routed to one or more entities of the task facilitation service and communications from the one or more entities of the task facilitation service 702 may be routed back to the member 712.

In the example illustrated in FIG. 7, the representatives 704 can monitor communications between task facilitation service systems and/or sub-systems 708 and the member 712 to ensure that the interaction maintains a positive polarity as described herein because the communications can be routed 716 to the representatives 704 and also routed 718 to task facilitation service systems and/or sub-systems 708. For example, if a member 712 is interacting with the task recommendation system, the representatives 704 can determine whether the member 712 is satisfied with the interaction. If the representatives 704 determine that the conversation has a negative polarity (e.g., that the member 712 is not satisfied with the interaction), the representatives 704 may intervene to improve the interaction.

Similarly, other interactions between task facilitation service systems and/or sub-systems 708 and the member 712 may be routed 720 to a member communication sub-system 722 which may be configured to monitor the interactions between task facilitation service systems and/or sub-systems 708 and the member 712. In some examples, the member communication sub-system 722 can be configured to intercept the interactions between task facilitation service systems and/or sub-systems 708 and the member 712 (using, for example, the router 714). In those examples, all such interactions can be routed 720 between the member 712 and the member communication sub-system 722 and can be routed 724 between the member communication sub-system 722 and the task facilitation service systems and/or sub-systems 708. In those examples, interactions between the task facilitation service systems and/or sub-systems 708 and the member 712 may not be routed 718 directly. In those examples, the representatives 704 may still monitor interactions between task facilitation service systems and/or sub-systems 708 and the member 712 to ensure that the interaction maintains a positive polarity as described above (e.g., by routing 716 the interactions to the representatives 704).

In some examples, the representatives 704 can interact with the machine learning sub-system 706 to update the profile of the member indicating changing member preferences based on an interaction between the representatives 704 the member 712. In some examples, the task facilitation service systems and/or sub-systems 708 can interact with the machine learning sub-system 706 to update the profile of the member when, for example, a proposal is accepted or rejected. Additionally, as illustrated in FIG. 7, the interactions between the task facilitation service 702 and the member 712 can be additionally routed 726 between the member communication sub-system 722 and the machine learning sub-system 706. Accordingly, interactions between the member 712 and, for example, a proposal creation sub-system may be used to update the profile of the member as a proposal is created.

Thus, unlike automated customer service systems and environments, wherein the systems and environment may have little or no knowledge of users interacting with agents and/or other automated systems, task facilitation service systems and/or sub-systems 708 can update the profile of the member 712 and/or a computational model of the profile of the member 712 continuously, dynamically, automatically, and/or in real-time. For example, task facilitation service systems and/or sub-systems 708 can update the profile of the member 712 and/or a computational model of the profile of the member 712 using the machine learning sub-system 706 as described herein. Accordingly, task facilitation service systems and/or sub-systems 708 can update the profile of the member 712 and/or a computational model of the profile of the member 712 to provide up-to-date information about the member based on the member's automatic interaction with the task facilitation service 702, based on the member's interaction with the representative 704, and/or based on tasks performed on behalf of the member 712 over time. This information may also be updated continuously, automatically, dynamically, and/or in real-time as tasks and/or proposals are created, proposed, and performed for the member 712. This information may also be used by the task facilitation service 702 to anticipate, identify, and present appropriate or intelligent interactions with the member 712 (e.g., in response to member 712 queries, needs, and/or goals).

As previously discussed, systems according to the present disclosure may include elements and functionality directed to receiving task data and proposing or generating a task for a member based on the received task data. In certain implementations, generating tasks may be a substantially manual process. For example, and with reference to elements of FIG. 1, member 118 may interact with representative 106 to identify a task. Member 118 and/or representative 106 may then provide all or substantially all information related to the completion of the task. In other implementations, task facilitation service 102 may include task recommendation system 112, which analyzes data available to task facilitation service 102 and provides recommendations regarding potential tasks for member 118 based on available task data (e.g., as stored in task datastore 110), user data (e.g., as stored in user datastore 108), a model of member 118 maintained by task facilitation service 102, and similar data and models.

While a substantial proportion of data collected and used by task facilitation service 102 to recommend and generate tasks may originate from interactions between task facilitation service 102 and member 118, such data may also originate from various other sources and may be obtained by task facilitation service 102 using various mechanisms. For example, computing device 120 of member 118 may include various applications that may communicate or interact with task facilitation service 102, such as through an external application program interface (API), to exchange task and user data. Similarly, task facilitation service 102 may obtain task and user data through links to external accounts of member 118, through publicly available or other databases, by scraping or otherwise accessing resources and web pages over the Internet, and the like. Stated differently, task facilitation service 102 may ingest and obtain data relevant to proposing and generating tasks for member 118 from any suitable resource and may not be limited to data collected directly from member 118.

Implementations of the present disclosure provide various and notable advantages over conventional task management systems. In general, systems and methods of this disclosure include a task facilitation service that collects data from multiple internal and external sources and relies on the collected data to provide task recommendations to members or generate tasks for members based on models maintained and updated by the task facilitation service. Conventional applications related to task management and productivity, on the other hand, rely almost exclusively on users manually generating new tasks, inputting information for tasks, and updating task statuses, among other things. Accordingly, in the context of conventional task management applications, as a user's list of tasks grows and becomes more complicated, simply reviewing and updating tasks can occupy a substantial amount of the user's time and energy. Conventional task management and task management applications facilitate task tracking but do little in the way of providing intelligent and dynamic task-related recommendations to users and, in particular, providing such recommendations based on a holistic view of the user that considers data from third-party applications, external data sources, data from other members, and a breadth of other information.

Providing meaningful task recommendations substantially enhances member experience but can also provide various technical advantages over conventional, manually-driven task management systems. As a first, non-limiting example, implementations of this disclosure can help save computing resources by improving the relevance of tasks and information managed by the task facilitation service. More specifically, by relying on various sources of internal and external data and dynamically updated predictive models, the task facilitation service can improve the likelihood that task recommendations provided to or new tasks generated on behalf of the member are highly relevant. As a result, the number of irrelevant tasks and corresponding resources (e.g., processing power, memory, bandwidth) required to generate and manage those tasks is substantially reduced. Moreover, by improving the likelihood that a given task will be relevant, the task facilitation service also improves the likelihood that the task will be completed in a timely and efficient manner. By doing so, implementations of this disclosure minimize the duration of tasks and the resources necessary to track and manage active tasks. Also, by facilitating efficient task completion, implementations of this disclosure enable task data for completed tasks to be deleted or archived in a resource-efficient format.

As another example, implementations of this disclosure reduce resource consumption and improve data integrity by facilitating synchronization of data across applications. For example, a member may maintain information regarding a given task within each of an application associated with the task facilitation service and a third-party application, such as a calendar or task management application. In implementations of this disclosure, data relevant to each application is readily exchanged and updated such that task progress and updates by the task facilitation service are readily reflected by the third-party application and vice-versa. Doing so eliminates the time, computing resources, and risk of error associated with manual synchronization of data.

As yet another example, implementations of this disclosure also reduce resource consumption by reducing or eliminating the need for members to open and access data from multiple applications when generating or managing tasks. More specifically, the task facilitation service may dynamically and automatically collect data from third-party applications and other data sources for purposes of generating tasks and task recommendations and updating predictive models of the task facilitation service. By automating these processes, implementations of this disclosure eliminate the need for a member to open third-party applications, drill-down or otherwise navigate to relevant data, and manually transfer data between applications, saving the corresponding computing resources.

The foregoing are non-limiting examples of various technical improvements and advantages provided by implementations of the present disclosure. Other advantages and technical benefits should be readily identifiable by one of skill in the art having the benefit the following description and the various examples it includes.

Figure 8:
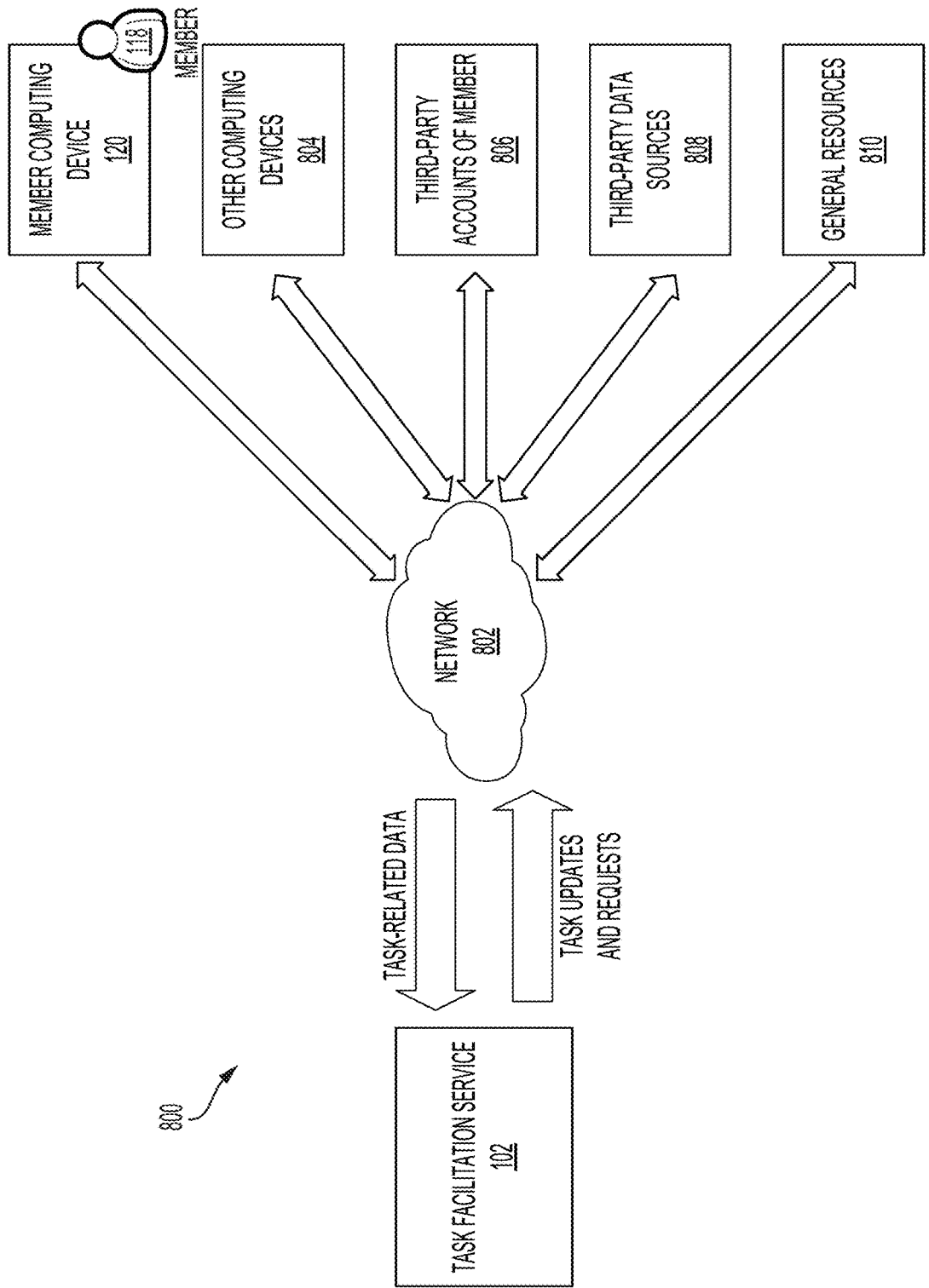
FIG. 8 shows an illustrative example of an environment including a task facilitation service in communication with various data sources.

FIG. 8 illustrates an environment 800 illustrating exchange of task-related data between task facilitation service 102 and various sources of task and user data. In at least certain implementations, task facilitation service 102 may communicate and exchange data with the sources over a network 802, such as the Internet; however, this disclosure contemplates that task facilitation service 102 may receive task and user data from any source using any suitable communication medium or modality.

As a first example source of task and related data, environment 800 includes computing device 120, which, for purposes of this discussion is directly associated with and used by member 118. In certain implementations, member 118 interacts with task facilitation service 102 using a corresponding application. For example, the application may generally include a user interface that allows member 118 to access information for tasks associated with member 118 and facilitated by task facilitation service 102. Among other things and without limitation, the user interface may include features such as a task list with information about existing tasks from which member 118 may select a task to obtain more detailed information about the task. The user interface may further include a chat or messaging interface through which member 118 may communicate with task facilitation service 102 (e.g., with representative 106 assigned to member 118).

Considering the foregoing, the application executed on computing device 120 and corresponding to task facilitation service 102 may provide a substantial portion of task and user data used by task facilitation service 102 to recommend and generate tasks for member 118. For example, the application may permit member 118 to create or request creation of a task and to provide details regarding the task to be created either directly through the user interface or by communicating the request and details to representative 106. The application may similarly act as a source of user data for member 118. For example, task facilitation service 102 may maintain a profile for member 118 and the application may permit member 118 to access and update the profile with personal information and similar details about member 118. Like task data, member 118 may also provide user data through interactions with representative 106. For example, user data for member 118 may be collected through a chat interface or messaging feature included in the application.

In addition to an application that is related to task facilitation service 102, computing device 120 may also execute one or more third-party applications that may exchange data with task facilitation service 102, such as through an API. For example, and as further described below, computing device 120 may execute a third-party calendar application for member 118 that provides various time management and calendaring features. In certain implementations, task facilitation service 102 may be configured to obtain relevant data from the calendar application (such as scheduling/availability information for member 118 and details for events) and may use the obtained information to recommend or generate tasks for member 118 within the context of task facilitation service 102. As another example, computing device 120 may execute a task management application that includes a list of to-dos or tasks for member 118. Task facilitation service 102 may be configured to obtain relevant data from the task management application, such as details for items included in the task management application and recommend or generate tasks within the context of task facilitation service 102.

In certain implementations, communication and exchange of data between computing device 120 and task facilitation service 102 may occur between an instance of the third-party application executed on computing device 120. In other implementations, communication and exchange of data between computing device 120 and task facilitation service 102 may be facilitated by a secondary application associated with the third-party application and executed on computing device 120. For example, computing device 120 may support a first application with which member 118 interacts (e.g., a calendar application that allows a user to view, edit, etc., a calendar), but may also support a second application specifically adapted to communicate data associated with the first third-party application to task facilitation service 102. In such instances, the second application may be provided by task facilitation service 102, the third-party associated with the first application, or another third-party. In certain implementations, the second application may be a background process or may be periodically executed by computing device 120 to synchronize data between the first application and task facilitation service 102.

Notably, in addition to accessing data maintained by applications executed at computing device 120, task facilitation service 102 may also be configured to provide updates to external applications. For example, to the extent task facilitation service 102 stores details for a task that is also represented in an application of computing device 120, task facilitation service 102 may transmit updates related to the task to computing device 120 for use in updating the relevant application data. So, if task facilitation service 102 makes progress on or completes a task, task facilitation service 102 may transmit an update to a calendar or task management application of computing device 120 that includes an entry corresponding to the task to update any relevant application data.

In addition to task data received from computing device 120, task facilitation service 102 may also receive task and user data from computing devices other than computing device 120, as indicated by other computing devices 804.

In certain implementations, computing devices 804 may correspond to computing devices associated with other members of task facilitation service 102. Like the data obtained from computing device 120, when computing devices 804 correspond to other members of task facilitation service 102, data may be obtained from computing devices 804 through applications executed on computing devices 804. Such application may include an application directly associated with task facilitation service 102 or may include third-party applications with application data accessible by or otherwise provided to task facilitation service 102, such as through an API.

In other implementations, computing devices 804 may include computing devices associated with users that are not members of task facilitation service 102. For example, computing devices 804 may be associated with users that may have a relationship to member 118, such as family members or friends. Such users may give permission to task facilitation service 102 to access data from computing devices 804 or to provide data to computing devices 804. For example, computing devices 804 may correspond to family members of member 118 and may execute a third-party calendar application. In such instances, task facilitation service 102 may be configured to and given permission to access and update application data of the calendar application. By doing so, task facilitation service 102 may be able to generate and recommend tasks that consider availability and scheduling of the other users as well as synchronize application data between the member and non-member devices.

In still other implementations, computing devices 804 may include Internet of things (IoT) or other devices that may include sensors, software, and computing and communication elements. For example, computing devices 804 may include a computer-enabled heating and cooling system for a home or home appliance. Task facilitation service 102 may be configured to receive data regarding operational status of the system or the appliance such that task facilitation service 102 may generate or recommend tasks related to repair, maintenance, or upgrading of the system or appliance.

In yet other implementations, computing devices 804 may correspond to computing devices of service providers, such as service provides associated with third-party services 116. As noted above, third-party services 116 may be associated with a third-party that may be leveraged by task facilitation service 102 to complete tasks for member 118. By way of non-limiting example, third-party services 116 may correspond to a home repair or maintenance service provider (e.g., an HVAC repair company) and computing devices 804 may include a computing device or system associated with the service provider.

In implementations in which computing devices 804 correspond to third-party service providers, computing devices 804 may execute an application or provide access to a portal (e.g., a web-based portal) associated with task facilitation service 102. Such an application/portal may allow the third-party service provider to sign up for participation with task facilitation service 102, to create and maintain a third-party service provider profile with information about the third-party service provide and services offered by the third-party service provider, to submit and process invoices, to view status of tasks assigned to the third-party service provider, and the like. In other implementations in which computing devices 804 correspond to third-party service providers, computing devices 804 may correspond to computing systems of third-party service providers that store data associated with the third-party service provider and, in particular, any services provided by the third-party service providers related to tasks of task facilitation service 102.

More generally, computing devices 804 may include any computing device that may be accessed by task facilitation service 102 and from which task facilitation service 102 may obtain data relevant to recommending or generating tasks. In certain cases, task facilitation service 102 may also be configured to transmit data to computing devices 804 for any purpose.

In certain implementations, member 118 may provide permission to task facilitation service 102 to access external accounts 806 of member 118 or otherwise link task facilitation service 102 to external accounts 806 associated with member 118. Without limitation, such accounts may include email accounts, social media accounts, cloud-based application accounts, banking and finance accounts, and e-commerce and online shopping accounts. In such cases, task facilitation service 102 may be linked to external accounts 806 and given access/permission to exchange data with external accounts 806. Like applications executed at computing device 120, access to external accounts 806 may be facilitated by an API or similar interface that enables communication and interaction between task facilitation service 102 and external accounts 806.

Task facilitation service 102 may further access task data from third-party data sources 808 which may be independent of any specific accounts held by member 118. For example, task facilitation service 102 may access one or more publicly available databases or information services to obtain data relevant to task generation and recommendations. Among other things, third-party data sources 808 may include databases and services related to weather, traffic, news, events, and other similar information.

In certain implementations, third-party data sources 808 may also include web and data services provided by third parties to facilitate purchases of goods and services offered by the third parties. For example, a third-party may be an e-commerce site and may provide a web service for accessing inventory, pricing, and product information for available products. As another example, a third-party may be a ticket seller that makes available information regarding upcoming events including ticket availability and pricing. Another example third-party may be a restaurant or restaurant-related service that provides information related to available reservations.

Like previous discussed data source, access to third-party data sources 808 may be facilitated by corresponding APIs or similar interfaces.

FIG. 8 further includes general resources 810. Among other things, general resources 810 may include websites and similar online resources that may be publicly available and, therefore, accessible by task facilitation service 102. General resources 810 may also include electronically available reference materials, such as encyclopedias, guides, periodicals, or publications. More generally, however, general resources 810 is intended as a catch-all that includes any other data source accessible to task facilitation service 102 and from which task facilitation service 102 may obtain data relevant to generating and recommending tasks for member 118.

Notably, task facilitation service 102 may be configured to obtain data from any relevant source at any time for a given task. For example, task facilitation service 102 may access any of the data sources of FIG. 8 when identifying potential tasks and providing corresponding task recommendations to member 118. After member 118 chooses one of the recommendations to form the basis of a task, task facilitation service 102 may obtain additional data from the data sources to fully scope the task and generate proposals for completing the task. Task facilitation service 102 may also access the data sources to obtain information for purposes of completing a task according to a selected proposal.

Figure 9:
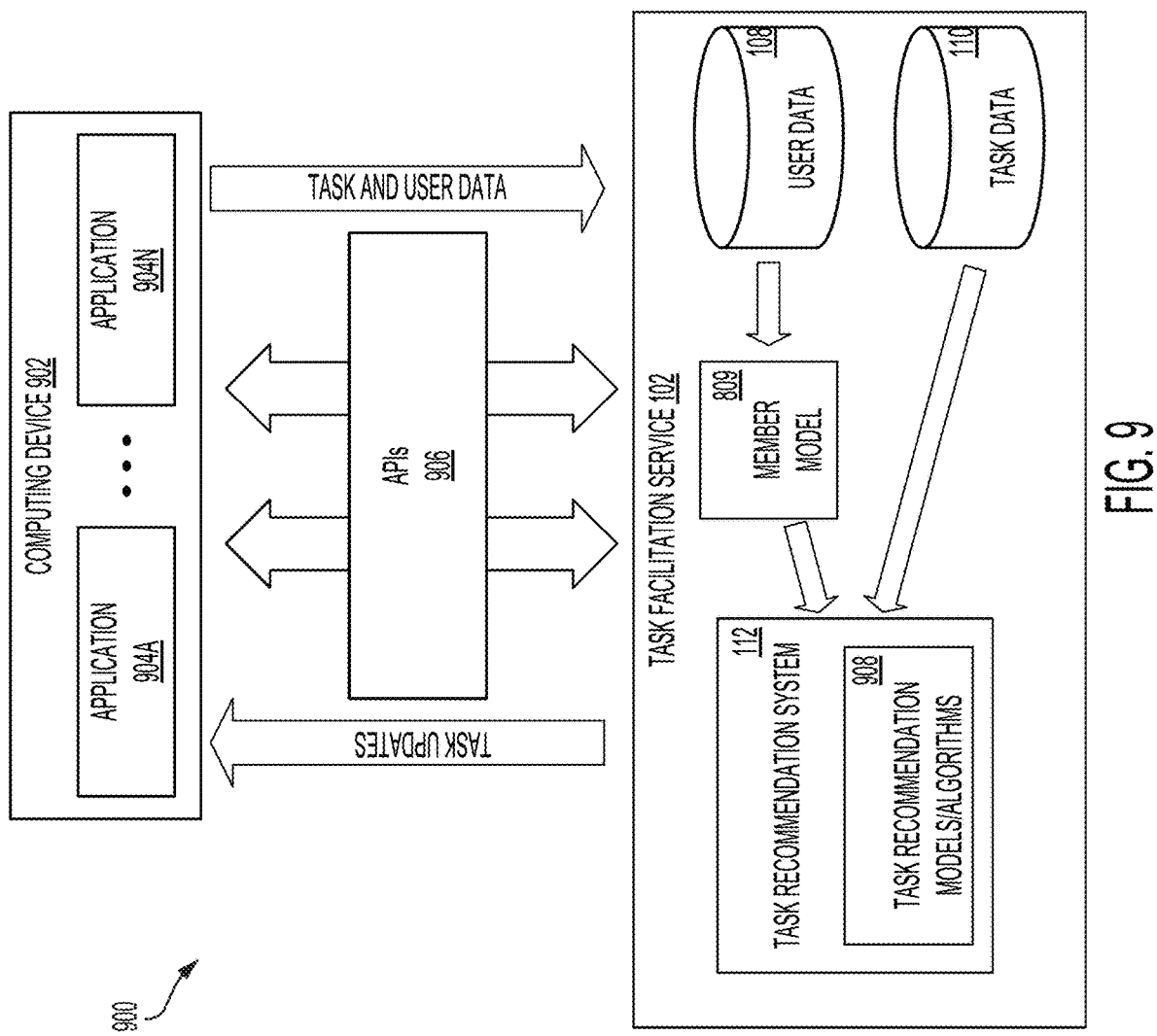
FIG. 9 shows an illustrative example of an environment including a task facilitation service in communication with applications of a computing device using one or more application program interfaces (APIs).

As noted above, in at least certain implementations, task facilitation service 102 may communicate with applications executed on computing devices using one or more APIs. FIG. 9 illustrates an example implementation of this concept and includes an operating environment 900 in which task facilitation service 102 exchanges task data with a computing device 902. Specifically, task facilitation service 102 exchanges data with one or more applications, e.g., applications 904A to 904N executed on computing device 902 using one or more application program interfaces (APIs) 906. In certain implementations, computing device 902 may correspond to computing device 120 of member 118; however, computing device 902 may more generally correspond to any computing device executing applications with which task facilitation service 102 may exchange data. For example, computing device 902 may correspond to any of computing devices 804, computing devices associated with external accounts 806, third-party data sources 808, and computing devices associated with general resources 810, each of which is illustrated in FIG. 8.

As shown in FIG. 9, exchange of data between task facilitation service 102 and applications 904A may generally include task facilitation service 102 receiving task or user data from applications 904A to 904N through APIs 906. In general, APIs 906 provide a connection between task facilitation service 102 and applications 904A to 904N over which data may be exchanged. In addition to supporting methods and functions for facilitating such communication, APIs 906 may also support functionality that translates task and user data from a first format as used or stored by applications 904A to 904N into a second format supported by task facilitation service 102.

As shown in FIG. 9, when task facilitation service 102 receives task and user data from computing device 902, task facilitation service 102 may store the received data in task datastore 110 and user datastore 108, respectively. The stored data may subsequently be used by a task recommendation system 112 to generate a task or provide recommendations for potential tasks to member 118 or representative 106.

Task recommendation system 112 may include or have access to one or more models/algorithms for generating tasks or recommended tasks, indicated as task recommendation models/algorithms 908 in FIG. 9. In general, task recommendation models/algorithms 908 may be configured to receive a feature vector of task and/or user data (e.g., from task datastore 110 and user datastore 108, respectively) and output one or more task recommendations based on the feature vector. Further details about the role and function of task recommendation system 112 are provided above in the context of FIGS. 1-3. Nevertheless, in at least certain implementations, task recommendation system 112 and task recommendation models/algorithms 908 may be updated based on feedback received from member 118 and/or representative 106. For example, task recommendation system 112 and task recommendation models/algorithms 908 may be updated and refined based on whether member 118 or representative 106 approve a recommended task generated by task recommendation system 112.

In certain implementations, user data received from computing device 902 may also be used to create, train, or update a member model 809 corresponding to member 118. In general, member model 809 may be maintained by task facilitation service 102 for purposes of predicting preferences and behavior and otherwise capturing characteristics of member 118. Task recommendation models/algorithms 908 may use characteristics of member 118 captured in member model 809 as additional features in the feature vector or as weightings/coefficients for algorithms of task recommendation models/algorithms 908, such that the recommended tasks output by task recommendation system 112 are tailored to the specific preferences and characteristics of member 118.

In at least certain implementations, member model 809 may be updated in real-time based on activity of member 118 as the activity is occurring. For example, member model 809 may be based in part on interactions between member 118 and representative 106, such as through a chat interface. During such interactions, task facilitation service 102 may analyze communications between member 118 and representative 106 to identify data and information regarding member 118 to include in or otherwise update member model 809. As another example, member 118 may provide personal information, such as by responding to a survey or questionnaire presented by task facilitation service 102. For example, task facilitation service 102 may present a survey or questionnaire to member 118 regarding preferences, mood, experience with task facilitation service 102, and the like. The responses provided by member 118 may then be added to user datastore 108 and subsequently and automatically used to update member model 809 based on the responses. In another example, task facilitation service 102 may collect data regarding interactions between task facilitation service 102 and member 118 during completion of a task or subsequent to completion of a task, such as feedback from member 118 regarding whether the task is being completed or was completed to the satisfaction of member 118. Such feedback may be solicited directly from member 118 (e.g., in the form of a survey, questionnaire, or prompt) or may be implicitly determined based on activity of member 118, such as communications between member 118 and task facilitation service representative 106. Again, such feedback may be used to update and refine member model 809 to reflect the preferences and characteristics of member 118 more accurately and dynamically.

Changes and updates to member model 809 based on receipt by task facilitation service 102 of relevant data may be made as soon as possible and, as a result, may be generally considered to occur in real-time. For example, receipt of new data regarding member 118 may cause task facilitation service 102 to update member model 809 based on the received data automatically (e.g., in response to task facilitation service 102 detecting a change in data maintained in user datastore 108). By doing so, member model 809 may consistently and promptly reflect all information regarding member 118 available to task facilitation service 102.

Task recommendation system 112 and elements of task recommendation system 112, such as algorithms 908, may similarly be updated in real-time based on activity of member 118 as the activity is occurring. For example, aspects of task recommendation system 112 may be updated in response to interactions between member 118 and representative 106, such as through a chat interface. During such interactions, task facilitation service 102 may analyze communications between member 118 and representative 106 to identify data and information regarding tasks and task recommendations and subsequently use the contents of such communications to update task recommendation system 112 and algorithms 908. As another example, task facilitation service 102 may provide task recommendations to member 118 and member 118 may choose to accept or reject the task recommendations. The responses to the task recommendations provided by member 118 may subsequently and automatically used to update task recommendation system 112 and algorithms 908 based on the responses. So, for example, if member 118 accepts a task recommendation, algorithms 908 may be updated to provide similar recommendations in the future. Similarly, if member 118 rejects a task recommendation, algorithms 908 may be updated to be less likely to provide a similar rejection in the future. Task recommendation system 112 may further be update based on changes in user data for member 118, including changes to member model 809. For example, task facilitation service 102 may receive additional information and data regarding member 118 and update each of user datastore 108 and member model 809, accordingly. Considering such changes, task recommendation system 112 may rerun and/or update algorithms 908 given that recommendations for member 118 may differ based on changes in the information known and maintained by task facilitation service 102 regarding member 118.

As further shown in FIG. 9, APIs 906 may also facilitate transmission of data from task facilitation service 102 to applications 904A to 904N. As illustrated, for example, such data may include task updates and related task information, particularly when applications 904A to 904N may maintain an object or application data associated with a task managed by task facilitation service 102.

Figure 10A:
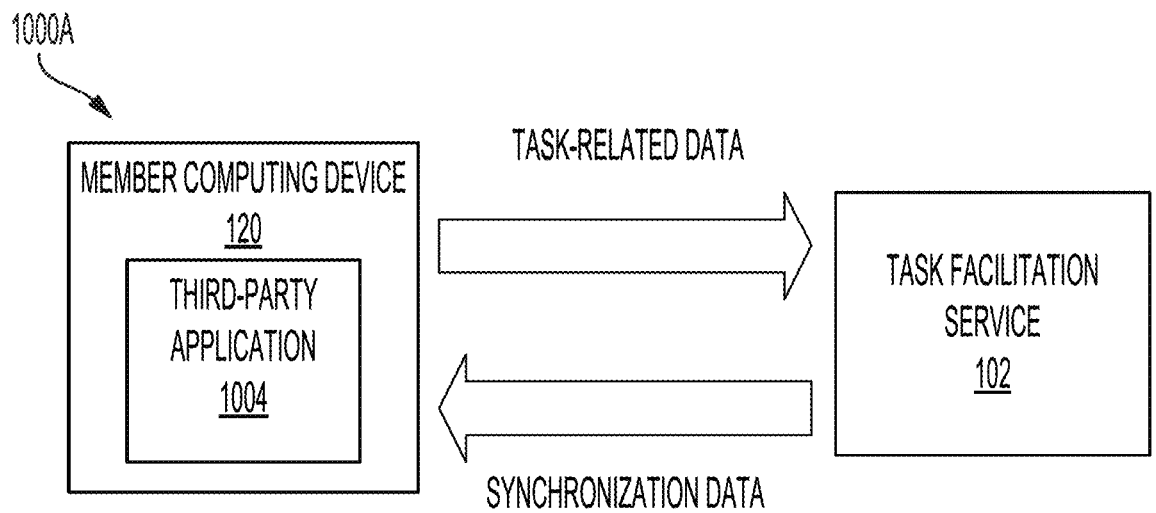
FIG. 10A shows an illustrative example of data exchange between a task facilitation service and a single computing device.

In certain implementations, task facilitation service 102 may exchange data related to a task of member 118 with one or more computing devices associated with different users. For example, FIG. 10A illustrates an environment 1000A in which task data is exchanged between task facilitation service 102 and computing device 120 associated with member 118 only. In contrast, FIG. 10B illustrates an environment 1000B in which task facilitation service 102 exchanges task data with computing device 120 as well as a computing device 1002, which may be associated with a user other than member 118, including a user that may not have an account or otherwise be a member of with task facilitation service 102.

Figure 10B:
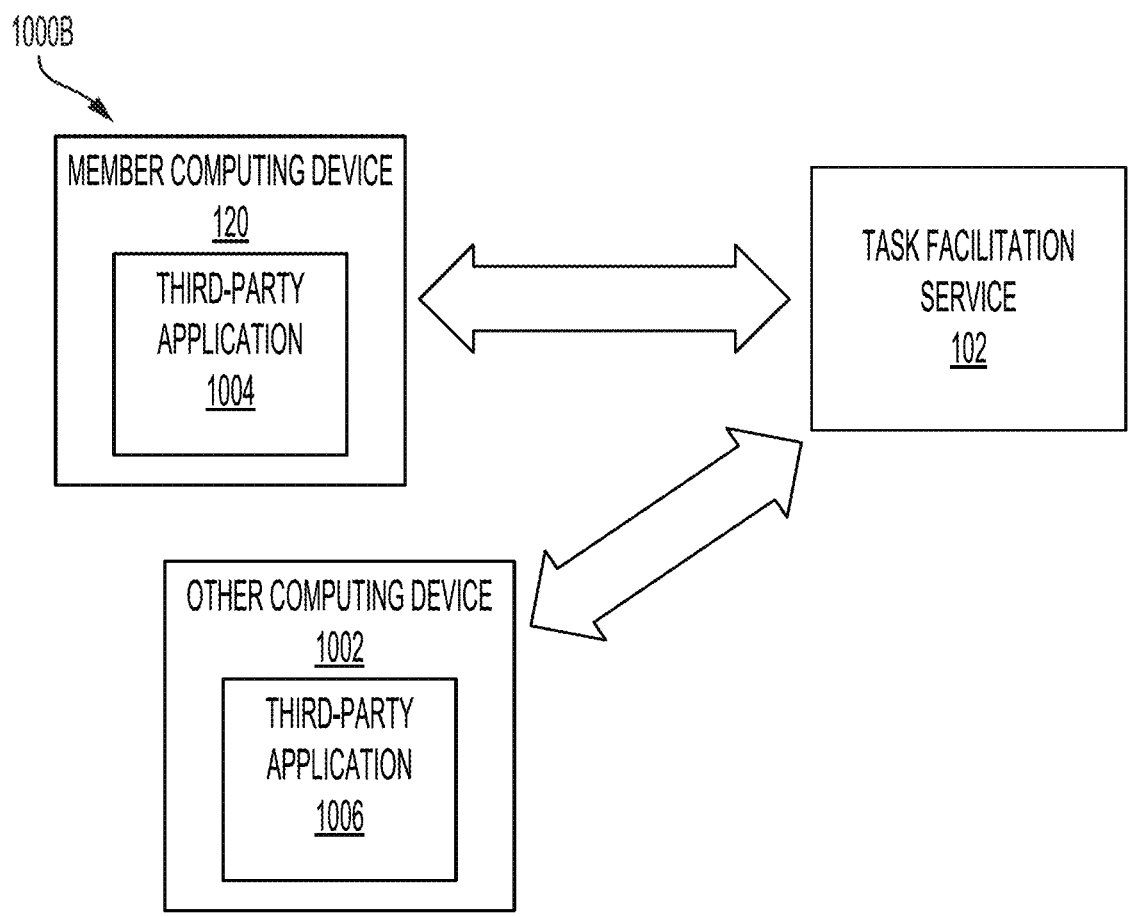
FIG. 10B shows an illustrative example of data exchange between a task facilitation service and multiple computing devices.

In the specific example illustrated in FIGS. 10A and 10B, computing device 120 executes a third-party application 1004. During operation, task facilitation service 102 may receive data from computing device 120, such as through a corresponding API. The specific data received by task facilitation service 102 may vary based on the nature of third-party application 1004; however, by way of non-limiting example, data received by task facilitation service 102 from third-party application 1004 may include data related to a schedule of member 118 (e.g., dates and times when member 118 is available, busy, etc.), details of upcoming events and deadlines for member 118, details regarding action items or tasks for member 118, and information about member 118 (e.g., personal information, demographic information, preferences and interests, etc.). More generally, however, data received by task facilitation service 102 from third-party application 1004 may include any data collected and maintained by third-party application 1004 that may be used by task facilitation service 102 to generate new tasks, populate information for existing tasks, modify existing tasks, facilitate completion of existing tasks, etc. As further illustrated FIG. 10A, task facilitation service 102 may provide data to computing device 120 for third-party application 1004. Again, the data sent by task facilitation service 102 to third-party application 1004 may vary on the specific nature of third-party application 1004; however, in at least one implementation, task facilitation service 102 may transmit data to third-party application 1004 to synchronize third-party application 1004 with task facilitation service 102. For example, third-party application 1004 may include a schedule or a task for member 118 and task facilitation service 102 may transmit data to third-party application 1004 to update the schedule based on changes in availability of member 118 and task progress made by task facilitation service 102, respectively.

In contrast to FIG. 10A, which includes communication between task facilitation service 102 and computing device 120 only, FIG. 10B further includes computing device 1002, which may correspond to a user that may or may not be a member of task facilitation service 102. As illustrated, computing device 1002 similarly executes or maintains data for a third-party application 1006. In certain implementations, third-party application 1004 and third-party application 1006 may be different instances of the same application; however, third-party application 1004 and third-party application 1006 may also be different applications or different versions of an application. For example, in one implementation, third-party application 1004 may correspond to a version of an application intended for use by individuals/ service recipients while third-party application 1006 may correspond to a version of the same application intended for use by business/organizations/service providers.

In FIG. 10B, data is exchanged between task facilitation service 102 and each of computing device 120 and computing device 1002. As noted above in the context of FIG. 10A, such data may vary depending on the nature of third-party application 1004 and third-party application 1006; however, in at least certain implementations, the data received by task facilitation service 102 may be related to scheduling, action items/tasks, preferences, or any other suitable information that may be relevant to generating, tracking, and updating tasks of task facilitation service 102.

As previously discussed in the context of FIG. 9, task facilitation service 102 may generate or recommend tasks for member 118 based on data collected from other computing devices. With regards to FIG. 10B, task facilitation service 102 may generate or recommend tasks based on data collected from computing device 1002, such as application data of third-party application 1006. So, for example, if computing device 1002 was associated with a family member of member 118, tasks generated by task facilitation service 102 for member 118 may consider data corresponding to the family member (e.g., obtained from computing device 1002 when the family member is a user of computing device 1002) in addition to data corresponding to member 118 (e.g., obtained from computing device 120). Notably, task facilitation service 102 may also transmit task-related data to update third-party application 1006 of computing device 1002 such that third-party application 1006 is updated based on any tasks of member 118 generated, recommended, or updated by task facilitation service 102. Stated differently, in addition to accounting for data maintained at other computing devices when generating and recommending tasks, task facilitation service 102 may facilitate synchronization of task-related data between multiple computing devices.

While FIG. 10B illustrates only two computing devices, task facilitation service 102 may facilitate exchange of task-related data between any number of computing devices, any of which may be associated with members of task facilitation service 102.

In at least certain implementations, task facilitation service 102 may be configured to communicate with multiple applications executed on a single computing device. For example, task facilitation service 102 may be configured to exchange data with each of a calendar application and a task management application executed or installed on computing device 120. Like the example above involving multiple computing devices, task facilitation service 102 may receive data from either application and may transmit updates and similar data to each application. Among other things, such data exchange may facilitate updating of the applications based on activity of task facilitation service 102 but may also provide a means for synchronizing data between the applications.

As previously discussed, task facilitation service 102 may be configured to communicate and exchange data with third-party applications. In at least certain implementations, various controls and features may be integrated into such applications to facilitate interaction with task facilitation service 102. For example, a plug-in, extension, add-on, or similar software element may be installed on computing device 120 to extend functionality of an application to work with and offer features of task facilitation service 102 within the context of the application.

Figure 11:
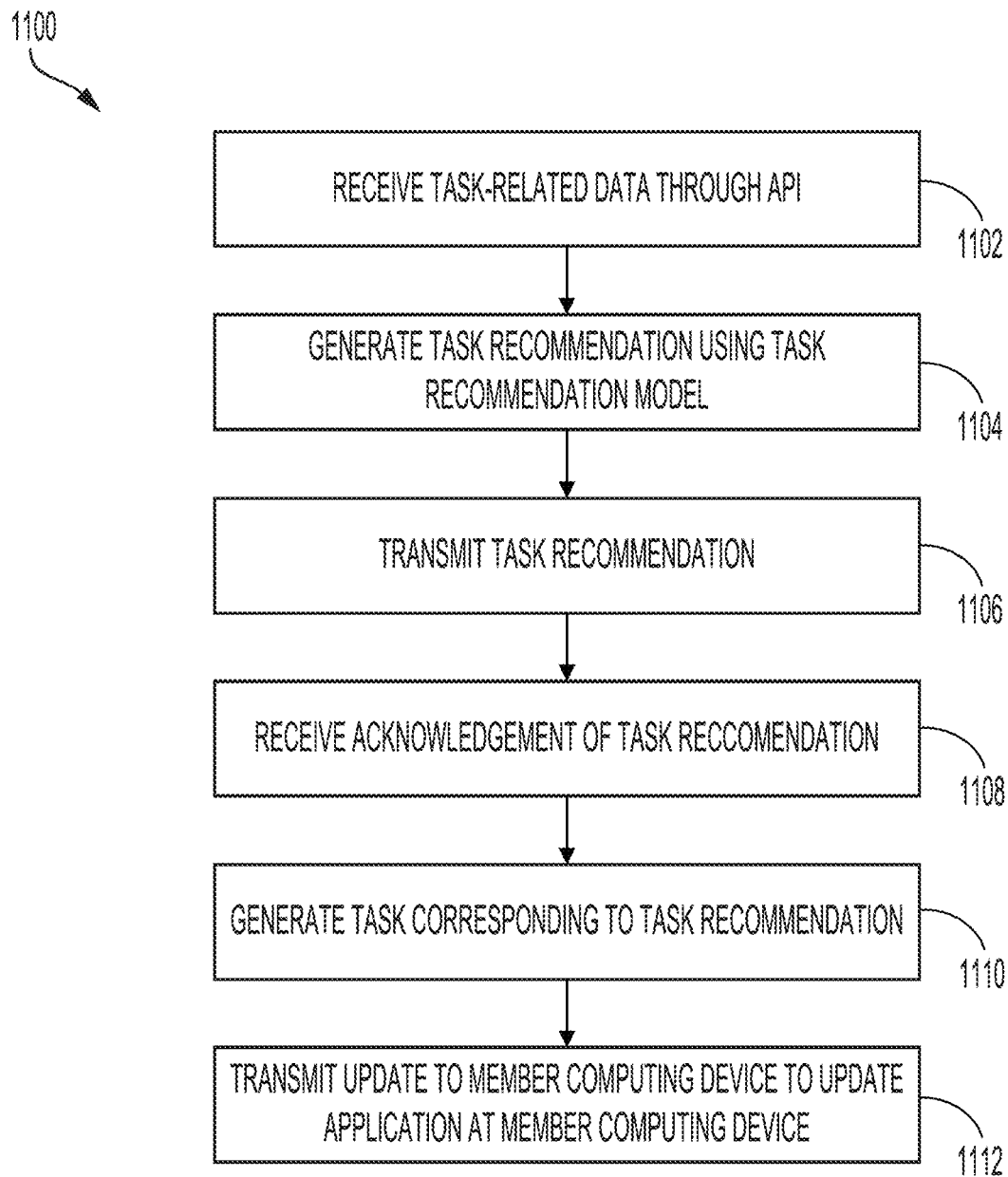
FIG. 11 depicts an example calendar application including functionality for interacting with a task facilitation service.

FIG. 11 is a flow chart illustrating a method 1100 for exchanging task data in accordance with the present disclosure. In certain implementations, method 1100 may be performed by a computing system corresponding to task facilitation service 102. The following discussion generally refers to elements of FIG. 1 and others of the preceding figures; however, it should be understood that method 1100 and other methods discussed herein are not necessarily limited to implementations including the specific aspects of those figures and any such references are made to provide context only.

At step 1102, task facilitation service 102 receives task-related data from an application executed on computing device 120 through a corresponding API. The task-related data may be task data (e.g., data corresponding to a parameter of a task or potential task) or user data (e.g., data about member 118).

At step 1104, task facilitation service 102 generates a task recommendation based on the received task data. For example, task facilitation service 102 may include task recommendation system 112, which may include task recommendation models/algorithms 908 (shown in FIG. 9). Task recommendation models/algorithms 908 may receive as input a feature vector of task data and user data and generate a recommended task. Task recommendation models/algorithms 908 may further consider characteristics of member 118 as maintained in member model 809. For example, parameters of member model 809 may be used as additional features in the feature vector provided to task recommendation models/algorithms 908 or may be used to determine weightings/coefficients of task recommendation models/algorithms 908.

At step 1106, task facilitation service 102 transmits the task recommendation generated at step 1104. In certain implementations, member 118 may receive the task recommendation directly through computing device 120. In other implementations, the task recommendation may instead be received by representative 106 for review and potential revision prior to being presented to member 118.

At step 1108, task facilitation service 102 receives an acknowledgement or confirmation regarding the task recommendations (e.g., by member 118 activating a control at computing device 120 to confirm the task is to be created or by member 118 providing confirmatory instructions to representative 106 who then activates a similar control) and at step 1110, task facilitation service 102 generates a task corresponding to the task recommendation.

Following creation of a task at task facilitation service 102, task facilitation service 102 may transmit updates for the task, e.g., at step 1112. Updates transmitted by task facilitation may be using the API noted above in the context of step 1102 and, when received by the application of step 1102, may cause the application to update application data based on the information contained in the update. For example, applications may include objects (e.g., calendar items in the context of calendar application task list items in the context of task management applications) whose visual appearance may be altered (e.g., by adding an icon or similar indicator) in response to a corresponding task being created at task facilitation service 102. Updates from task facilitation service 102 may also cause details for events, items, etc. related to the task to be updated.

Notably, in at least certain implementations, task facilitation service 102 may bypass the step of generating and providing task recommendations to member 118 and opt instead to simply generate a task based on information received from an application. For example, a calendar application may include an event that is substantially defined such that a corresponding task is clear and does not require recommendations. Similarly, a task management application may include items with sufficient specificity that a corresponding task can be ascertained without additional information or feedback from member 118. In such cases, task facilitation service 102 may simply receive task-related data from the application and progress directly to generating a corresponding task, e.g., by omitting steps 1104-1108 of method 1100.

Figure 12A:
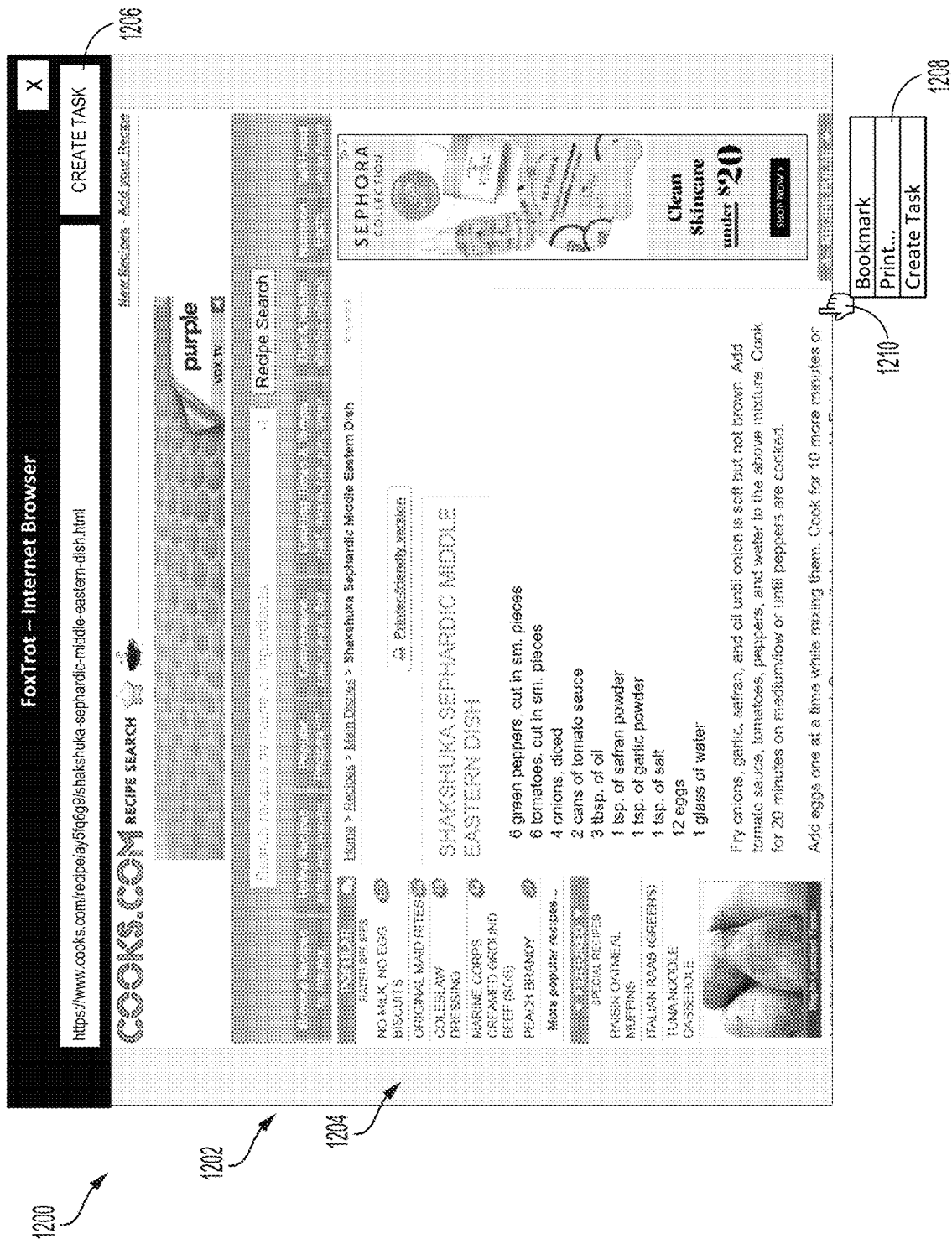
FIGS. 12A and 12B depict an event details page of an example calendar application including functionality for interacting with a task facilitation service.
Figure 12B:
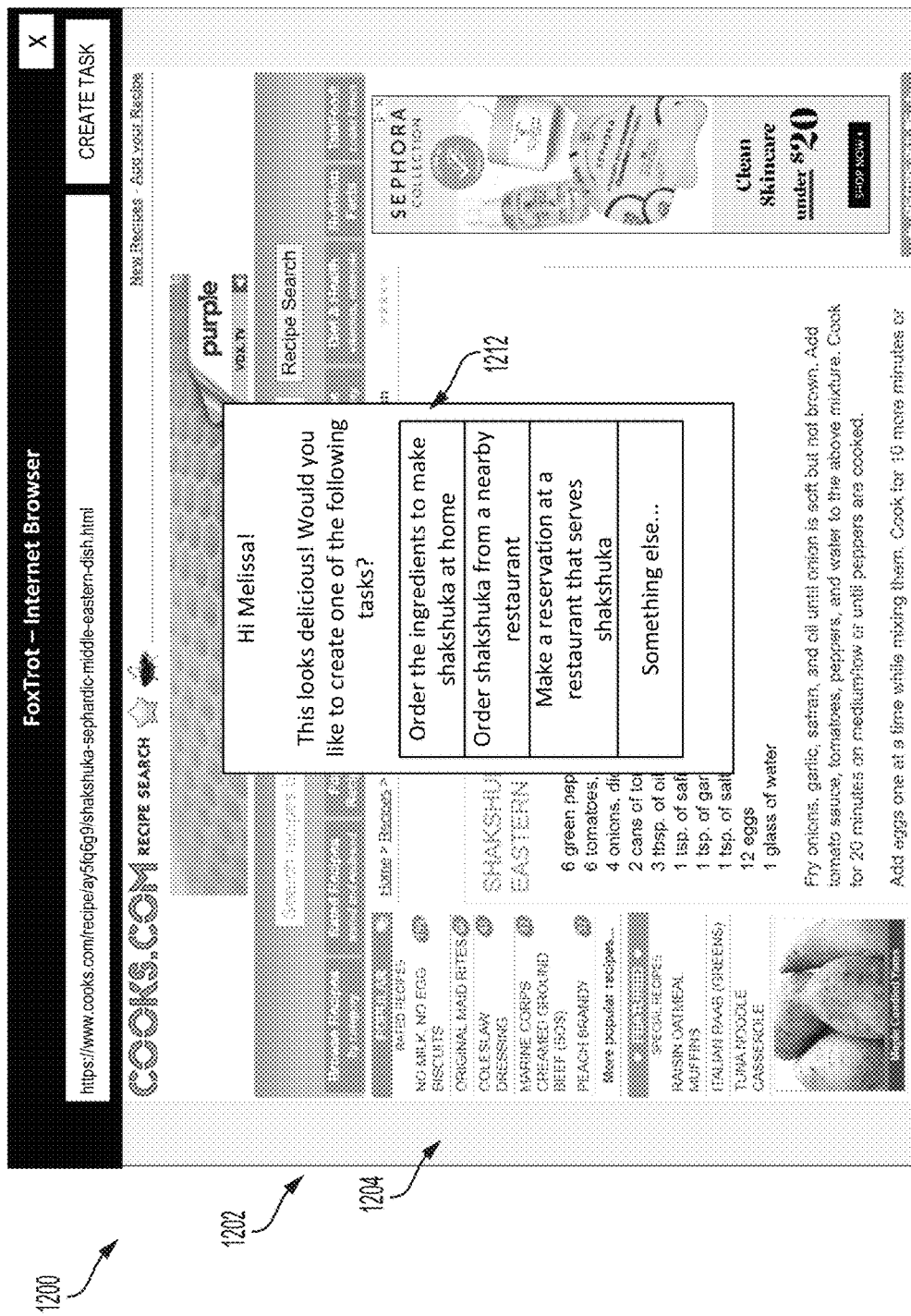

FIGS. 12A and 12B provide an example of functionality of task facilitation service 102 integrated into an application. More specifically, FIGS. 12A and 12B illustrate a user interface 1200 including a web browser 1202 that may be executed on computing device 120. In general, web browser 1202 may be used to navigate to and present a website 1204. User interface 1200 includes various features that facilitate functionality of and integration with task facilitation service 102. Such functionality may be provided, for example, by installing a plug-in or similar software package that enhances or otherwise adds features to the web browser 1202.

As a non-limiting example, user interface 1200 includes a button 1206 for creating a task at task facilitation service 102 corresponding to website 1204. For example, following navigation to website 1204 using web browser 1202, member 118 may activate button 1206. In response, web browser 1202 may transmit data related to website 1204 to task facilitation service 102, which may, in turn, use the transmitted data to generate a task within task facilitation service 102.

Similar functionality is provided in a context-specific menu 1208. Context-specific menu 1208 may be presented, e.g., in response to member 118 right-clicking or performing a similar action while a pointer 1210 is disposed over website 1204 as displayed within web browser 1202. As illustrated, context-specific menu 1208 presents options to bookmark website 1204, print website 1204 and create a task associated with website 1204 any may include various other options not discussed herein. Like button 1206, activation of the "Create Task" option in context-specific menu 1208 may cause web browser 1202 to transmit data for website 1204 to task facilitation service 102 for purposes of generating a corresponding task within task facilitation service 102.

This disclosure contemplates that other inputs may be provided to initiate creation of a task in task facilitation service 102 corresponding to website 1204 as presented in web browser 1202. For example, website 1204 may include a drop-down menu including a menu item for creating a task. As another example, web browser 1202 may support keyboard shortcuts, gestures, voice commands, or other inputs configured to initiate task creation.

Data transmitted to task facilitation service 102 by web browser 1202 may include any available information about website 1204. Such data may include text and other elements presented to member 118 by web browser 1202 but may also include source data of website 1204 that may be available but generally hidden from member 118 when website 1204 is opened within web browser 1202. For example, data transmitted to task facilitation service 102 may include keywords or key phrases incorporated into the source of website 1204 but otherwise hidden when website 1204 is presented in web browser 1202.

Data transmitted to task facilitation service 102 may also include specific portions of website 1204 selected/highlighted by member 118. For example, member 118 may place a cursor over, highlight, or select an element of website 1204, right-click the element to present context-specific menu 1208, and then select the option from context-specific menu 1208 to create a task. The element may be, among other things, a portion of text, a multimedia object embedded within website 1204, an interactive object embedded within website 1204, and the like. Web browser 1202 may then transmit the selected text to task facilitation service 102 for task facilitation service 102 to use in generating a corresponding task or task recommendation. Alternatively, web browser 1202 may transmit general data about website 1204 as well as an indication of any specific content that has been highlighted or selected by member 118.

In other implementations, web browser 1202 may transmit a link or address to task facilitation service 102 instead of transmitting data obtained from website 1204. In such cases, task facilitation service 102 may be configured to access website 1204 using the received address and obtain any relevant data itself.

In still other implementations, when member 118 activates a control to create a task, web browser 1202 may instead transmit a communication to representative 106 indicating that member 118 would like to create a task based on website 1204. In certain implementations, the communication may include a link or address that may be used by representative 106 to open website 1204 for review. Representative 106 may then proceed to create a task based on website 1204 and/or initiate a communication session with member 118 to obtain further information about the task member 118 intends to create.

Referring to FIG. 12B, in at least certain instances, task facilitation service 102 may determine that multiple tasks may be created based on website 1204. For example, website 1204 as shown in FIGS. 12A and 12B includes a recipe for shakshuka. Based on the content of website 1204, task facilitation service 102 may determine that member 118 wants to make the recipe of website 1204; however, task facilitation service 102 may also determine that member 118 may be interested in ordering shakshuka or making a reservation at restaurant that serves shakshuka. Accordingly, in certain implementations, following activation of a control to create a task for a website, task facilitation service 102 may cause web browser 1202 to display several options for the task to be created. As illustrated in FIG. 12B, for example, web browser 1202 displays a menu 1212 that includes the options noted above as well as a "Something else . . . " option if member 118 intends to create a different task than those listed. Task facilitation service 102 may subsequently create a task based on a selection by member 118 of one of the options listed in menu 1212. If member 118 selects the "Something else . . . " option, task facilitation service 102 may follow up by requesting additional information from member 118, initiating a communication session between member 118 and representative 106, or taking similar actions intended to solicit additional information regarding the task member 118 intends to create.

Figure 13A:
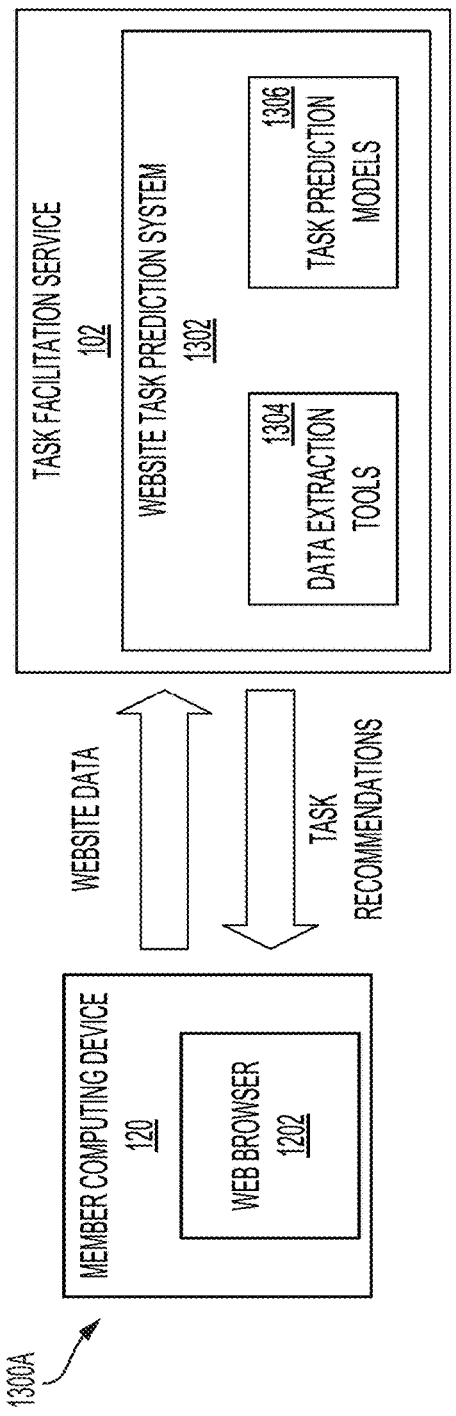
FIGS. 13A and 13B are block diagrams illustrating exchange of website data and task recommendations between a computing device and a task facilitation service.
Figure 13B:
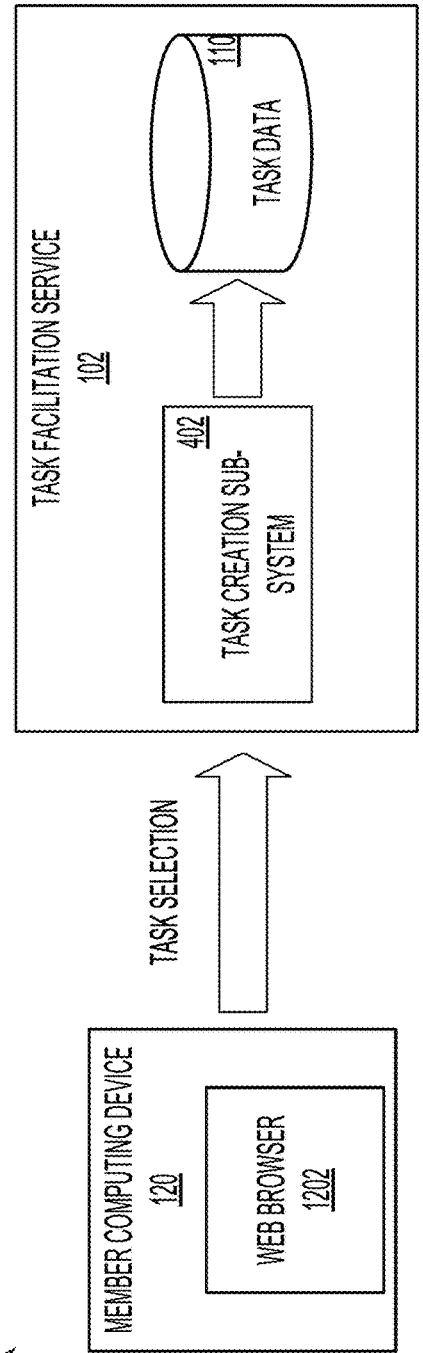

An example process of generating task recommendations and tasks from a website is further illustrated in FIGS. 13A and 13B. FIG. 13A is a block diagram of an environment 1300A including computing device 120 of member 118 and task facilitation service 102. During operation and as discussed in the context of FIGS. 12A and 12B, computing device 120 may execute web browser 1202, which may include one or more controls for creating tasks of task facilitation service 102. As illustrated in FIG. 13A, when member 118 activates a task creation control, web browser 1202 may transmit website data to task facilitation service 102. Among other things, website data may include content presented to member 118 by web browser 1202, source data of a website presented by web browser 1202, or simply a link or address from which task facilitation service 102 may access a website or similar resource.

Task facilitation service 102 may include a website task prediction system 1302 that receives website data and generates task recommendations based on the received website data. Website task prediction system 1302 may include various elements to facilitate this process. For example, website task prediction system 1302 may include data extraction tools 1304 to identify and extract relevant data based on the received website data, and task prediction models 1306 that predict potential tasks from the data extracted by data extraction tools 1304.

Data extraction tools 1304 may include various tools for scraping or otherwise extracting relevant information from websites. For example, data extraction tools 1304 may include tools for fetching the website corresponding to the received website data and extracting relevant data from the fetched website. Extracting data from the website may include parsing, searching, reformatting, or otherwise processing data contained on the website for subsequent use in recommending tasks. In certain implementations, data extraction tools 1304 may be configured to identify and extract data that is particularly relevant to the content of the website. For example, data extraction tools 1304 may be configured to identify keywords of the website or to extract text of specific elements of the website (e.g., based on the use of specific HTML tags). More generally, however, data extraction tools 1304 refer to any suitable tools for processing and extracting meaningful data from the website data received by task facilitation service 102 in response to member 118 activating a control to create a task within website web browser 1202.

Data extracted using data extraction tools 1304 may be provided to task prediction models 1306 to generate specific task recommendations. For example, task prediction models 1306 may include one or more models or algorithms that receive a feature vector including data extracted by data extraction tools 1304 and output one or more task recommendations. The feature vectors used by task prediction models 1306 may further include task data, user data, and user characteristics (e.g., as captured in member model 809) previously collected or otherwise maintained by task facilitation service 102. Task facilitation service 102 may transmit any task recommendations generated by task prediction models 1306 to computing device 120 for presentation and selection by member 118, such as illustrated and discussed above in the context of FIG. 12B.

Task prediction models 1306 may rely on any suitable type of model or algorithm for processing and analyzing data extracted by data extraction tools 1304. However, in at least certain implementations and given the amount of text generally included in websites, task prediction models 1306 may utilize natural language processing (NLP) or similar text-focused artificial intelligence techniques to process data extracted by data extraction tools 1304 or otherwise available regarding the website identified by member 118.

Referring to FIG. 13B, which illustrates an environment 1300B, member 118 may select one of the recommended tasks and a corresponding task selection may be transmitted by computing device 120 for receipt by task facilitation service 102. In response to receiving the task selection, task facilitation service 102 may create a corresponding task as described herein, which may include creating or updated task data stored in task datastore 110 to reflect creation of the new task.

Although the foregoing example focuses on generating tasks from website data, other implementations of the present disclosure may apply similar techniques for generating tasks from documents and publications more generally. For example, member 118 may access a document or publication using a corresponding reader application and the reader application may include controls, etc. to generate tasks at task facilitation service 102 based on the document. When member 118 activates the controls, the reader application may send a copy of the document, portions of the document, metadata of the document, and the like to task facilitation service 102, which may then process the received data in a manner generally consistent with processing of a website as described above. For example, task facilitation service 102 may include tools for extracting data from the document (e.g., tools for scraping, searching, parsing, etc. the document) and subsequently analyzing the document and extracted data to determine the context of the document and potentially relevant tasks which may be recommended to member 118.

Figure 14:
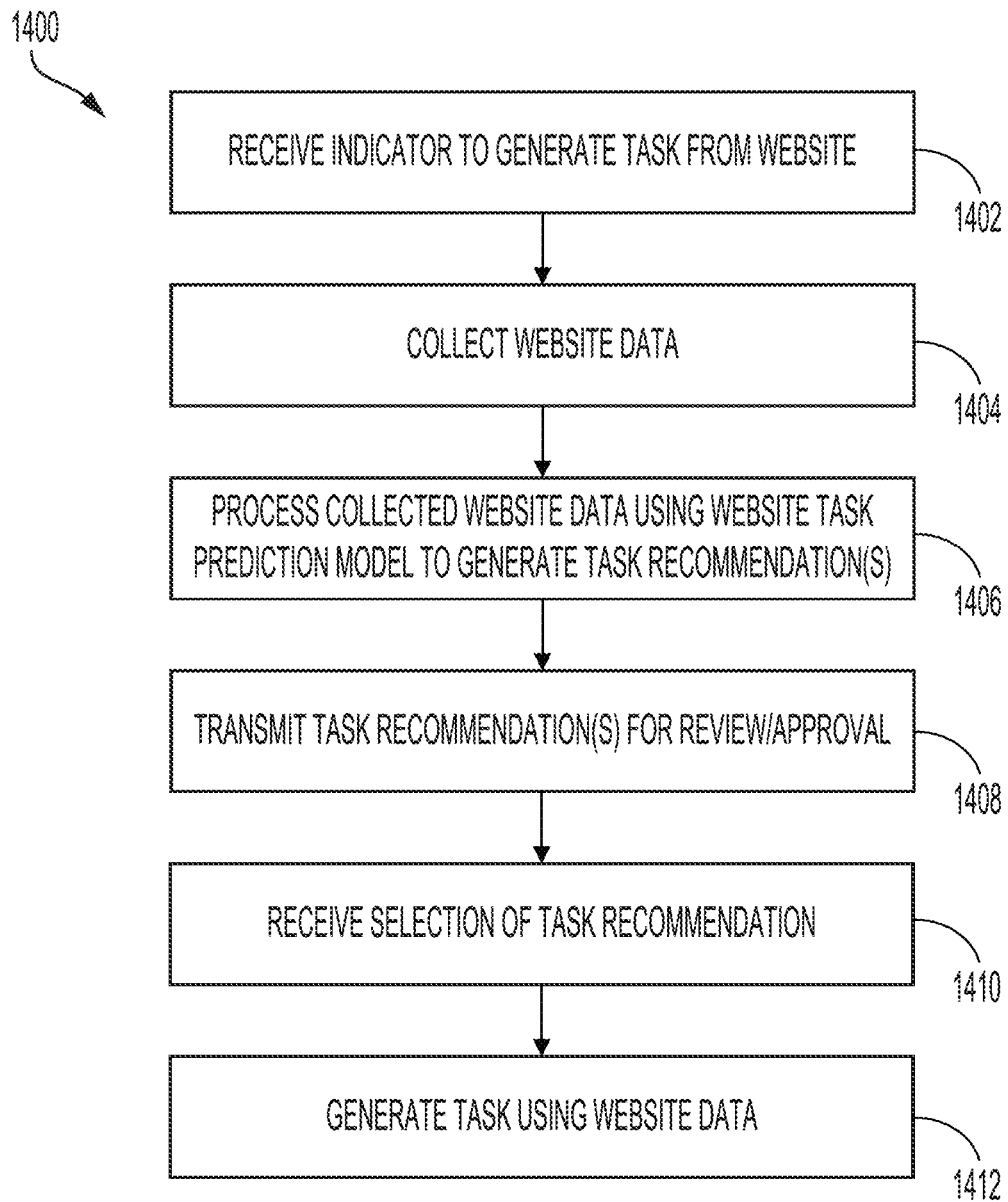
FIG. 14 is a flow chart illustrating a method of generating task recommendations from website data and providing corresponding task recommendations to a user.

Various aspects of FIGS. 13A and 13B are further described in the context of FIG. 14, which is a flow chart illustrating a method 1400 of generating a task from a website. Method 1400 may be executed, for example, by task facilitation service 102.

At step 1402, task facilitation service 102 receives an indicator to generate a task from a website. As discussed herein, such an indicator may be received in response to member 118 activating a control integrated into a web browser for facilitating communication and interaction between the web browser and task facilitation service 102.

At step 1404, task facilitation service 102 collects website data for the website corresponding to the indicator received in step 1402. In certain implementations, the indicator may include data for the website. In other implementations, the indicator may include a link or address that task facilitation service 102 may use to access the website and its data.

Collecting website data may include scraping or otherwise processing the website. For example, as discussed in the context of FIG. 13A, task facilitation service 102 may include website task prediction system 1302 which may further include data extraction tools 1304. Data extraction tools 1304 may include scrapers, parsers, or similar tools configured to identify and extract relevant data from a website and process the extracted data into a format for use by website task prediction system 1302.

At step 1406, task facilitation service 102 processes the data collected in step 1404 to generate one or more task recommendations. For example, website task prediction system 1302 may include task prediction models 1306 that receive as input a feature vector including data collected/extracted in step 1404. Task prediction models 1306 may further receive as input previously collected data, such as task data, user data, and parameters of a user model associated with member 118, each of which may correspond to or be based on past activity between member 118 and task facilitation service 102.

At step 1408, task facilitation service 102 may transmit the recommended tasks generated in step 1406 for review and approval. In certain implementations, task facilitation service 102 transmit the recommended tasks directly to member 118 for presentation and selection in a web browser or similar application. In other implementations, task facilitation service 102 may first transmit the recommended tasks to a representative assigned to or otherwise associated with member 118 for review and possible revision before transmission to member 118.

Subsequently, at step 1410, task facilitation service 102 may receive a selection of a task from the recommended tasks transmitted at step 1408. Task facilitation service 102 may then generate a task at step 1412 using at least some of the website data collected in 1404.

Referring to the recipe example illustrated in FIGS. 12A and 12B, member 118 may select to order ingredients to make shakshuka. Task facilitation service 102 may then generate a task to order the necessary ingredients for delivery to member 118. When generating the task, task facilitation service 102 may rely on the ingredient list included in the website data to create a shopping list or checklist for the task.

Although a recipe website is used as a primary example in this disclosure, task facilitation service 102 may be configured and capable of generating tasks for other types of websites as well and may be capable of distinguishing between the content or and corresponding tasks applicable to different websites. For example, website task prediction system 1302 may generally include tools that extract data from websites that may be used to identify a type of website and the nature of the content of the website. Task prediction models 1306 may in turn take such information into account to propose a corresponding set of recommendations to member 118 through computing device 120. Several non-limiting examples are provided below to help illustrate the concept of generating tasks from websites and website-related data.

In a first example, a website may be an ecommerce or similar shopping website through which member 118 may make a purchase. Among other things, website task prediction system 1302 may determine that the website is an ecommerce site based on the website itself (e.g., website task prediction system 1302 may associate certain websites with ecommerce activity), the presence of certain elements included in the website (e.g., a purchase button, an add to cart button, etc.), the presence of a price within the content of the website, certain headings included in the website (e.g., a "product description" heading), keywords of the website, and other similar features of the website included in the website data received by task facilitation service 102 or otherwise available to task facilitation service 102. In response to determining that the website is an ecommerce website, website task prediction system 1302 may provide recommendations for tasks to member 118 related to purchasing/ordering an item from the website. For example, in response to member 118 requesting to create a task while on an ecommerce or product website, website task prediction system 1302 may generate recommendations for tasks such as "purchase for myself", "purchase for somebody else", "find a better price", and other similar tasks.

As another example, a website may correspond to an event such as a sporting event, concert, or theatrical production. Among other things, website task prediction system 1302 may determine that the website is related to an event based on the website itself (e.g., the website may be for a ticket seller, theater, sports team, etc.), the presence of certain elements included in the website (e.g., a "find seating" button or "purchase tickets" link), certain headings or language included in the website (e.g., the phrase "buy your tickets now!" or a "Tickets" heading), keywords of the website, and other similar features of the website included in the website data received by task facilitation service 102 or otherwise available to task facilitation service 102. In response to determining that the website is related to an event, website task prediction system 1302 may provide corresponding recommended tasks to member 118. For example, in response to member 118 requesting to create a task while on an event website, website task prediction system 1302 may generate recommendations for tasks such as "buy tickets for me", "buy tickets for somebody else", "find tickets for similar events", and other similar tasks.

As another example, a website may include information and instructions related to home repair, such as how to fix a toilet. Among other things, website task prediction system 1302 may determine that the website is related to home repair based on the website itself (e.g., the website may be a "do-it-yourself" instructional website, etc.), certain headings or language included in the website (e.g., the headings "Things You'll Need" or "Steps to Fix Your Toilet" or instructional language), keywords of the website, and other similar features of the website included in the website data received by task facilitation service 102 or otherwise available to task facilitation service 102. In response to determining that the website is related to home repair, website task prediction system 1302 may provide corresponding recommended tasks to member 118. For example, in response to member 118 requesting to create a task while on a home repair website, website task prediction system 1302 may generate recommendations for tasks such as "buy supplies", "find additional information", and "find a professional".

Figure 15:
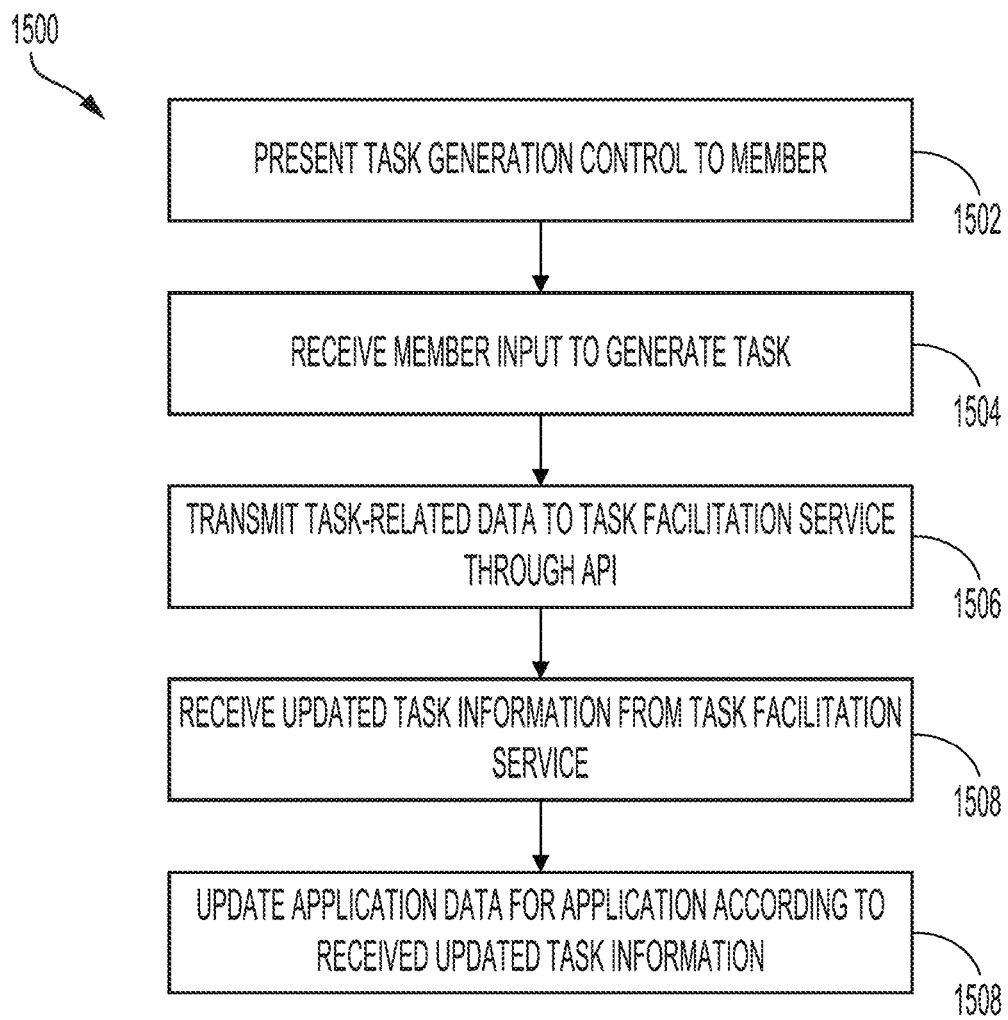
FIG. 15 is a flow chart illustrating a method of providing task-related data to a task facilitation service from an application.

FIG. 15 is a flow chart illustrating an example method 1500 of implementing task generation functionality at a user computing device (e.g., computing device 120) associated with a member (e.g., member 118) of a task facilitation service 102.

At step 1502, a task generation control is presented or otherwise made available to member 118 within an application. The specific type of control and manner of its presentation may vary depending on the application; however, in general, the control is such that member 118 may activate it to signal that member 118 would like to create a task corresponding to some element of the application. In certain implementations, the control may be in the form of a button, context-specific menu option, keyboard shortcut, voice command, gesture, or other similar control.

At step 1504, the application receives member input to generate a task, e.g., by detecting activation of the control presented in step 1502. For example, the application may be configured to determine when member 118 presses a button, selects a menu option, or otherwise provides an input corresponding to activation of the control.

At step 1506, the application transmits task-related data to task facilitation service 102 communicating that a task is to be created based on the data. The specific data transmitted to task facilitation service 102 may differ based on the application; however, the data generally causes task facilitation service 102 to generate a task or to generate task recommendations based on the task-related data when received. By way of non-limiting example, when the application is a calendar application, task-related data may include details for an event in the calendar application. As another example, when the application is a task management application, the task-related data may include details or information for items or tasks managed by the application. As yet another example, when the application is a web browser, the task-related data may include data for a website currently presented by the web browser or a link/address to the website currently presented to the web browser.

At step 1508, the application may receive updated task information from task facilitation service 102. Such information may include a notification that a task has been created, status or progress updates regarding the task, and the like. At step 1510, the application may update corresponding application data based on the data received in step 1508.

The foregoing examples of integration of a browser with task facilitation service 102 to generate tasks based on website data generally includes providing website data to task facilitation service 102, which then analyzes the data to generate a list of candidate task recommendations. In other implementations, a website may be specifically associated with a specific task or list of candidate tasks. For example, task facilitation service 102 may maintain a database associating websites with various predefined tasks. Accordingly, when member 118 initiates task creation within a browser, task facilitation service 102 may first determine whether the database includes the website displayed in the browser. If so, task facilitation service 102 may retrieve the list of predefined task recommendations and cause the browser to present the task recommendations to member 118 for approval and selection, as previously discussed in this disclosure.

By way of example, task facilitation service 102 may be associated with "partner" websites that offer products or services relevant to tasks created by task facilitation service 102. Each partner website may be associated with a select set of predetermined tasks. When member 118 navigates to a partner site using a browser and activates a control of the browser to create a task in task facilitation service 102, task facilitation service 102 may then retrieve and present the list of predetermined tasks to member 118.

The specific process by which task facilitation service 102 determines whether member 118 is on a partner site may vary. However, in one example implementation, activation of a task creation control within a browser causes the browser to transmit the current domain name to task facilitation service 102. Task facilitation service 102 may then perform a lookup within a table or database that correlates domain names with various predefined tasks. Task facilitation service 102 may then transmit an indication that, when received by the browser, causes selectable options corresponding to the predefined tasks to be presented to member 118 for selection, similar to the example illustrated in FIG. 12B.

In certain implementations, the predefined task recommendations may be presented to member 118 with an alternative option (e.g., a selectable option for "Something else . . . ") that, if selected by member 118 causes task facilitation service 102 to analyze the website and generate task recommendations as described earlier in this disclosure.

In the previous examples, task facilitation service 102 provides task recommendations based on a currently displayed website. However, in certain implementations, task facilitation service 102 may also or alternatively consider browsing history of member 118. For example, task facilitation service 102 may periodically access or a browser may periodically export a browsing history to task facilitation service 102 for processing and generation of task recommendations. Other browser data may also be provided or retrieved by task facilitation service 102. For example, task facilitation service 102 may receive a list of cookies installed on a browser and may use the list of cookies and the websites and content associated with the cookies to provide task recommendations.

In at least certain implementations, a browser may provide browsing activity data to task facilitation service 102 in real- or substantially real-time. For example, as a user of a browser navigates between websites, the websites to which the user navigates may be transmitted to task facilitation service 102. Task facilitation service 102 may then use the navigation activity of the user to facilitate task generation, as described throughout this disclosure.

To the extent a browser supports a private browsing mode, the browser plug-in or extension associated with task facilitation service 102 may operate consistent with whether the private browsing mode is activated. More specifically, when the browser is operated in private browsing mode, sharing of browsing history and/or real-time browsing activity may be automatically disabled. In some embodiments, such disabling may be subject to settings or configurations accessible to the user.

Notably, each of the foregoing implementations relies on browser controls to initiate task recommendations and creation within task facilitation service 102. Alternatively, integration with task facilitation service 102 may be facilitated by a hyperlink or object embedded within the website itself. For example, a website may include a link to create a task within task facilitation service 102. When the user accesses the website within a browser and activates the link, the host of the website may transmit a notification to task facilitation service 102, which may then initiate the process of generating task recommendations or actual tasks based on the website. Instead of a link, the website may include an embedded element (e.g., a widget) that provides substantially similar functionality.

Similar to the plug-in or extension implementations, in response to activation of a task creation link or widget, the browser may transmit data to task facilitation service 102 and receive from task facilitation service 102 a list of task recommendations for presentation and selection by the user. In certain implementations, the website or embedded element may request or access saved credential data (e.g., a login and password) to login into task facilitation service 102. Among other things, doing so enables task facilitation service 102 to access the correct member data/profile for generating task recommendations, to properly attribute the received request to the member, and to ensure that any task recommendations are linked to the member.

Figure 16:
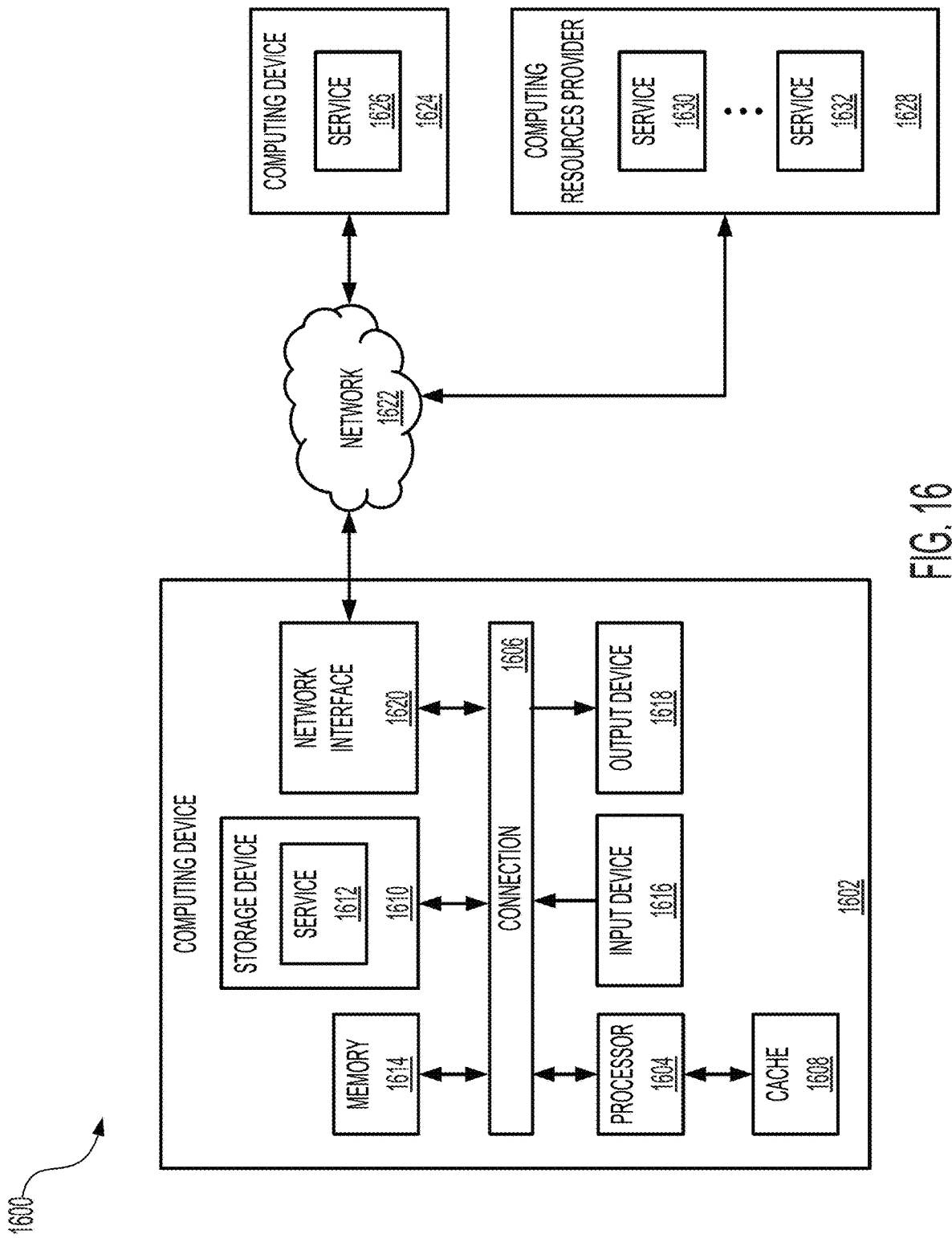
FIG. 16 shows an example computing system architecture including various components in electrical communication with each other using a connection in accordance with aspects of the present disclosure.

FIG. 16 shows an example computing system architecture 1600 including various components in electrical communication with each other using a connection in accordance with aspects of the present disclosure. The example computing system architecture 1600 illustrated in FIG. 16 includes a computing device 1602, which has various components in electrical communication with each other using a connection 1606, such as a bus, in accordance with some implementations. The example computing system architecture 1600 includes a processing unit 1604 that is in electrical communication with various system components, using the connection 1606, and including the system memory 1614. In some instances, the system memory 1614 includes read-only memory (ROM), random-access memory (RAM), and other such memory technologies including, but not limited to, those described herein. In some instances, the example computing system architecture 1600 includes a cache 1608 of high-speed memory connected directly with, in close proximity to, or integrated as part of the processor 1604. The system architecture 1600 can copy data from the memory 1614 and/or the storage device 1610 to the cache 1608 for quick access by the processor 1604. In this way, the cache 1608 can provide a performance boost that decreases or eliminates processor delays in the processor 1604 due to waiting for data. Using modules, methods and services such as those described herein, the processor 1604 can be configured to perform various actions. In some instances, the cache 1608 may include multiple types of cache including, for example, level one (L1) and level two (L2) cache. The memory 1614 may be referred to herein as system memory or computer system memory. The memory 1614 may include, at various times, elements of an operating system, one or more applications, data associated with the operating system or the one or more applications, or other such data associated with the computing device 1602.

Other system memory 1614 can be available for use as well. The memory 1614 can include multiple different types of memory with different performance characteristics. The processor 1604 can include any general purpose processor and one or more hardware or software services, such as service 1612 stored in storage device 1610, configured to control the processor 1604 as well as a special-purpose processor where software instructions are incorporated into the actual processor design. The processor 1604 can be a completely self-contained computing system, containing multiple cores or processors, connectors (e.g., buses), memory, memory controllers, caches, etc. In some instances, such a self-contained computing system with multiple cores is symmetric. In some instances, such a self-contained computing system with multiple cores is asymmetric. In some instances, the processor 1604 can be a microprocessor, a microcontroller, a digital signal processor ("DSP"), or a combination of these and/or other types of processors. In some instances, the processor 1604 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1600, an input device 1616 can represent any number of input mechanisms, such as a microphone for speech, a touch-sensitive screen for gesture or graphical input, keyboard, mouse, motion input, pen, and other such input devices. An output device 1618 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1600. In some instances, the input device 1616 and/or the output device 1618 can be coupled to the computing device 1602 using a remote connection device such as, for example, a communication interface such as the network interface 1620 described herein. In those instances, the communication interface can govern and manage the input and output received from the attached input device 1616 and/or output device 1618. As may be contemplated, there is no restriction on operating on any particular hardware arrangement and accordingly the basic features here may easily be substituted for other hardware, software, or firmware arrangements as they are developed.

In some instances, the storage device 1610 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1610 can include hardware and/or software services such as service 1612 that can control or configure the processor 1604 to perform one or more functions including, but not limited to, the methods, processes, functions, systems, and services described herein. In some instances, the hardware or software services can be implemented as modules. As illustrated in example computing system architecture 1600, the storage device 1610 can be connected to other parts of the computing device 1602 using the system connection 1606. In some examples, a hardware service or hardware module such as service 1612, that performs a function can include a software component stored in a non-transitory computer-readable medium that, in connection with the necessary hardware components, such as the processor 1604, connection 1606, cache 1608, storage device 1610, memory 1614, input device 1616, output device 1618, and so forth, can carry out the functions such as those described herein.

The disclosed processed for generating and executing experience recommendations can be performed using a computing system such as the example computing system illustrated in FIG. 16, using one or more components of the example computing system architecture 1600. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some instances, the processor can be configured to carry out some or all of methods and functions for generating and executing experience recommendations described herein by, for example, executing code using a processor such as processor 1604 wherein the code is stored in memory such as memory 1614 as described herein. One or more of a user device, a provider server or system, a database system, or other such devices, services, or systems may include some or all of the components of the computing system such as the example computing system illustrated in FIG. 16, using one or more components of the example computing system architecture 1600 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1628. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1604 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1614 can be coupled to the processor 1604 by, for example, a connector such as connector 1606, or a bus. As used herein, a connector or bus such as connector 1606 is a communications system that transfers data between components within the computing device 1602 and may, in some instances, be used to transfer data between computing devices. The connector 1606 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1614 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1614 can also include magnetic or optical data storage media including read-only (e.g., CD ROM and DVD ROM) or otherwise (e.g., CD or DVD). The memory can be local, remote, or distributed.

As described above, the connector 1606 (or bus) can also couple the processor 1604 to the storage device 1610, which may include non-volatile memory or storage and which may also include a drive unit. In some instances, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some instances, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some instances (e.g., for large programs), it may not be possible to store the entire program and/or data in the memory at any one time. In those instances, the program and/or data can be moved in and out of memory from, for example, an additional storage device such as storage device 1610. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1606 can also couple the processor 1604 to a network interface device such as the network interface 1620. The interface can include one or more of a modem or other such network interfaces including, but not limited to those described herein. It will be appreciated that the network interface 1620 may be considered to be part of the computing device 1602 or may be separate from the computing device 1602. The network interface 1620 can include one or more of an analog modem, Integrated Services Digital Network (ISDN) modem, cable modem, token ring interface, satellite transmission interface, or other interfaces for coupling a computer system to other computer systems. In some instances, the network interface 1620 can include one or more input and/or output (I/O) devices. The I/O devices can include, by way of example but not limitation, input devices such as input device 1616 and/or output devices such as output device 1618. For example, the network interface 1620 may include a keyboard, a mouse, a printer, a scanner, a display device, and other such components. Other examples of input devices and output devices are described herein. In some instances, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and decendents, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some instances, the computing device 1602 can be connected to one or more additional computing devices such as computing device 1624 via a network 1622 using a connection such as the network interface 1620. In those instance, the computing device 1624 may execute one or more services 1626 to perform one or more functions under the control of, or on behalf of, programs and/or services operating on computing device 1602. In some instances, a computing device such as computing device 1624 may include one or more of the types of components as described in connection with computing device 1602 including, but not limited to, a processor such as processor 1604, a connection such as connection 1606, a cache such as cache 1608, a storage device such as storage device 1610, memory such as memory 1614, an input device such as input device 1616, and an output device such as output device 1618. In those instance, the computing device 1624 can carry out the functions such as those described herein in connection with computing device 1602. In some instances, the computing device 1602 can be connected to a plurality of computing devices such as computing device 1624, each of which may also be connected to a plurality of computing devices such as computing device 1624, which may be referred to herein as a distributed computing environment.

The network 1622 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1622 can be wired connections, wireless connections, or combinations thereof. Communications via the network 1622 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1622, within the computing device 1602, within the computing device 1624, or within the computing resources provider 1628 can include information, which also may be referred to herein as content. The information may include text, graphics, audio, video, haptics, and/or any other information that can be provided to a user of the computing device such as the computing device 1602. In some examples, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1602 and presented to a user of the computing device 1602 using forms that are perceptible via sight, sound, smell, taste, touch, or other such mechanisms. In some instances, communications over the network 1622 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some instances, the computing device 1602 and/or the computing device 1624 can be connected to a computing resources provider 1628 via the network 1622 using a network interface such as those described herein (e.g., network interface 1620). In those instance, one or more systems (e.g., service 1630 and service 1632) hosted within the computing resources provider 1628 (also referred to herein as within "a computing resources provider environment") may execute one or more services to perform one or more functions under the control of, or on behalf of, programs and/or services operating on computing device 1602 and/or computing device 1624. Systems such as service 1630 and service 1632 may include one or more computing devices such as those described herein to execute computer code to perform the one or more functions under the control of, or on behalf of, programs and/or services operating on computing device 1602 and/or computing device 1624.

For example, the computing resources provider 1628 may provide a service, operating on service 1630 to store data for the computing device 1602 when, for example, the amount of data that the computing device 1602 exceeds the capacity of storage device 1610. In another example, the computing resources provider 1628 may provide a service to first instantiate a virtual machine (VM) on service 1632, use that VM to access the data stored on service 1632, perform one or more operations on that data, and provide a result of those one or more operations to the computing device 1602. Such operations (e.g., data storage and VM instantiation) may be referred to herein as operating "in the cloud," "within a cloud computing environment," or "within a hosted virtual machine environment," and the computing resources provider 1628 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1628 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1630 and service 1632 may implement versions of various services (e.g., the service 1612 or the service 1626) on behalf of, or under the control of, computing device 1602 and/or computing device 1624. Such implemented versions of various services may involve one or more virtualization techniques so that, for example, it may appear to a user of computing device 1602 that the service 1612 is executing on the computing device 1602 when the service is executing on, for example, service 1630. As may also be contemplated, the various services operating within the computing resources provider 1628 environment may be distributed among various systems within the environment as well as partially distributed onto computing device 1624 and/or computing device 1602.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently. A network interface, such as a wireless or wired interface, can enable the computing device to communicate with a network. Examples of computing devices (e.g., the computing device 1602) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 6-8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed but could have additional steps not included in the figure. A process may correspond to a method, a function, a procedure, a subroutine, a subprogram, etc. When a process corresponds to a function, its termination can correspond to a return of the function to the calling function or the main function.

In some instances, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine-learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine-learning model to facilitate identification of correlations between members of the set of data. The machine-learning model may be evaluated to determine, based on the sample inputs supplied to the machine-learning model, whether the machine-learning model is producing accurate correlations between members of the set of data. Based on this evaluation, the machine-learning model may be modified to increase the likelihood of the machine-learning model identifying the desired correlations. The machine-learning model may further be dynamically trained by soliciting feedback from users of a system as to the efficacy of correlations provided by the machine-learning algorithm or artificial intelligence algorithm (i.e., the supervision). The machine-learning algorithm or artificial intelligence may use this feedback to improve the algorithm for generating correlations (e.g., the feedback may be used to further train the machine-learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1602.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the concepts described herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate concepts described herein and does not impose a limitation on the scope unless otherwise claimed. Such language in the specification should not be construed as indicating any non-claimed element is required for the practice of the concepts described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The descriptions herein. were chosen in order to best explain the principles of the technology, its practical application, and to enable others skilled in the art to utilize the technology with various modifications as are suited to the particular use contemplated. It is intended that the scope of the technology be defined by the claim.

The invention claimed is:

1. A computer-implemented method comprising:
   receiving website data for a website from a browser executed on a user computing device associated with a user;
   extracting multimedia content from the website data, wherein the multimedia content is extracted by performing a scraping or parsing operation on the website data;
   accessing a task prediction model configured to identify tasks likely to be performed by or on behalf of the user;
   processing the multimedia content to generate a task recommendation for a task of the user, wherein processing the multimedia content includes applying the task prediction model to the multimedia content to generate the task recommendation;
   transmitting an indication corresponding to the task recommendation, wherein, when the indication is received by a computing device, the computing device is enabled to approve the task recommendation to generate a task corresponding to the task recommendation in a task facilitation service;
   receiving interaction data indicating an approval or a rejection of the task recommendation; and
   updating the task prediction model based on the interaction data, wherein the task prediction model is updated to improve accuracy in identifying future tasks that are likely to be performed by or on behalf of the user.

2. The computer-implemented method of claim 1, wherein the computing device is a user computing device corresponding to the user.

3. The computer-implemented method of claim 1, wherein the computing device is a representative computing device different than a user computing device corresponding to the user, and wherein the representative computing device corresponds to a representative assigned to the user to facilitate task completion for the user.

4. The computer-implemented method of claim 1, wherein the website data includes an address of the website.

5. The computer-implemented method of claim 1, wherein the website data includes an address of the website and processing the website data includes accessing the website using the address and supplementing the website data with additional data collected from the website.

6. The computer-implemented method of claim 1, wherein the website data includes a keyword for the website.

7. The computer-implemented method of claim 1 further comprising:
   receiving approval of the task recommendation; and
   responsive to receiving approval of the task recommendation, generating the task in the task facilitation service.

8. The computer-implemented method of claim 1, wherein updating the task prediction model includes further updating the task prediction model using the website data.

9. The computer-implemented method of claim 1, wherein the task prediction model includes a natural-language model, and wherein applying the task prediction model includes:
   extracting a text portion from the multimedia content;
   processing the text portion using the natural-language model to generate a feature vector; and
   generating the task recommendation based on the feature vector.

10. A system comprising:
    one or more processors; and
    a non-transitory computer-readable storage medium that stores instructions that, when executed by the one or more processors, cause the one or more processors to perform operations comprising:
       receiving website data for a website from a browser executed on a user computing device associated with a user;
       extracting multimedia content from the website data, wherein the multimedia content is extracted by performing a scraping or parsing operation on the website data;
       accessing a task prediction model configured to identify tasks likely to be performed by or on behalf of the user;
       processing the multimedia content to generate a task recommendation for a task of the user, wherein processing the multimedia content includes applying the task prediction model to the multimedia content to generate the task recommendation;
       transmitting an indication corresponding to the task recommendation, wherein, when the indication is received by a computing device, the computing device is enabled to approve the task recommendation to generate a task corresponding to the task recommendation in a task facilitation service;
       receiving interaction data indicating an approval or a rejection of the task recommendation; and updating the task prediction model based on the interaction data, wherein the task prediction model is updated to improve accuracy in identifying future tasks that are likely to be performed by or on behalf of the user.

11. The system of claim 10, wherein the website data includes at least one of an address of the website and a keyword of the website.

12. The system of claim 10, wherein the website data includes an address of the website and processing the website data includes accessing the website using the address and supplementing the website data with additional data collected from the website.

13. The system of claim 10, wherein the instructions further cause the one or more processors to perform the operations of:
   receiving approval of the task recommendation; and
   responsive to receiving approval of the task recommendation, generating the task in the task facilitation service.

14. The system of claim 10, wherein processing the website data includes providing the website data to a task prediction model, and wherein the task prediction model is updated based on responses to task recommendations generated by the task prediction model.

15. The system of claim 10, wherein updating the task prediction model includes further updating the task prediction model using the website data.

16. The system of claim 10, wherein the task prediction model includes a natural-language model, and wherein applying the task prediction model includes:
   extracting a text portion from the multimedia content;
   processing the text portion using the natural-language model to generate a feature vector; and
   generating the task recommendation based on the feature vector.

17. A non-transitory computer-readable storage medium that stores instructions that, when executed by one or more processors, cause the one or more processors to perform operations comprising:
   receiving website data for a website from a browser executed on a user computing device associated with a user;
   extracting multimedia content from the website data, wherein the multimedia content is extracted by performing a scraping or parsing operation on the website data;
   accessing a task prediction model configured to identify tasks likely to be performed by or on behalf of the user;
   processing the multimedia content to generate a task recommendation for a task of the user, wherein processing the multimedia content includes applying the task prediction model to the multimedia content to generate the task recommendation;
   transmitting an indication corresponding to the task recommendation, wherein, when the indication is received by a computing device, the computing device is enabled to approve the task recommendation to generate a task corresponding to the task recommendation in a task facilitation service;
   receiving interaction data indicating an approval or a rejection of the task recommendation; and
   updating the task prediction model based on the interaction data, wherein the task prediction model is updated to improve accuracy in identifying future tasks that are likely to be performed by or on behalf of the user.

18. The non-transitory computer-readable storage medium of claim 17, wherein the website data includes at least one of an address of the website and a keyword of the website.

19. The non-transitory computer-readable storage medium of claim 17, wherein the website data includes an address of the website and processing the website data includes accessing the website using the address and supplementing the website data with additional data collected from the website.

20. The non-transitory computer-readable storage medium of claim 17, wherein the instructions further cause the one or more processors to perform the operations of:
   receiving approval of the task recommendation; and
   responsive to receiving approval of the task recommendation, generating the task in the task facilitation service.

21. The non-transitory computer-readable storage medium of claim 17, wherein updating the task prediction model includes further updating the task prediction model using the website data.

22. The non-transitory computer-readable storage medium of claim 17, wherein the task prediction model includes a natural-language model, and wherein applying the task prediction model includes:
   extracting a text portion from the multimedia content;
   processing the text portion using the natural-language model to generate a feature vector; and
   generating the task recommendation based on the feature vector.

* * * * *